US006647652B1

(12) United States Patent
Seiber et al.

(10) Patent No.: US 6,647,652 B1
(45) Date of Patent: Nov. 18, 2003

(54) DISPLAY BOARD SYSTEM

(75) Inventors: Charles Anthony Seiber, Belmont, CA (US); Scott Michael Miller, Kentwood, MI (US); Alan Fredrick Mauer, Grand Rapids, MI (US); Peter Scott Macdonald, Palo Alto, CA (US); Robert Peter Arko, Palo Alto, CA (US); Alan Michael Vale, Mountain View, CA (US); Steven Ryutaro Takayama, Atherton, CA (US)

(73) Assignee: Steelcase Development Inc., Grand Rapids, MI (US)

( * ) Notice: Subject to any disclaimer, the term of this patent is extended or adjusted under 35 U.S.C. 154(b) by 0 days.

(21) Appl. No.: 09/563,098

(22) Filed: May 2, 2000

Related U.S. Application Data

(63) Continuation-in-part of application No. 09/182,999, filed on Oct. 30, 1998.

(51) Int. Cl.[7] .............................. B32B 9/00; G09F 7/12; G09F 1/12

(52) U.S. Cl. ............................ 40/606; 40/615; 434/414

(58) Field of Search .......................... 40/606, 615, 617, 40/594, 657, 506, 605, 611, 722, 723, 783; 248/220.21, 441.1, 205.2, 220.31; 434/414, 408, 418, 429, 430; 428/343, 355 R, 355 RA; 211/94.01, 96, 116, 169

(56) References Cited

U.S. PATENT DOCUMENTS 119,054 A 9/1871 Shryock
241,600 A 5/1881 Bray .......................... 119/412
241,925 A 5/1881 Cadwell (List continued on next page.)

FOREIGN PATENT DOCUMENTS

AU 164466 4/1949
DE 232680 8/1963
DE 1561580 4/1970 ................. 175/414

(List continued on next page.)

OTHER PUBLICATIONS

Brochure by UNIFOR titled "Pannelli PL" (undated) (37 sheets).

(List continued on next page.)

*Primary Examiner*—Tan Q. Nguyen
*Assistant Examiner*—Dalena Tran
(74) *Attorney, Agent, or Firm*—Quarles & Brady, LLP

(57) ABSTRACT

An apparatus for display of information in a work environment is disclosed. The apparatus includes a display board having a substantially solid core and defining a first side having a first surface and a second side opposite of the first side having a second surface. A first surface treatment may include a reusable adhesive and a clear film cover over the reusable adhesive. The display board may have a generally rectangular shape and may include a plurality of corner members and a mounting structure. A mounting structure for at least one display board is also disclosed. The mounting structure may include a pivotal interface adapted to engage a mounting interface of the display board so that the display board is removably pivotally mounted within the mounting structure. An easel for use with a first display board is further disclosed. The easel may include a base, a frame coupled to the base, a storage area formed by the frame, and a panel coupled to the frame. The panel may include a tray coupled to the panel and a compliant member. A first display board can be placed on display on the tray and pressed into secure engagement with the compliant member, and a plurality of display boards can be stored in the storage area. An easel may include a front support member, a pivoting rear support member, a collar, a pivot member, and a tray so that a display board is supported by the tray and the front support member. Other display board and mounting structures may be provided in alternative arrangements. The display board system may include any of a wide variety of accessories and related or associated items and articles.

94 Claims, 50 Drawing Sheets

U.S. PATENT DOCUMENTS 249,198 A 11/1881 Moon
253,538 A 2/1882 McLane
454,844 A 6/1891 Brewerton et al.
475,126 A 5/1892 Lorenz
549,347 A 11/1895 Clark
605,148 A 6/1898 Sylvester
621,835 A 3/1899 Macdonald
627,396 A 6/1899 Daly
713,417 A 11/1902 Feldmann et al.
821,144 A 5/1906 Walsh
943,821 A 12/1909 Feldmann, Jr.
950,006 A 2/1910 McCarty
955,586 A 4/1910 Emerich
997,866 A 7/1911 Smith
1,086,236 A 2/1914 Staples .................... 211/169.1
1,116,484 A 11/1914 Ralph ......................... 211/169
1,122,926 A 12/1914 Hick ....................... 211/169.1
1,141,404 A 6/1915 Moseley .................. 211/169.1
1,203,659 A 11/1916 Smith ......................... 248/456
1,254,036 A 1/1918 Grant .......................... 211/96
1,326,832 A 12/1919 Baily .......................... 40/533
1,457,990 A 6/1923 Morgan ...................... 248/456
1,599,888 A 9/1926 Haskell ....................... 40/533
1,616,897 A 2/1927 Hayes ......................... 40/398
1,688,456 A 10/1928 Dolph ........................ 312/197
1,770,755 A 7/1930 Kleinpell ......................... 40/1
1,826,469 A 10/1931 Hunt et al. ................... 40/533
1,881,636 A 10/1932 Johnson et al. ............. 434/414
1,887,539 A 11/1932 Brown ........................ 211/48
1,943,629 A 1/1934 Schwartz ....................... 52/29
1,958,579 A 5/1934 Johnson et al. ................ 35/15
1,997,829 A 4/1935 McKee ........................ 211/55
2,070,408 A 2/1937 Leidgen ....................... 211/96
2,144,083 A 1/1939 Rentfrow, Sr. .............. 155/124
2,348,414 A 5/1944 Pierce ......................... 211/41
2,691,238 A 10/1954 Svatos ........................... 45/80
2,795,067 A * 6/1957 Walker ........................ 40/102
2,812,067 A 11/1957 Gussack ...................... 211/46
2,870,459 A 1/1959 Zabielski ........................... 5/2
2,886,182 A 5/1959 Dauman ...................... 211/49
2,914,873 A 12/1959 Brennan ...................... 40/125
2,928,555 A 3/1960 Childs et al. ............... 211/169
2,963,332 A 12/1960 Breuning .................... 312/231
3,017,999 A 1/1962 Cano ........................... 211/40
3,042,978 A 7/1962 Eames et al. ................ 20/1.11
3,060,521 A 10/1962 Greco ........................... 52/65
3,078,133 A 2/1963 Schauer ...................... 312/223
3,141,207 A 7/1964 Kahler .......................... 20/19
3,181,274 A 5/1965 Izenour ......................... 50/24
3,251,477 A 5/1966 Parstorfer ................... 211/169
3,286,382 A 11/1966 Newman ..................... 40/102
3,351,211 A 11/1967 Best ........................... 211/169
3,391,796 A 7/1968 Cross ......................... 211/169
3,412,868 A 11/1968 Carter ........................ 211/163
3,425,568 A 2/1969 Albright ...................... 211/87
3,514,883 A 6/1970 Albright ........................ 40/67
3,557,499 A 1/1971 Dickie et al. .................. 52/36
3,581,423 A 6/1971 Mascolo ................... 40/158 B
3,643,362 A * 2/1972 Hackett et al. ............... 40/156
3,646,696 A * 3/1972 Sarkisian .................. 40/125 H
3,683,100 A 8/1972 Deal et al. .................... 174/48
3,732,633 A 5/1973 Margolis et al. ............... 35/55
3,760,952 A 9/1973 White ........................ 211/168
3,777,896 A 12/1973 Ehrlich ..................... 211/49 D
3,797,146 A 3/1974 Holes ...................... 40/104.18
3,857,731 A 12/1974 Merrill, Jr. et al. ..... 117/112 PA
3,883,972 A 5/1975 Propst et al. ................. 40/128
3,921,320 A 11/1975 McWilliams ................... 40/32
3,924,749 A 12/1975 Weston .......................... 211/4
3,936,968 A * 2/1976 Gilbert ........................ 40/155
3,952,133 A 4/1976 Amos et al. ................ 428/354
3,975,837 A 8/1976 Baars ............................ 35/63
3,984,930 A 10/1976 Booland ......................... 40/65
4,033,058 A 7/1977 Lyman .......................... 40/97
4,083,137 A * 4/1978 Rozmanith ................ 40/158 R
4,135,775 A 1/1979 Driscoll .................... 339/22 R
4,166,332 A 9/1979 Donovan ..................... 40/605
4,180,298 A 12/1979 Borgerson, Jr. ............. 312/242
4,194,313 A 3/1980 Downing ..................... 40/610
4,239,170 A 12/1980 Planebo .................. 248/441 B
4,254,569 A * 3/1981 Janik ........................... 40/606
4,270,290 A 6/1981 Eckert ......................... 40/389
4,310,978 A 1/1982 Stern ........................... 40/600
4,360,240 A 11/1982 Koncelik et al. ........... 312/238
4,360,991 A 11/1982 West ............................. 52/29
4,364,984 A * 12/1982 Wentworth ................. 428/106
4,428,136 A 1/1984 Franklin ...................... 40/605
4,447,973 A 5/1984 Wihlke ........................ 40/159
4,457,436 A 7/1984 Kelley ......................... 211/88
4,478,467 A 10/1984 Tyndall ...................... 312/250
4,569,448 A 2/1986 Graham ....................... 211/74
4,588,190 A 5/1986 Stewart et al. .............. 473/435
4,606,394 A 8/1986 Bannister .................... 160/351
4,620,635 A 11/1986 Morand ....................... 211/47
4,652,239 A 3/1987 Brimberg ..................... 434/80
4,658,966 A 4/1987 Broek .......................... 211/46
4,715,154 A 12/1987 Baloga ........................ 52/239
4,723,665 A 2/1988 Benedict et al. ............ 211/168
4,723,821 A 2/1988 Montgomery ............... 312/231
4,750,305 A 6/1988 Bastian .................... 52/127.11
4,757,901 A 7/1988 Woods ....................... 206/575
4,771,557 A 9/1988 Bowman ................... 40/158.1
4,793,495 A 12/1988 Preu ........................... 211/41
4,805,331 A 2/1989 Boggess et al. .............. 40/651
4,902,229 A 2/1990 Pedersen et al. .............. 434/80
4,913,297 A 4/1990 Wells .......................... 211/96
4,928,465 A 5/1990 Del Castillo Von Haucke ................ 52/239
4,930,237 A * 6/1990 Oliphant ...................... 40/617
4,954,382 A 9/1990 Riefler et al. ............... 428/116
4,960,383 A * 10/1990 Smith et al. ................ 434/430
4,979,785 A 12/1990 Richards ..................... 312/201
4,996,110 A 2/1991 Tanuma et al. ............. 428/343
5,016,373 A * 5/1991 Theno ......................... 40/594
5,090,171 A 2/1992 Kano et al. ................ 52/243.1
5,105,952 A 4/1992 Krattiger ..................... 211/41
5,109,994 A 5/1992 Kidd et al. ................. 211/162
5,112,020 A 5/1992 Ginsberg .................... 248/456
5,125,202 A 6/1992 Kissinger ..................... 52/239
5,139,155 A 8/1992 Laxson ....................... 211/169
5,148,925 A 9/1992 Althoff et al. ................ 211/41
5,160,050 A 11/1992 Russo ......................... 211/40
5,160,189 A 11/1992 Johnston et al. ............ 312/201
5,161,321 A 11/1992 Kuhnke ....................... 40/493
5,181,334 A 1/1993 Mima .......................... 40/524
5,186,499 A 2/1993 Mason ........................ 283/81
5,214,885 A 6/1993 Maas et al. .................... 52/71
5,226,548 A 7/1993 Koeppel ..................... 211/144
5,241,796 A 9/1993 Hellwig et al. .............. 52/36.4
5,248,536 A 9/1993 Du Katz ...................... 428/40
5,253,368 A * 10/1993 Blake ........................ 2/209.13
5,282,341 A 2/1994 Baloga et al. ................. 52/32
5,289,926 A 3/1994 Lewis et al. .................. 211/45
5,290,002 A 3/1994 Cohen ........................ 248/456
5,301,477 A * 4/1994 Rellinger et al. ............ 52/36.1
5,309,686 A 5/1994 Underwood et al. ........... 52/29
5,321,579 A 6/1994 Brown et al. ............... 361/681
5,342,665 A 8/1994 Krawitz ....................... 428/40
5,368,486 A 11/1994 Kurzman ..................... 434/79
5,375,802 A 12/1994 Branham, II ............. 248/231.4
5,384,999 A * 1/1995 Roche et al. ................. 52/764

| | | | | | |
|---|---|---|---|---|---|
| 5,392,934 | A | | 2/1995 | Fox | 211/94 |
| 5,394,631 | A | | 3/1995 | Bosio | 40/491 |
| 5,406,761 | A | | 4/1995 | Hobbiebrunken et al. | 52/243.1 |
| 5,422,155 | A | | 6/1995 | Spence, Jr. | 428/76 |
| 5,428,928 | A | | 7/1995 | Hellwig et al. | 52/239 |
| 5,486,391 | A | | 1/1996 | Tyner | |
| 5,495,953 | A | | 3/1996 | Bearth | 211/40 |
| 5,503,278 | A | | 4/1996 | Ishmael | 211/169 |
| 5,511,348 | A | | 4/1996 | Cornell et al. | 52/239 |
| 5,513,574 | A | | 5/1996 | Collins | 108/36 |
| 5,536,080 | A | | 7/1996 | Madimenos et al. | 312/317.1 |
| 5,549,267 | A | | 8/1996 | Armbruster et al. | 248/442.2 |
| 5,558,418 | A | | 9/1996 | Lambright et al. | 312/321.5 |
| 5,569,503 | A | | 10/1996 | Piotroski | 428/41.8 |
| 5,584,546 | A | | 12/1996 | Gurin et al. | 312/200 |
| 5,588,659 | A | | 12/1996 | Boes et al. | 280/47.19 |
| 5,590,940 | A | | 1/1997 | Richard | 312/287 |
| 5,607,214 | A | | 3/1997 | Pierce et al. | 312/310 |
| 5,609,112 | A | | 3/1997 | Meyer et al. | 108/153 |
| 5,617,660 | A | * | 4/1997 | Pollack | 40/611 |
| 5,635,265 | A | | 6/1997 | Potokar | 428/43 |
| 5,647,172 | A | | 7/1997 | Rokicki | 49/504 |
| 5,649,631 | A | | 7/1997 | Loflin | 211/44 |
| 5,655,323 | A | * | 8/1997 | Lassoff | 40/611 |
| 5,655,672 | A | | 8/1997 | Stuchlik, III | 211/70.7 |
| 5,658,635 | A | * | 8/1997 | Davis et al. | 428/81 |
| 5,675,946 | A | | 10/1997 | Verbeck et al. | 52/205 |
| 5,682,695 | A | * | 11/1997 | Hoffman | 40/594 |
| 5,687,499 | A | | 11/1997 | Brnjac | 40/524 |
| 5,687,513 | A | | 11/1997 | Baloga et al. | 52/32 |
| 5,688,579 | A | | 11/1997 | Konsti et al. | 428/192 |
| 5,694,881 | A | * | 12/1997 | Creech | 116/222 |
| 5,695,264 | A | | 12/1997 | Koch | 312/310 |
| 5,697,589 | A | | 12/1997 | Garfinkle | 248/223.41 |
| 5,711,121 | A | | 1/1998 | Garver | 52/239 |
| 5,724,778 | A | | 3/1998 | Cornell et al. | 52/239 |
| 5,743,193 | A | | 4/1998 | Kakuta et al. | 108/147 |
| 5,746,330 | A | | 5/1998 | DiBetta | 211/70.6 |
| 5,765,315 | A | | 6/1998 | Nagamitsu et al. | 52/36.1 |
| 5,771,954 | A | | 6/1998 | Benner et al. | 160/231.2 |
| 5,826,385 | A | | 10/1998 | Dykstra et al. | 52/220.7 |
| 5,826,639 | A | | 10/1998 | Miller | 160/135 |
| 5,829,202 | A | | 11/1998 | Canton Gongora et al. | 52/36.1 |
| 5,831,211 | A | | 11/1998 | Gartung et al. | 174/48 |
| 5,848,698 | A | | 12/1998 | Stompe | 206/449 |
| 5,873,205 | A | | 2/1999 | Hanlon et al. | 52/239 |
| 5,901,485 | A | * | 5/1999 | Kiggins | 40/506 |
| 5,913,787 | A | | 6/1999 | Edwards | 52/220.7 |
| 5,931,429 | A | | 8/1999 | Hellwig et al. | 248/235 |
| 5,941,713 | A | * | 8/1999 | Wayner et al. | 434/414 |
| 5,966,879 | A | | 10/1999 | Verbeek et al. | 52/205 |
| 5,984,441 | A | | 11/1999 | Stokhuijzen | 312/240 |
| 5,987,794 | A | * | 11/1999 | Lavi et al. | 40/611 |
| 6,015,124 | A | * | 1/2000 | Loy | 248/220.31 |
| 6,048,044 | A | | 4/2000 | Biggel et al. | 312/258 |

FOREIGN PATENT DOCUMENTS

| | | | |
|---|---|---|---|
| GB | 124334 | 4/1949 | |
| JP | 3-93944 | 4/1991 | |
| JP | 3-93946 | 4/1991 | |
| JP | 4222787 | 8/1992 | 52/239 |
| WO | WO9524031 A | 9/1995 | |

OTHER PUBLICATIONS

Brochure by UNIFOR titled "Progetto 25.90" (undated) (19 sheets).

Promotional material (chart) by Dowing Displays of Milford, Ohio, showing display models (no date), color.

Promotional material for "The Office of the Future", by Tarrant Interiors—of Fort Worth, Texas, (no date), 4 sheets.

Innamorati, Francesco, "The Telematic Tree", Habitat Ufficio, bearing a designation 1991.

Advertisement for "Ameriwood Oak Armoire", by Office Max, bearing a designation "Nov. 11, 1995", 1 sheet.

Gertsakis, John, "*Durable Yet Future Proof*", bearing a designation "©1996, National Key Centre for Design at RMIT", 4 sheets, printed from Internet site: www.cfd.rmit.edu.au/outcomes/erdnews/ERD6/HOTdesk.html on Oct. 27, 1998.

Promotional materials for "A World of Possibilities. Introducing Contrada™. The Next Generation in Office Furniture.", by Trendway Corporation of Holland, Michigan, bearing a designation "©1998".

Promotional material for "Village Wall," by Tellus Furniture a Paoli Company of Orleans, Indiania, bearing a designation "©1998 Tellus Furniture", 8 color sheets.

Yates, JoAnne, "Graphic ROI Reporting," Knowledge Management at 106, Oct. 1998.

Brochure for "TooGo New Workplace Solutions", by Egan Visual, bearing a designation "©Copyright Egan Visual 1999", 16 color sheets.

Peter Piper Products Inc. sales materials, believed to have a publication date before Oct. 30, 1998.

Steelcase Inc. sales materials, believed to have a publication date before Oct. 30, 1998.

Sunrise Business Products sales materials, printed on Sep. 21, 1998 from <http://www.rexart.com/tridenteasels.html>.

K.O.H. sales materials, believed to have a publication date before Oct. 30, 1998.

Best–Rite Manufacturing sales materials, believed to have a publication date before Oct. 30, 1998.

Peter Piper Products Inc. sales materials, believed to have a publication date before Oct. 30, 1998.

K.O.H. sales materials, believed to have a publication date before Oct. 30, 1998.

Quartet™ sales materials, shown in Corporate Express office supplies catalogue, bearing a designation "Printed in the U.S.A. © 1997".

Quartet™ sales materials, show in Redwood office supplies catalogue, believed to have a publication date before Oct. 30, 1998.

Bretford™ sales materials, believed to have a publication date before Oct. 30, 1998.

Egan sales materials, bearing a designation "Printed in Canada © Copyright Egan Visual 1994".

Egan sales materials, believed to have a publication date before Oct. 30, 1998.

3M sales materials, believed to have a publication date before Oct. 30, 1998.

Teknion sales materials, believed to have a publication date before Oct. 30, 1998.

Stanrite sales materials, believed to have a publication date before Oct. 30, 1998.

Quartet ™ sales materials, in BT Office Products International catalogue, believed to have a publication date before Oct. 30, 1998.

Wilkahn sales materials, believed to have a publication date before Oct. 30, 1998.
European Search Report EP 99 25 0383 (2 pages).
Peter Piper Products Inc. sales materials, believed to have a publication date before Oct. 30, 1998.
Steelcase Inc. sales materials, believed to have a publication date before Oct. 30, 1998.
Sunrise Business Products sales materials, printed on Sep. 21, 1998 from <http://www.rexart.com/tridenteasels.html>.
K.O.H. sales materials, believed to have a publication date before Oct. 30, 1998.

* cited by examiner

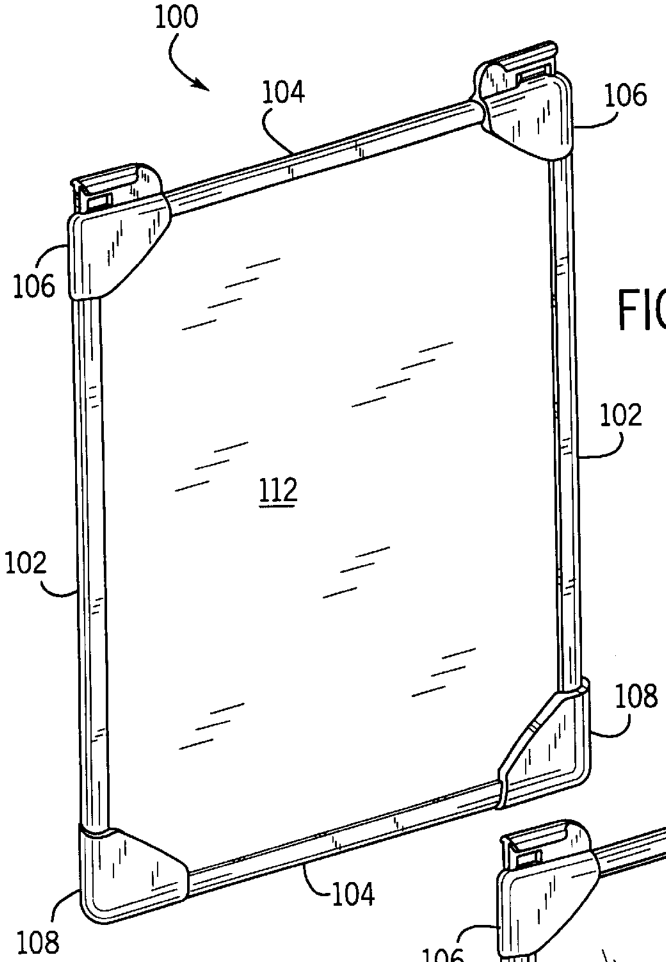
FIG. 1
FIG. 5
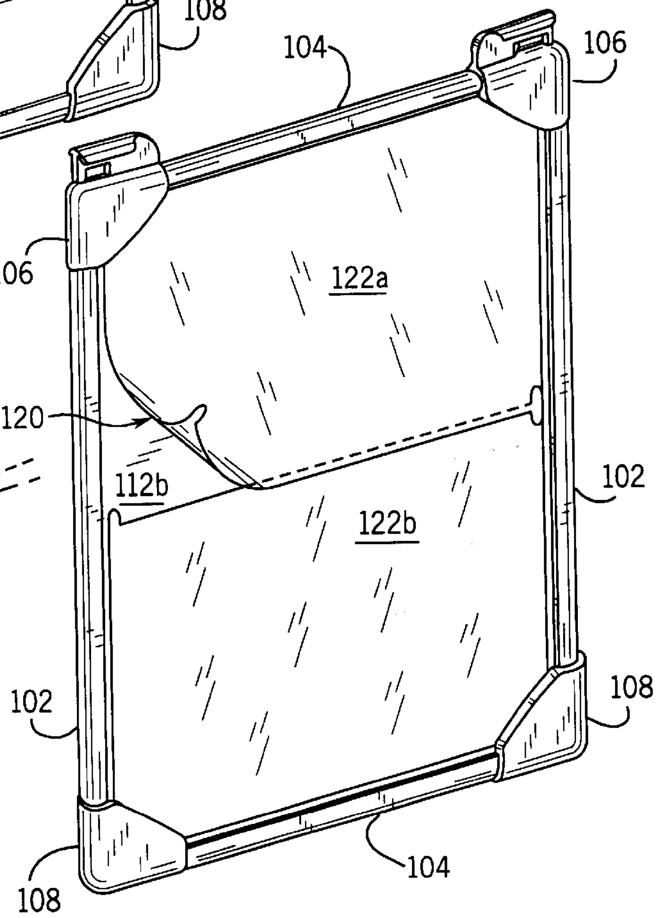
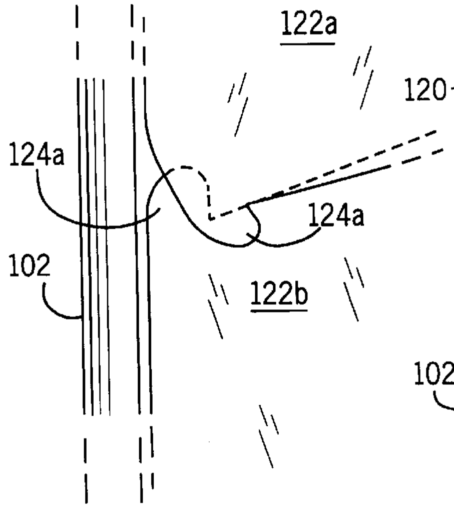
FIG. 5A

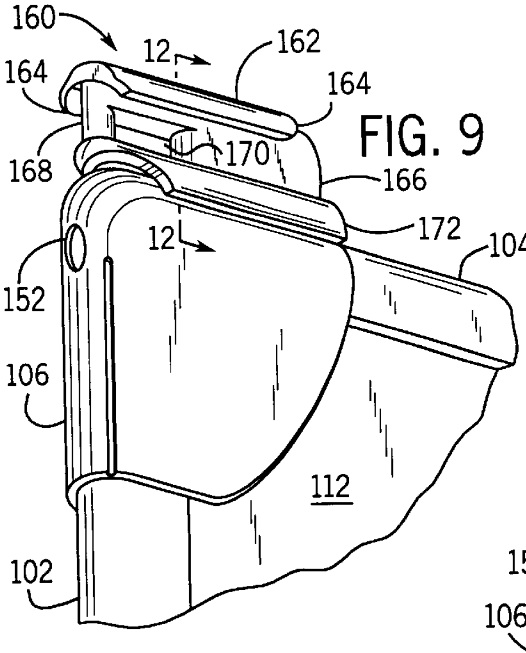
FIG. 9
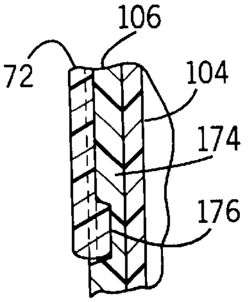
FIG. 12A
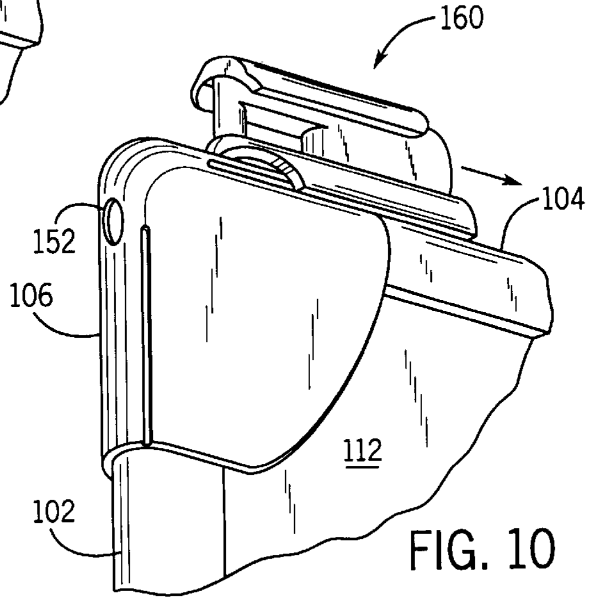
FIG. 10
FIG. 11
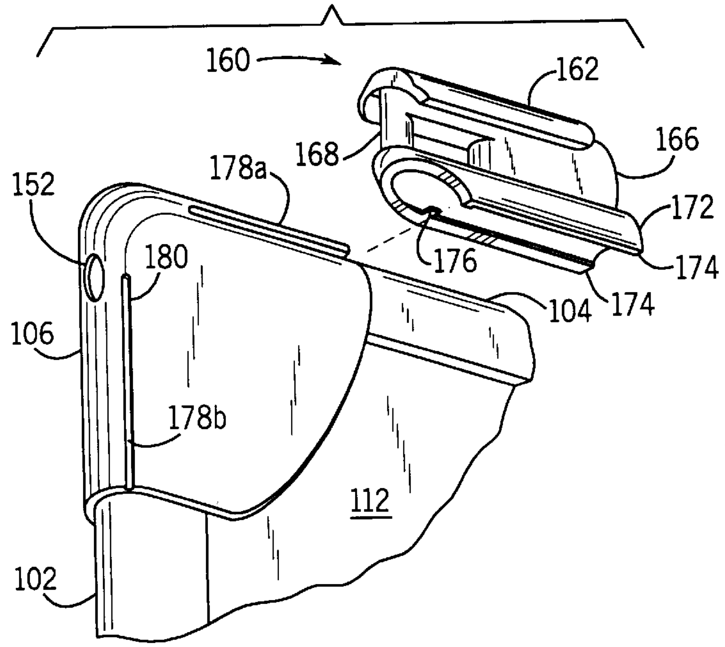
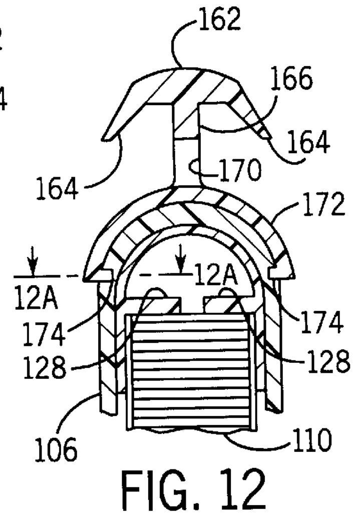
FIG. 12

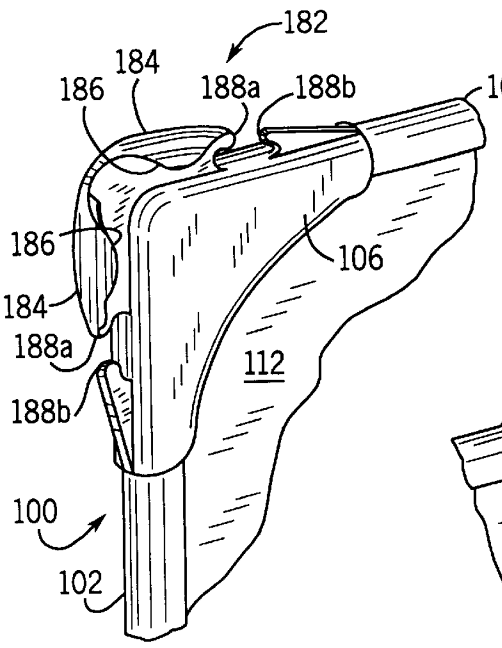
FIG. 13
FIG. 15
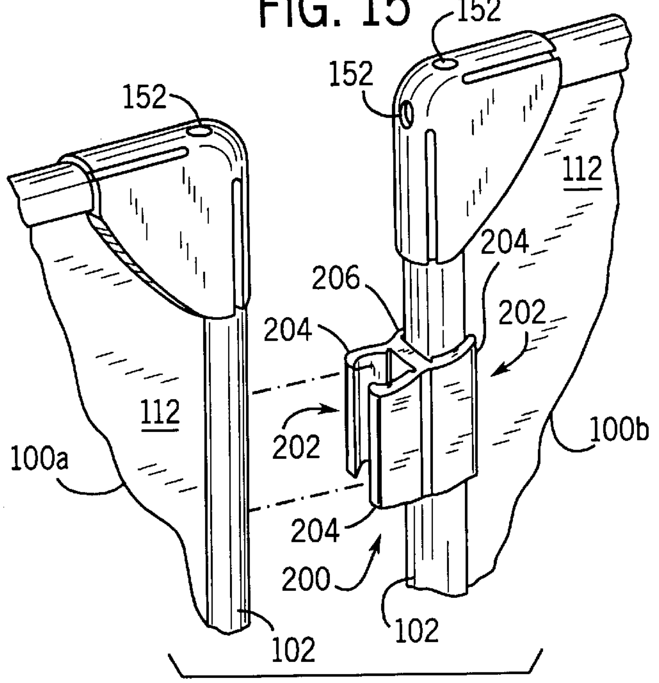
FIG. 14
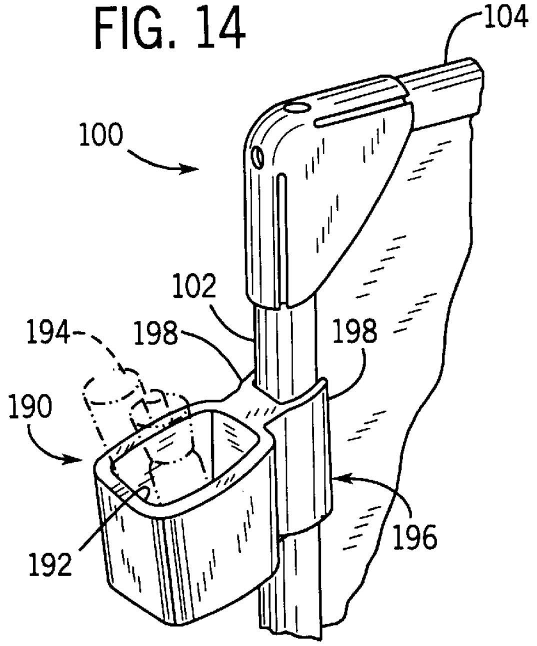
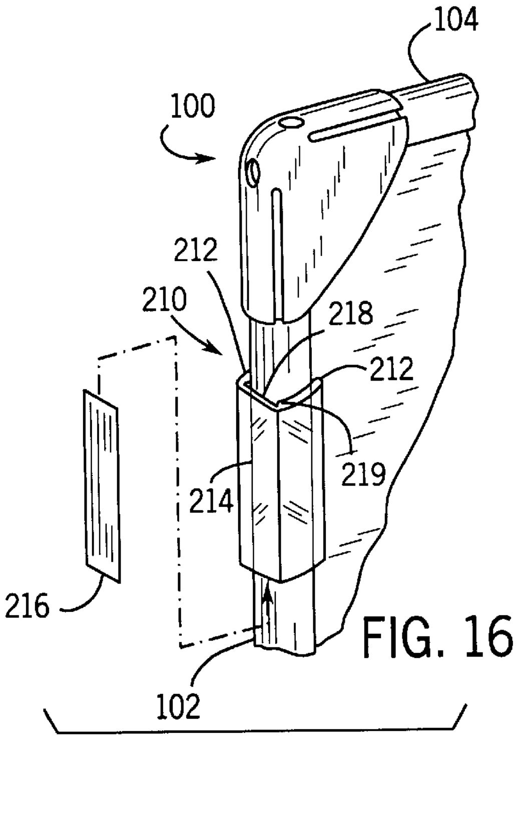
FIG. 16

FIG. 21A
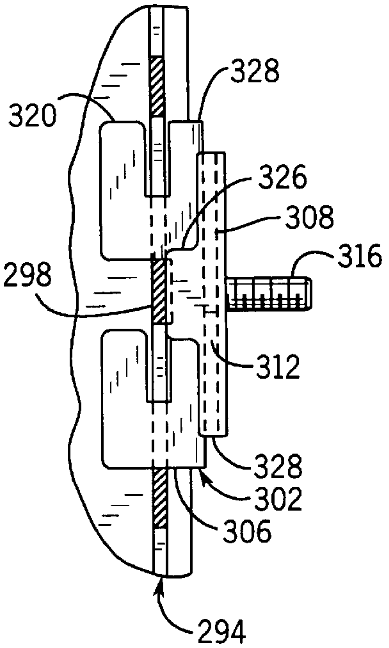
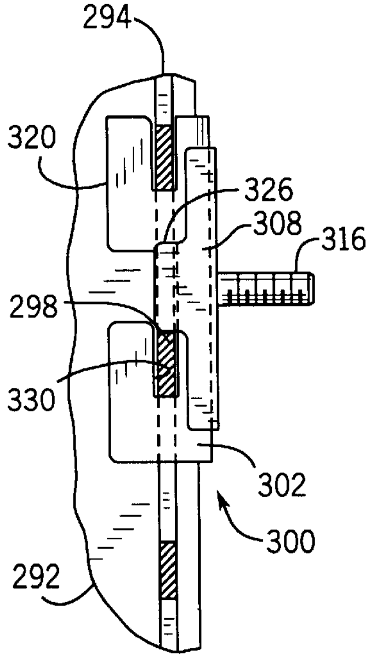
FIG. 21B
FIG. 23
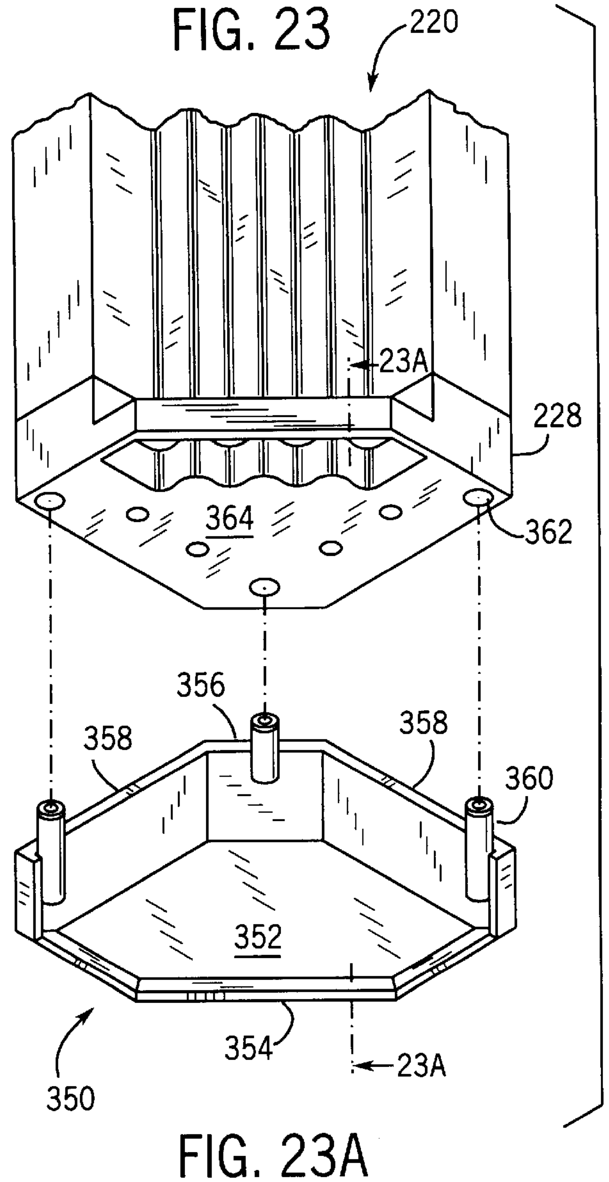
FIG. 23A
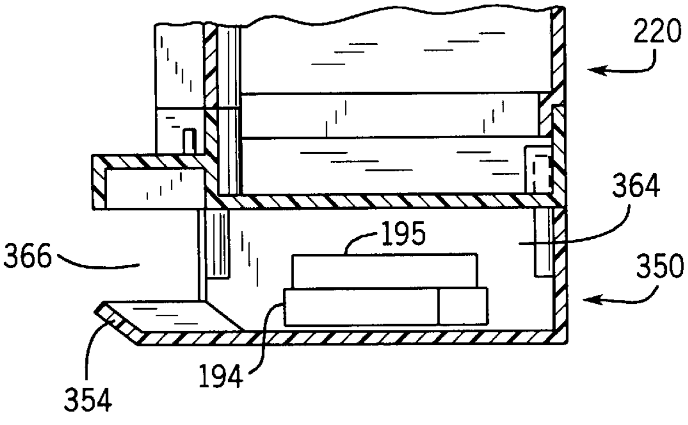

FIG. 24
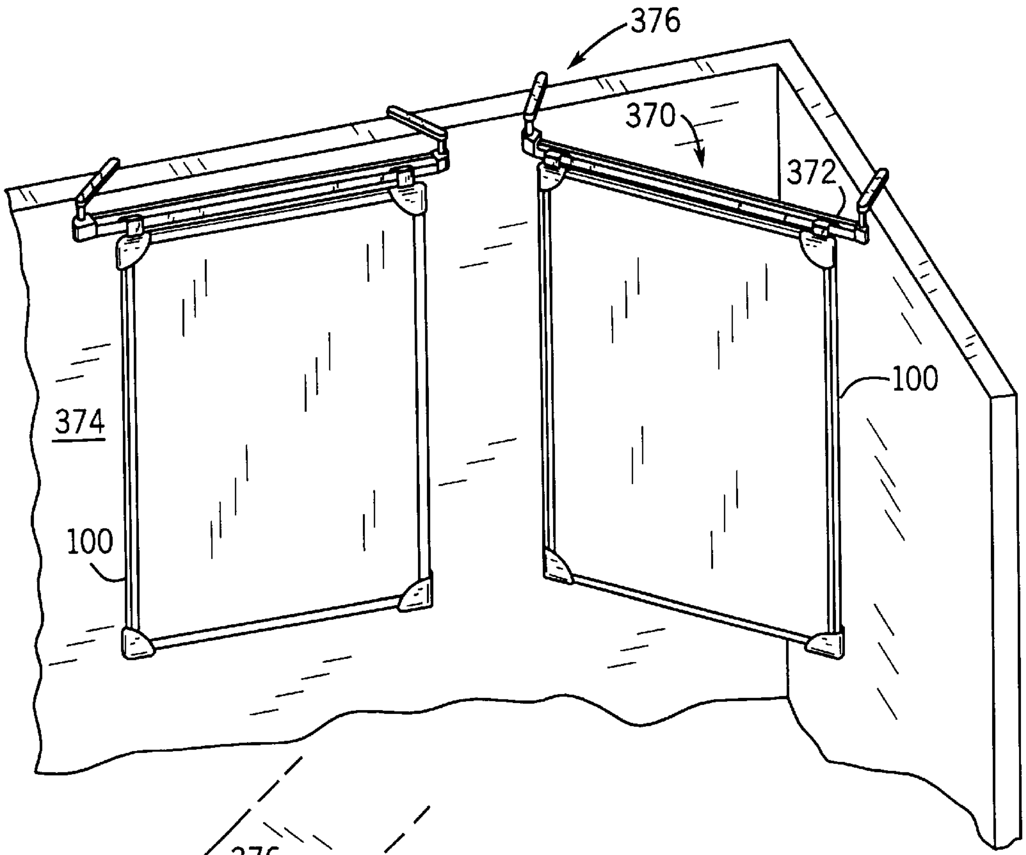
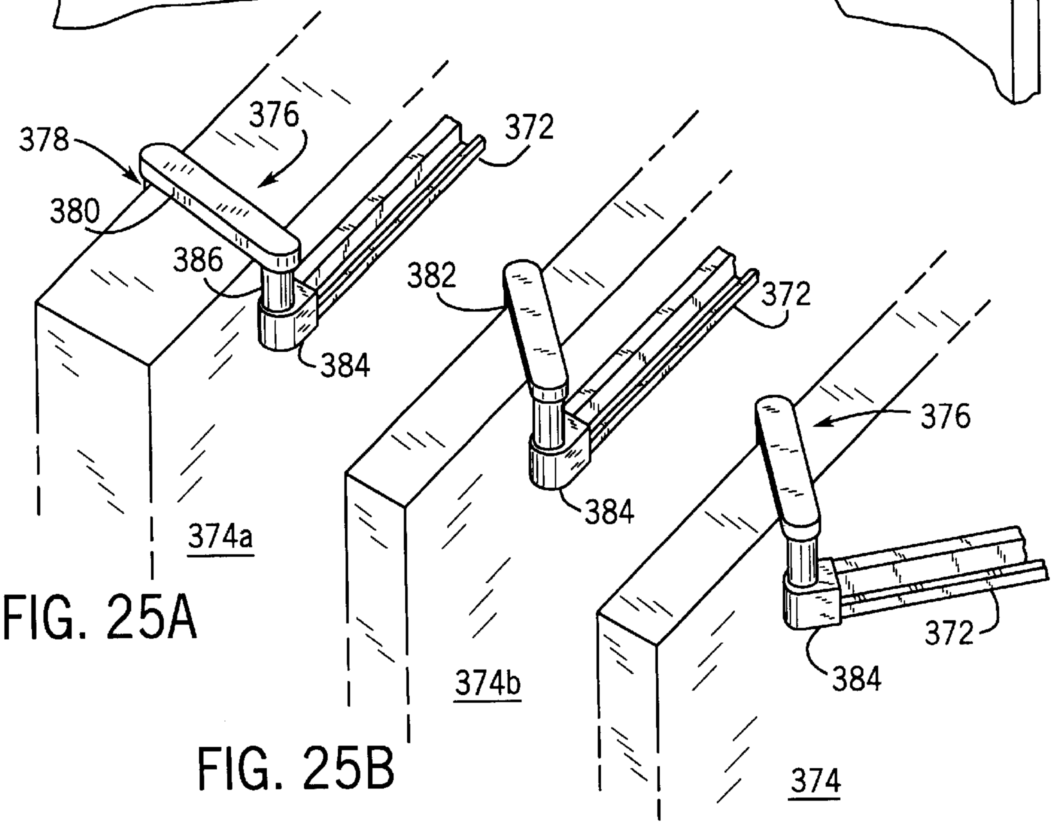
FIG. 25A
FIG. 25B
FIG. 25C

FIG. 26
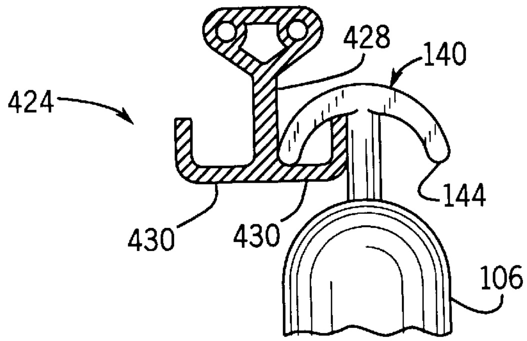
FIG. 27
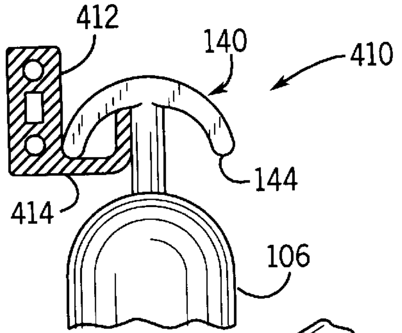
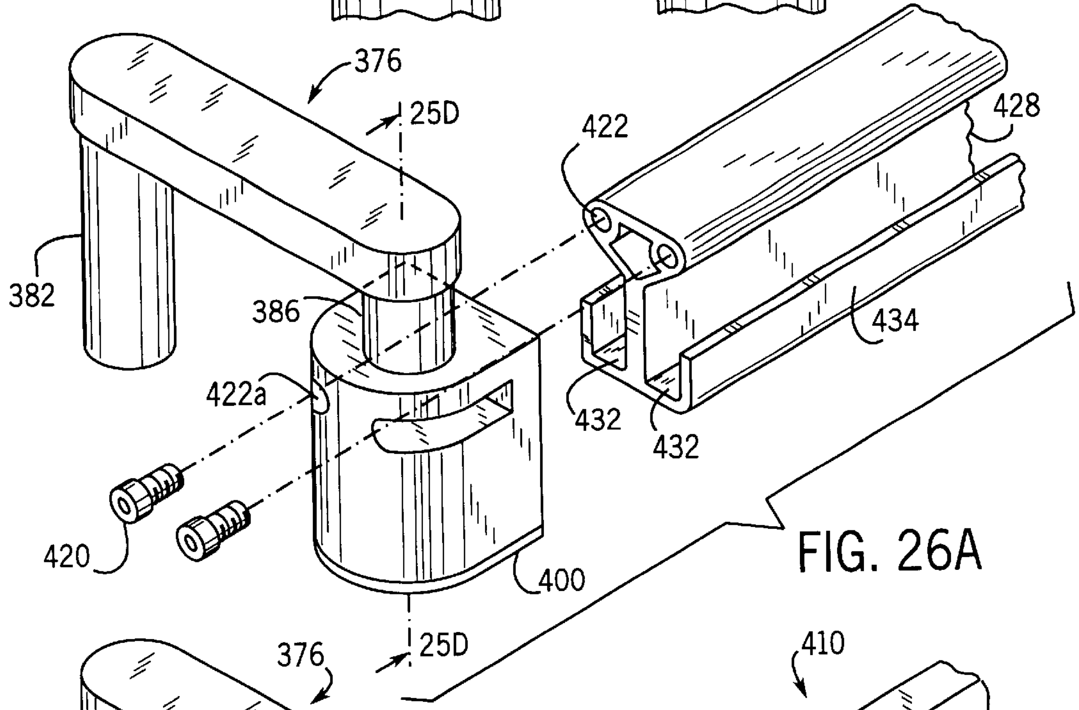
FIG. 26A
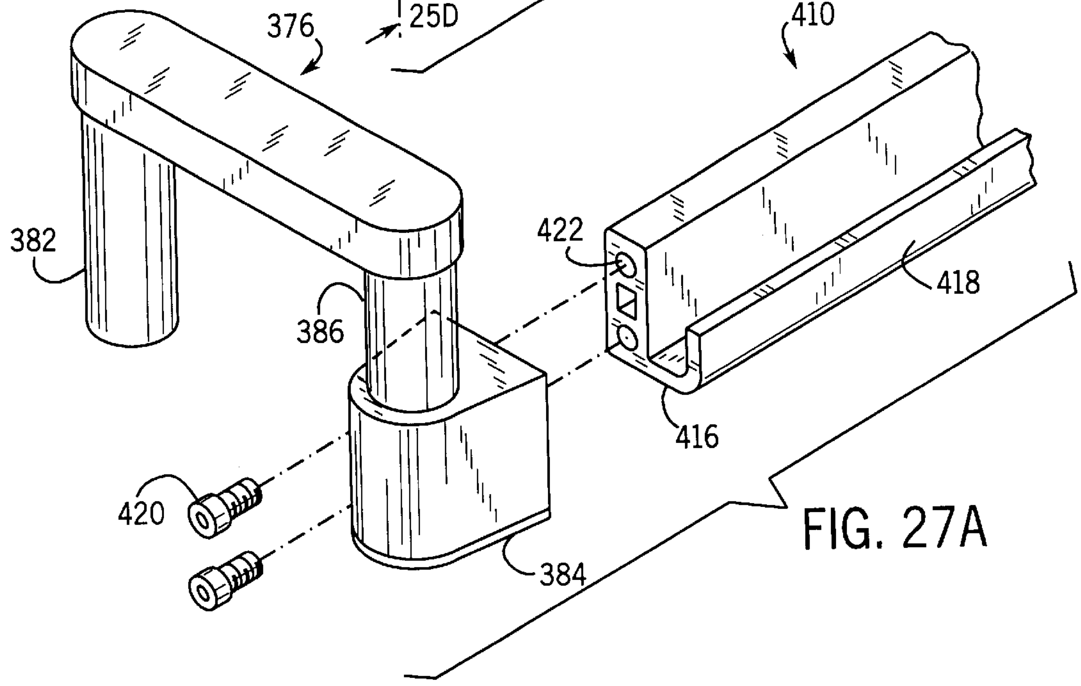
FIG. 27A

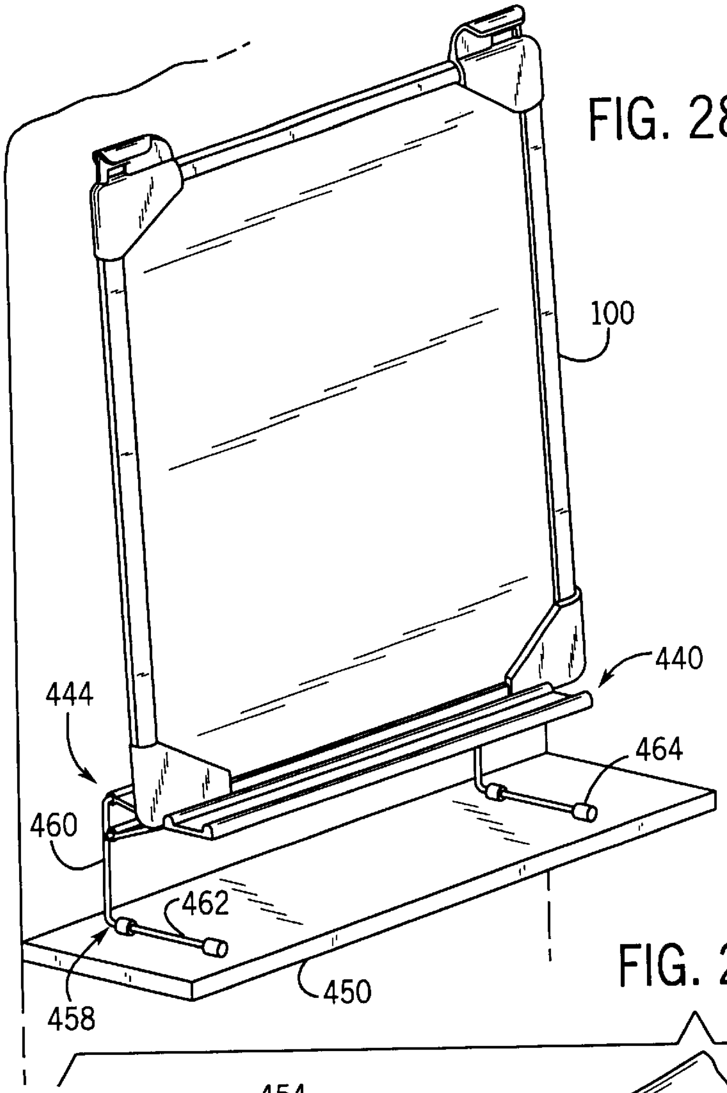
FIG. 28
FIG. 29
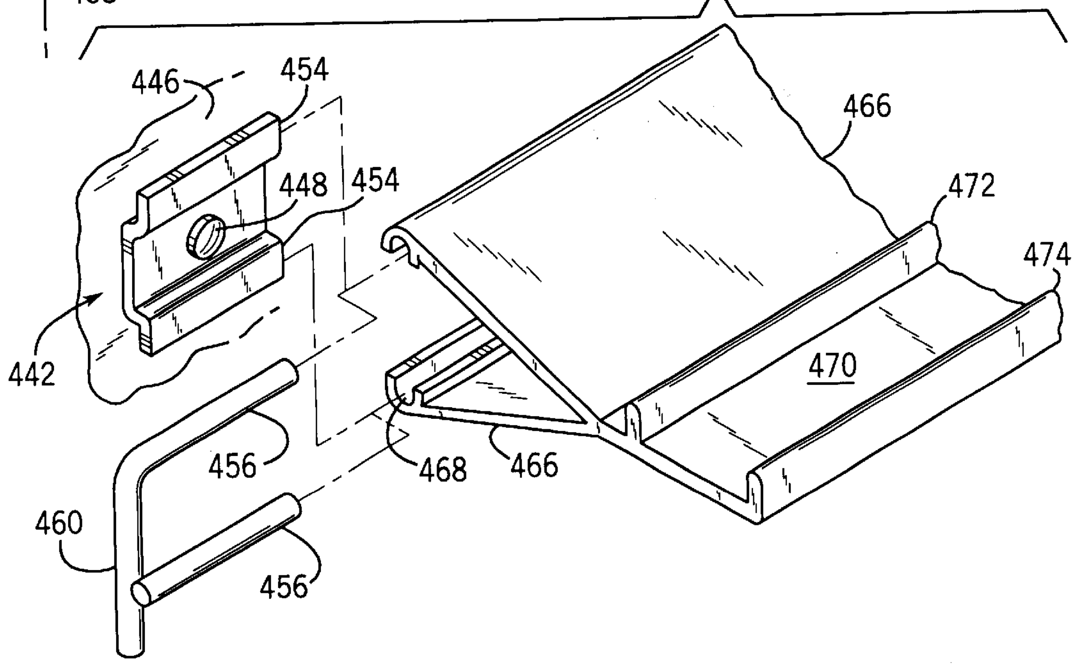

FIG. 31
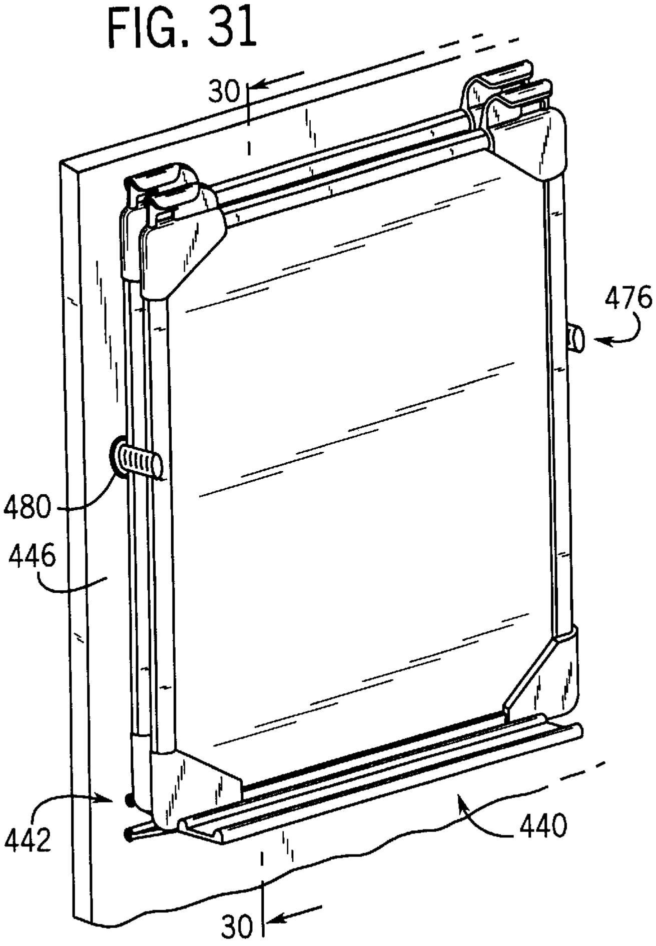
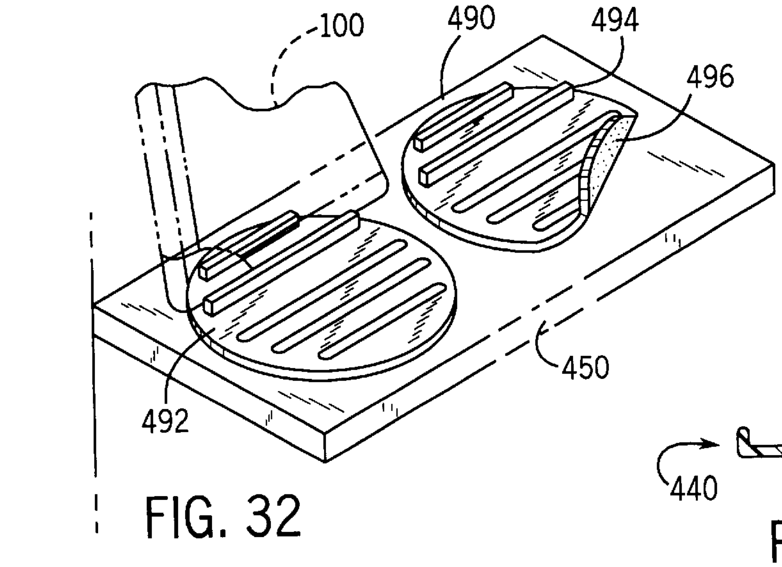
FIG. 32
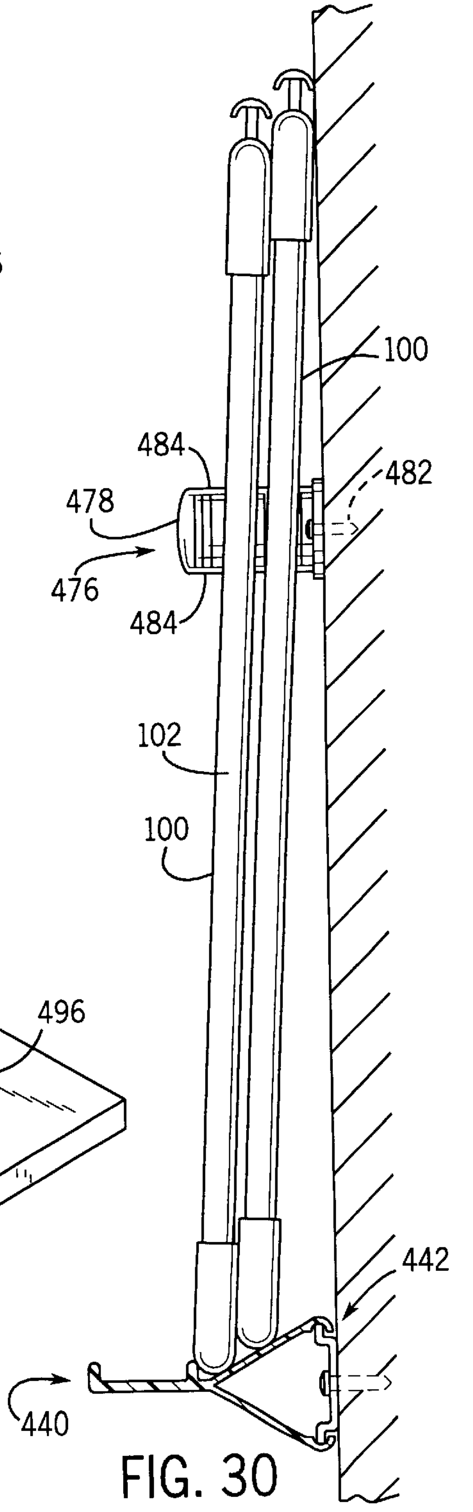
FIG. 30

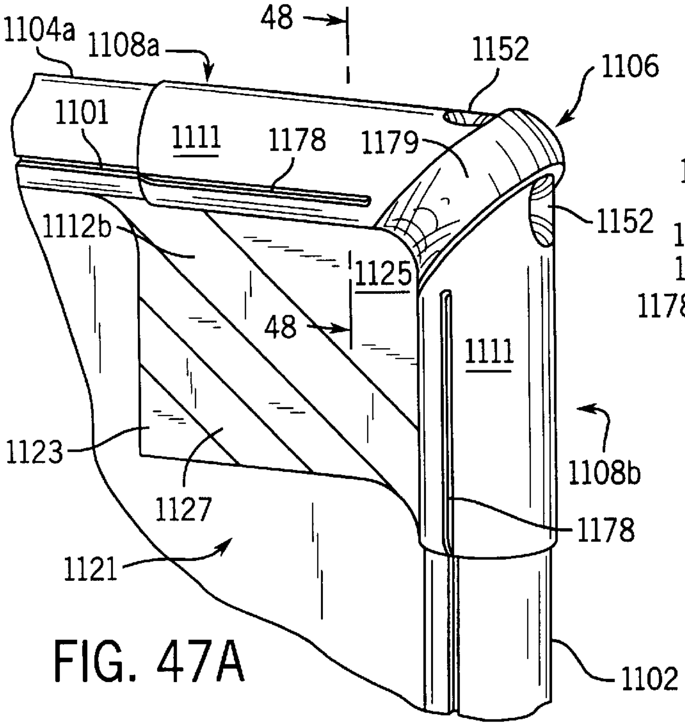
FIG. 47A
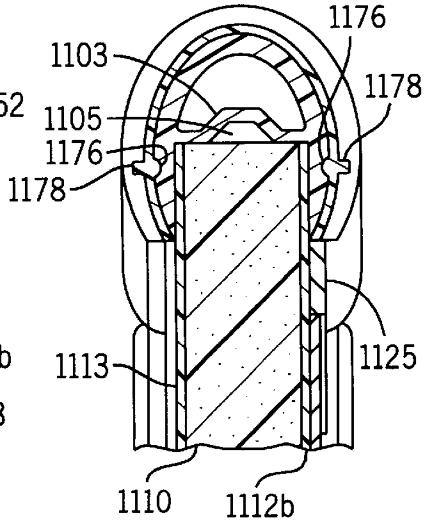
FIG. 48
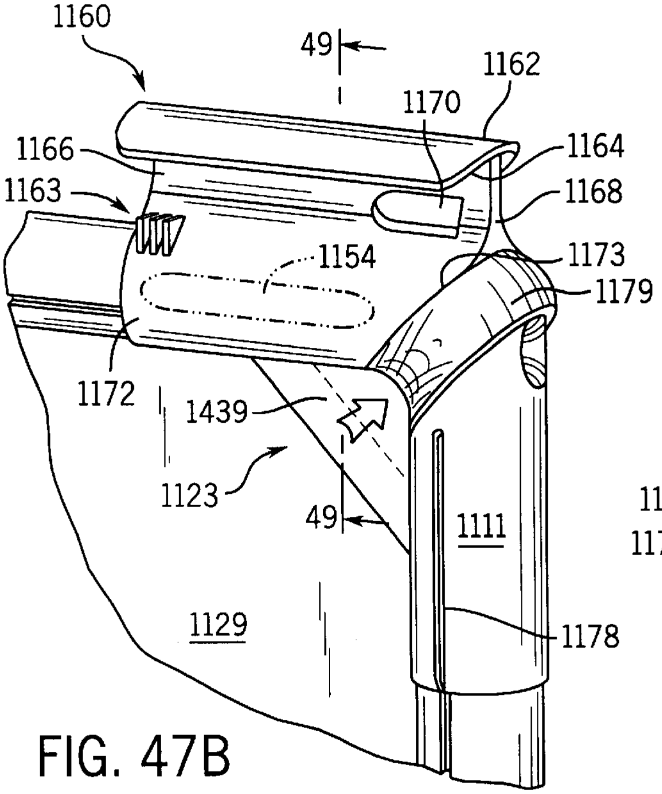
FIG. 47B
FIG. 49
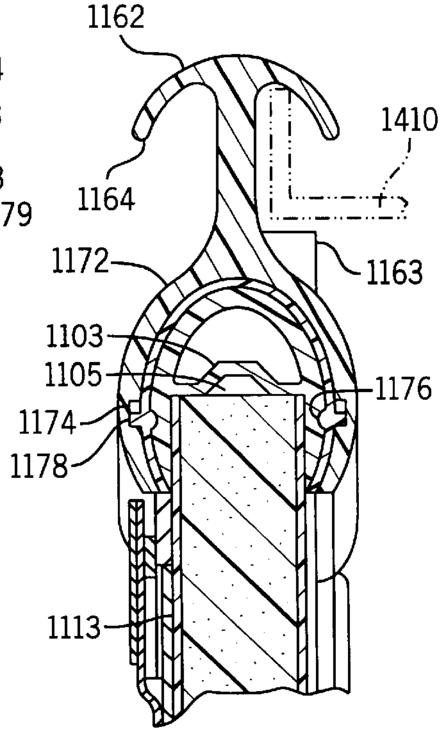

FIG. 50A
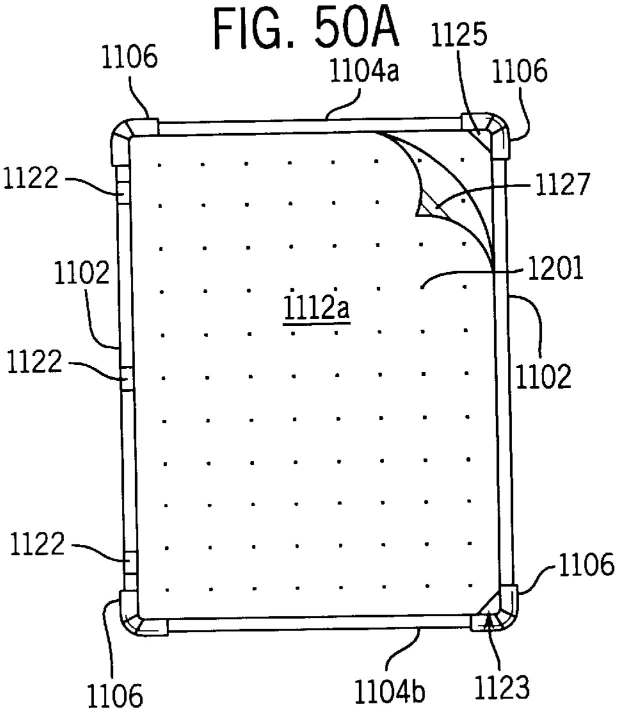
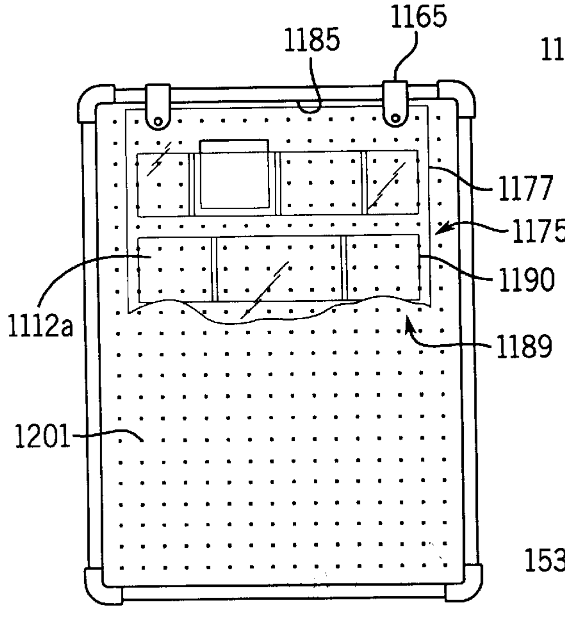
FIG. 50B
FIG. 51A
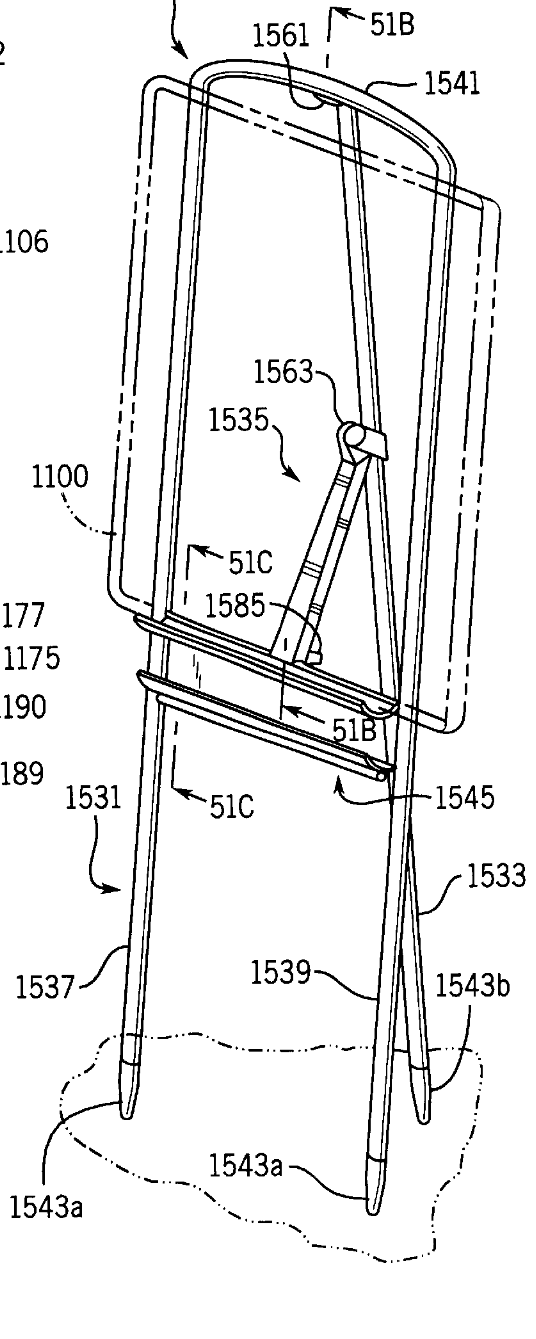

FIG. 54
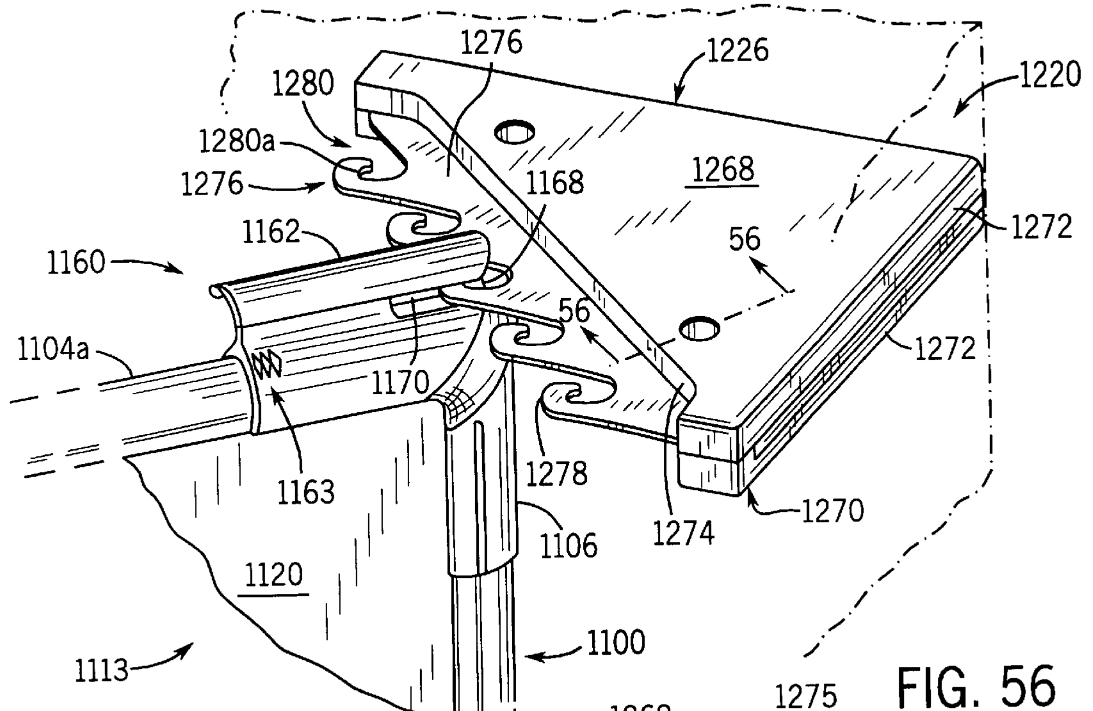
FIG. 56
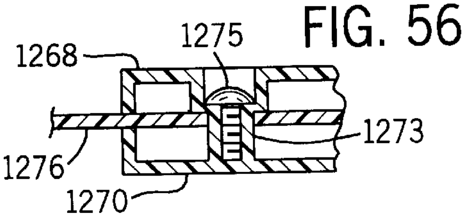
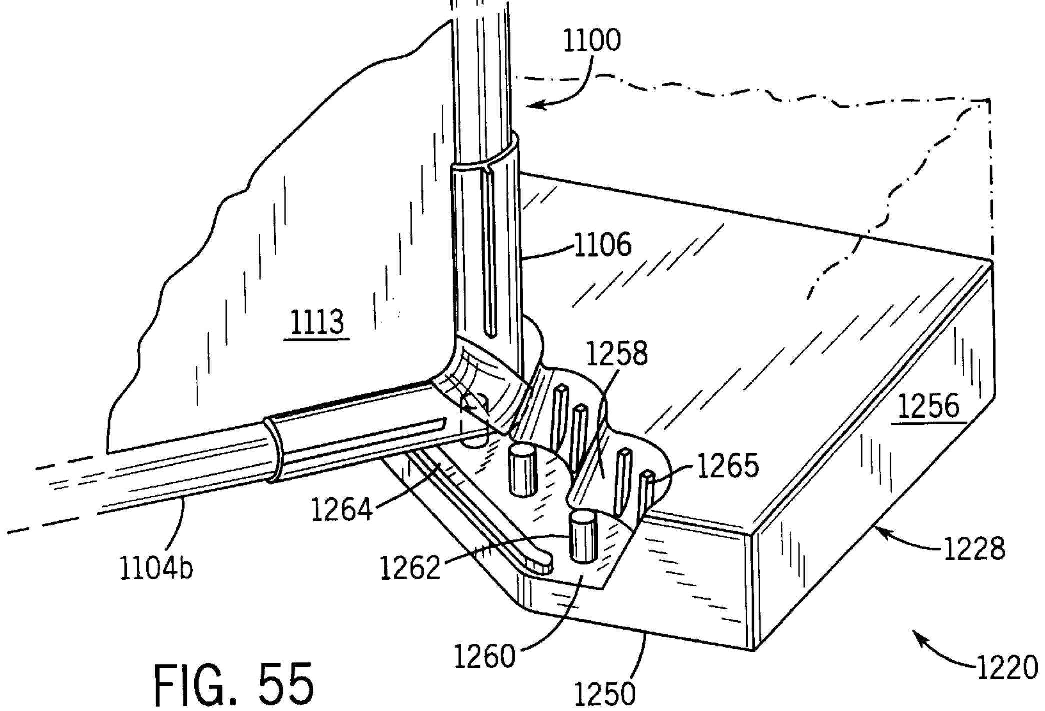
FIG. 55

FIG. 57
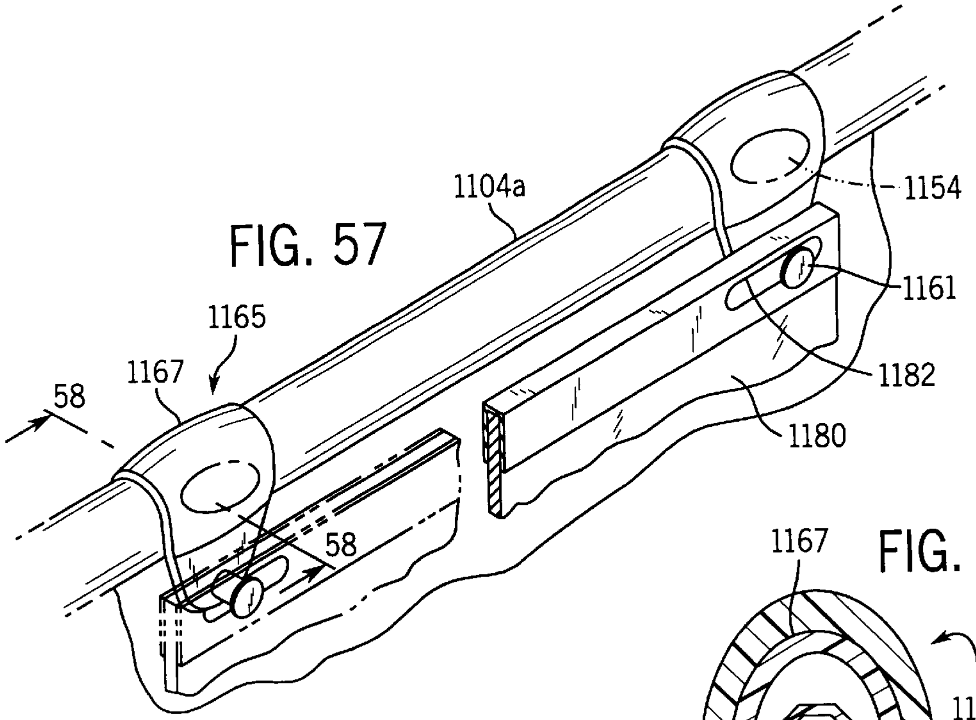
FIG. 58
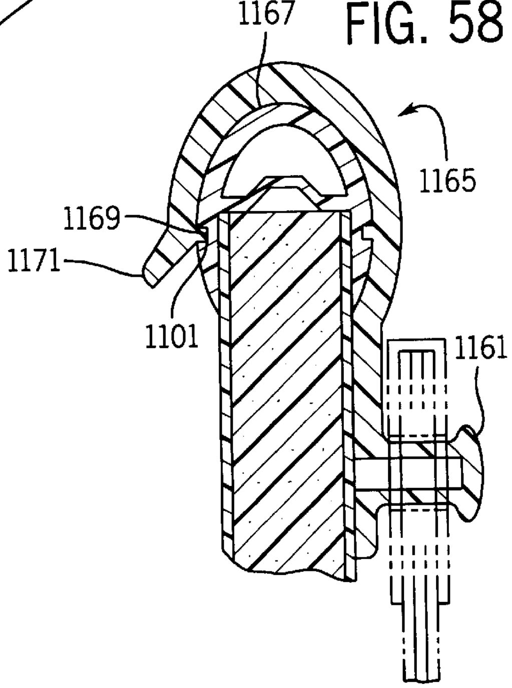
FIG. 59
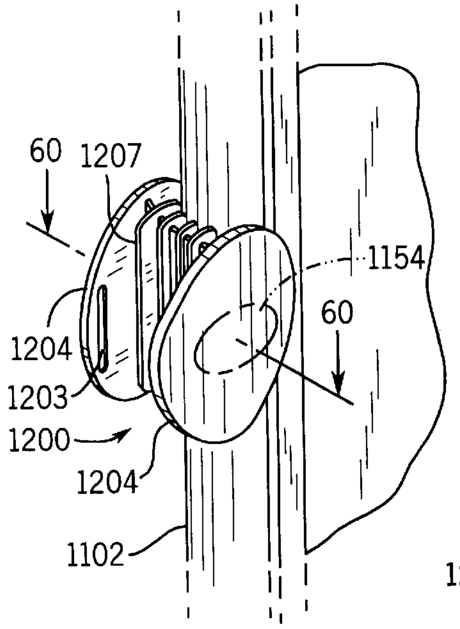
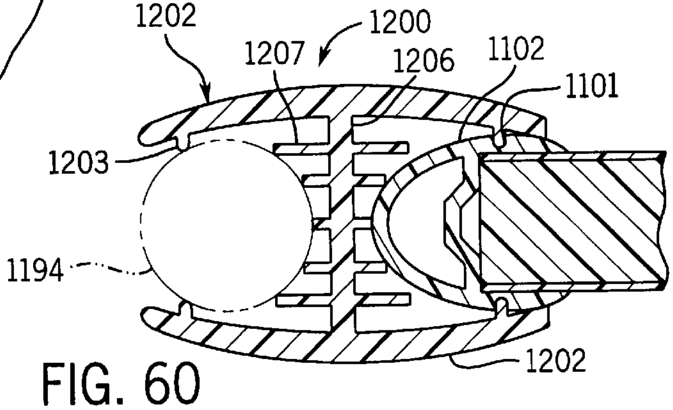
FIG. 60

FIG. 66A
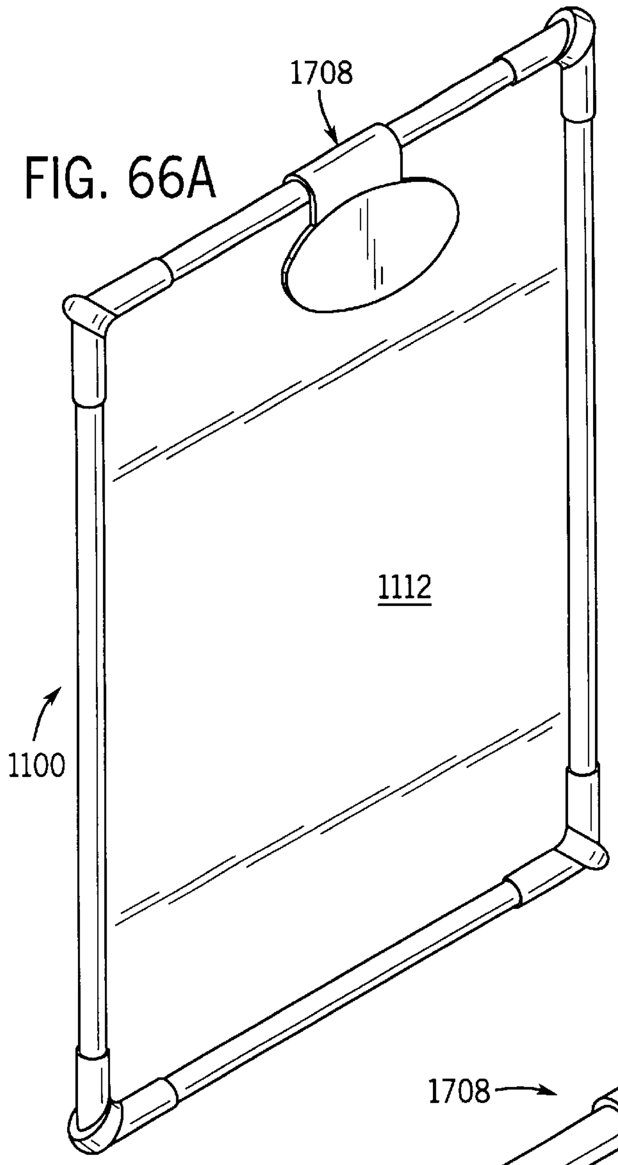
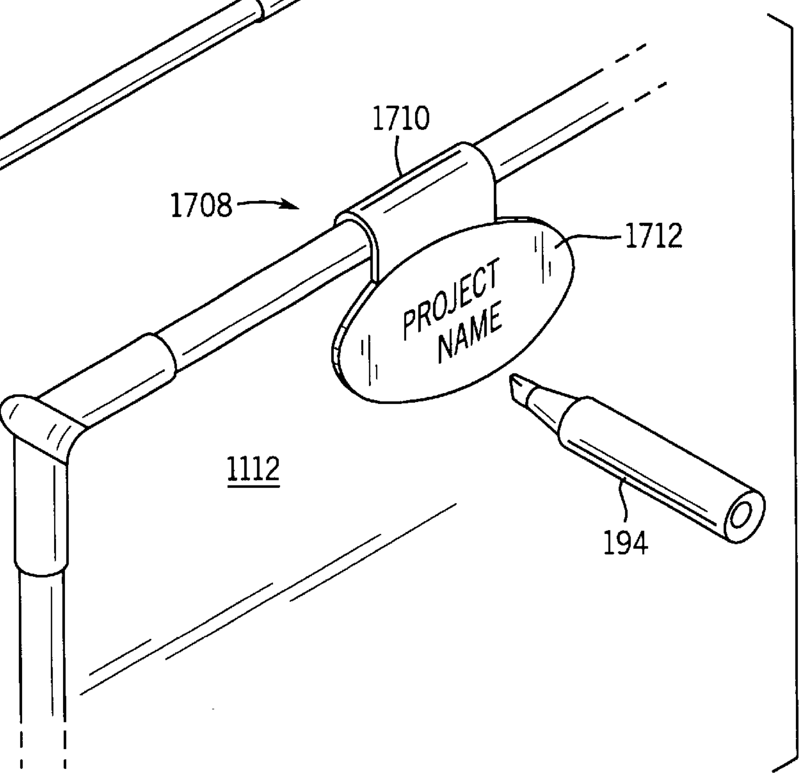
FIG. 66B

DISPLAY BOARD SYSTEM

CROSS-REFERENCE TO RELATED APPLICATIONS

The present application is a continuation-in-part of co-pending application titled "DISPLAY BOARD SYSTEM" (Ser. No. 09/182,999), filed on Oct. 30, 1998.

The following co-pending U.S. patent applications are cross-referenced and incorporated by reference herein: (a) Ser. No. 09/182,998, titled "INFORMATION DISPLAY SYSTEM"; (b) Ser. No. 09/183,023, titled "WORK STATION"; (c) Ser. No. 09/183,021, titled "WORK ENVIRONMENT"; (d) Ser. No. 09/182,997, titled "DISPLAY BOARD SYSTEM"; (e) Ser. No. 09/182,999, titled "DISPLAY BOARD SYSTEM", filed on Oct. 30, 1998; (f) Ser. No. 09/260,474, titled "INFORMATION DISPLAY SYSTEM", filed Mar. 1, 1999.

FIELD OF THE INVENTION

The present invention relates to a display board system. The present invention more particularly relates to a display board system including display boards having a variety of surface treatments and providing a variety of mounting interfaces and associated mounting structures to facilitate the use and storage of the display boards.

BACKGROUND OF THE INVENTION

It is well known to display information on surfaces, typically boards on which the information is contained. For example, information is displayed on billboards, signs, prints, posters, chalk boards, white boards, installed through mounting interfaces to mounting structures such as walls, racks, posts, stands, to name but a few known applications. In a general sense, such known applications very ably provide for the display of information. However, such known applications typically characterized either by their relative permanence or by their relative impermanence because of the surfaces on which the information is contained. For example, the mounting interfaces and associated mounting structures holding or providing for the surfaces, are generally either too rigid and inflexible, i.e. immobile and difficult to reconfigure or otherwise to use and store information, as in the case of information that is applied on a fixed wall, or too insubstantial, i.e. highly mobile but otherwise tending to put the information on display at risk of loss before it can be stored, as in the case of information that is posted on a vertical surface (e.g. a bulletin board). As a result, such known applications are generally not well suited for use in a dynamic work environment, where information is ideally created, displayed (e.g. shared and communicated) and stored in a highly efficient manner.

In an attempt to overcome the shortcomings of such known applications, the use of "display boards," discrete information-containing structures that are mounted within a work space or work environment, has proliferated. However, such known display boards have typically not been provided with mounting interfaces that facilitate the use and storage of the display boards in a manner that facilitates "information persistence"—with information on the display boards being made readily available when needed while conveniently stowed when not needed, for example, for a group project. Moreover, the surface treatments applied to such known display boards are generally limited; such known display boards have typically not been provided with a combination of useful surface treatments that allow information to be conveyed in a variety of media. Nor have such known display boards been provided with mounting interfaces and associated mounting structures in a system that facilitates the use and interchangeability of the display boards and the use, display and storage of information contained on the display boards.

Accordingly, it would be advantageous to have a display board system adapted to use, display and store information efficiently in a dynamic work environment. It would also be advantageous to have a display board system that includes display boards having surface treatments that facilitate the collection, transformation, use, display and storage of information in a wide variety of formats. It would further be advantageous to have a display board system providing display boards of a similar basic construction and format and a relatively low cost, yet readily adapted for use with a plurality of mounting interfaces. It would further be advantageous to have a plurality of mounting structures adapted to support and promote the use, display and storage of the display boards. It would further be advantageous if the mounting structures were configured to allow the efficient use, display and storage of display boards so that information contained on the display boards could efficiently be used, displayed and stored by persons in a work environment to increase productivity, particularly in the performance of groups.

SUMMARY OF THE INVENTION

The present invention relates to an apparatus for display of information in a work environment. The apparatus includes a display board having a substantially solid core and defining a first side having a first surface and a second side opposite of the first side having a second surface. The first surface has a first surface treatment and the second surface has a second surface treatment. The first surface treatment includes a reusable adhesive and a clear film cover over the reusable adhesive.

The present invention also relates to an apparatus for display of information in a work environment. The apparatus includes a display board having a substantially rigid solid core and a generally rectangular shape. The display board includes a first side having a first surface and a second side opposite of the first side having a second surface, and a first mounting structure removably attached to the display board, and a first mounting interface.

The present invention further relates to a mounting structure for at least one display board providing a first mounting interface and a second mounting interface. The mounting structure includes a first pivotal interface adapted to engage the first mounting interface of the display board, a second pivotal interface adapted to engage the second mounting interface of the display board, and a pad disposed adjacent the second pivotal interface and configured to provide a resistant force to the second pivotal interface. The display board is removably pivotally mounted within the mounting structure.

The present invention further relates to an easel for use with a first display board. The easel includes a base, a frame coupled to the base, a first panel coupled to the frame, and a tray coupled to the first panel. The first display board can be placed on display on the tray.

The present invention further relates to an easel for use with at least one display board. The easel includes a front support member, a rear support member pivotally coupled to the front support member, a collar slideably coupled to the rear support member, a horizontal member coupled to front support member, a first pivot member pivotally coupling the horizontal member and the collar; and a first planar surface coupled to the horizontal member wherein a display board is supported by the first planar surface.

The present invention relates to an apparatus for display of information in a work environment. The apparatus includes a display board with a substantially rigid core and defines a first side having a first surface and a second side opposite of the first side having a second surface. The first surface has a first surface treatment and the second surface has a second surface treatment. The first surface treatment includes a reusable adhesive and a clear film cover over the reusable adhesive.

The present invention further relates to an apparatus for display of information in a work environment. The apparatus includes a display board with a substantially rigid core and defining a first side having a first surface and a second side opposite of the first side having a second surface, the first surface having a first surface treatment and the second surface having a second surface treatment. The first surface treatment includes a reusable adhesive and the second surface treatment is a functional surface treatment.

The present invention further relates to an apparatus for display of information in a work environment. The apparatus includes a display board with a substantially rigid core and defining a first side having a first surface and a second side opposite of the first side having a second surface, the first surface having a first surface treatment and the second surface having a second surface treatment. The display board has a generally rectangular shape with a first set of corners each having a first multi-functional mounting interface and a second set of corners each having a second mounting interface.

The present invention further relates to a mounting structure for at least one display board providing a first mounting interface and a second mounting interface. The mounting structure includes a first pivotal interface adapted to engage the first mounting interface of the display board and a second pivotal interface adapted to engage the second mounting interface of the display board so that the display board is removably pivotally mounted within the mounting structure.

The present invention further relates to a mounting structure for display of at least one display board. The mounting structure includes a frame, a platform for the display board coupled to the frame, and a compliant retaining system for the display board coupled to the frame. The display board can be placed on the platform and pressed into secure engagement with the compliant retaining system.

The present invention further relates to an easel for use with at least one display board. The easel includes a base, a first frame section coupled to the base, a second frame section coupled to the base, a stowing area formed between the first frame section and second frame section, a first tray coupled to the first frame section, and a second tray coupled to the second frame section. A first display board can be placed on display on the first tray, a second display board can be placed on display on the second tray, and a plurality of display boards can be stored in the stowing area.

The present invention further relates to a mounting structure associated with an existing structure and for use with at least one display board. The mounting structure includes an articulating frame pivotally coupled to the existing structure for movement between a fully deployed position and a fully stowed position. The mounting structure also includes at least one display rack coupled to the articulating frame and providing an interface for pivotal coupling of a plurality of display boards.

The present invention further relates to an easel having a base and a support frame adapted to provide for the display of display boards on a tray coupled to the support frame. The easel includes pivotally coupling the base to the support frame and pivotally coupling the tray to the support frame.

The present invention further relates to various features and combinations of features shown and described in the disclosed embodiments.

DESCRIPTION OF THE FIGURES

FIG. 1 is a perspective view of a display board according to a preferred embodiment.

FIG. 5 is a perspective view of a display board according to an alternative embodiment with a clear film overlay.

FIG. 5A is a fragmentary perspective view of the display board of FIG. 5 showing a detail of lifting tabs.

FIGS. 9 and 10 are fragmentary perspective views of a display board according to an alternative embodiment showing a mounting arrangement.

FIG. 11 is a partially fragmentary exploded perspective view of a display board according to an alternative embodiment showing a mounting arrangement.

FIG. 12 is a sectional elevation view of the display board of FIGS. 9 through 11 taken at line 12—12 in FIG. 9.

FIG. 12A is a fragmentary sectional plan view of the display board taken at line 12A—12A in FIG. 12.

FIG. 13 is a fragmentary perspective view of a display board according to an alternative embodiment providing a universal corner member.

FIG. 14 is a fragmentary perspective view of a display board system including a storage cup clip arrangement.

FIG. 15 is a fragmentary exploded perspective view of a display board system including a coupling arrangement.

FIG. 16 is a fragmentary exploded perspective view of a display board system including a label arrangement.

FIGS. 21A and 21B are fragmentary sectional plan views of the mounting arrangement of FIG. 21 taken along line 21A—21A in FIG. 21.

FIG. 23 is a fragmentary exploded perspective view of the mounting structure of FIG. 17 including a carrier.

FIG. 23A is a fragmentary sectional elevation view of the mounting structure of FIG. 23 taken along line 23A—23A in FIG. 23.

FIG. 24 is a perspective view of a mounting structure for a display board system according to an exemplary embodiment of the present invention.

FIGS. 25A through 25C are fragmentary perspective views of the mounting structure of FIG. 24.

FIG. 26 is a fragmentary sectional elevation view of a mounting structure for a display board system according to an exemplary embodiment of the present invention.

FIG. 26A is a fragmentary exploded perspective view of the mounting structure of FIG. 26.

FIG. 27 is a fragmentary sectional elevation view of a mounting structure for a display board system according to an exemplary embodiment.

FIG. 27A is a fragmentary exploded perspective view of the mounting structure of FIG. 27.

FIG. 28 is a perspective view of a mounting structure for a display board system according to an exemplary embodiment.

FIG. 29 is a fragmentary exploded perspective view of the mounting structure of FIG. 28.

FIG. 30 is a side elevation view of a mounting structure for a display board system according to an exemplary embodiment.

FIG. 31 is a perspective view of the mounting structure of FIG. 30.

FIG. 32 is a perspective view of a mounting structure of a display board system according to an exemplary embodiment.

FIGS. 47A and 47B are fragmentary exploded perspective views of a display board showing a mounting arrangement.

FIG. 48 is a sectional elevation view of the display board of FIG. 46 taken at line 48—48 in FIG. 47A.

FIG. 49 is a sectional elevation view of the display board of FIG. 46 taken at line 49—49 in FIG. 47B.

FIG. 50A is a front elevation view of the display board.

FIG. 50B is a rear elevation view of the display board.

FIGS. 51A is a perspective view of a mounting structure for a display board system according to an exemplary embodiment.

FIGS. 54 and 55 are fragmentary perspective views of a mounting structure for a display board according to an exemplary embodiment of the present invention.

FIG. 56 is a fragmentary sectional elevation view of the mounting structure of FIG. 54 taken along line 56—56.

FIG. 57 is a fragmentary perspective view of a display board according to an alternative embodiment showing a mounting arrangement.

FIG. 58 is a sectional elevation view of the mounting arrangement taken at line 58—58 in FIG. 57.

FIG. 59 is a fragmentary perspective view of a display board system including a storage clip and coupling arrangement.

FIG. 60 is a sectional elevation view of the storage clip and coupling arrangement taken at line 60—60 in FIG. 59.

FIG. 66A is a perspective view of a display board system including a label clip according to an alternative embodiment.

FIG. 66B is an exploded fragmentary perspective view of the label clip of FIG. 66A.

FIG. 73E is a fragmentary perspective view of a display board system showing use of the eraser of FIG. 73A.

DETAILED DESCRIPTION OF THE PREFERRED EMBODIMENTS

Figure 2:
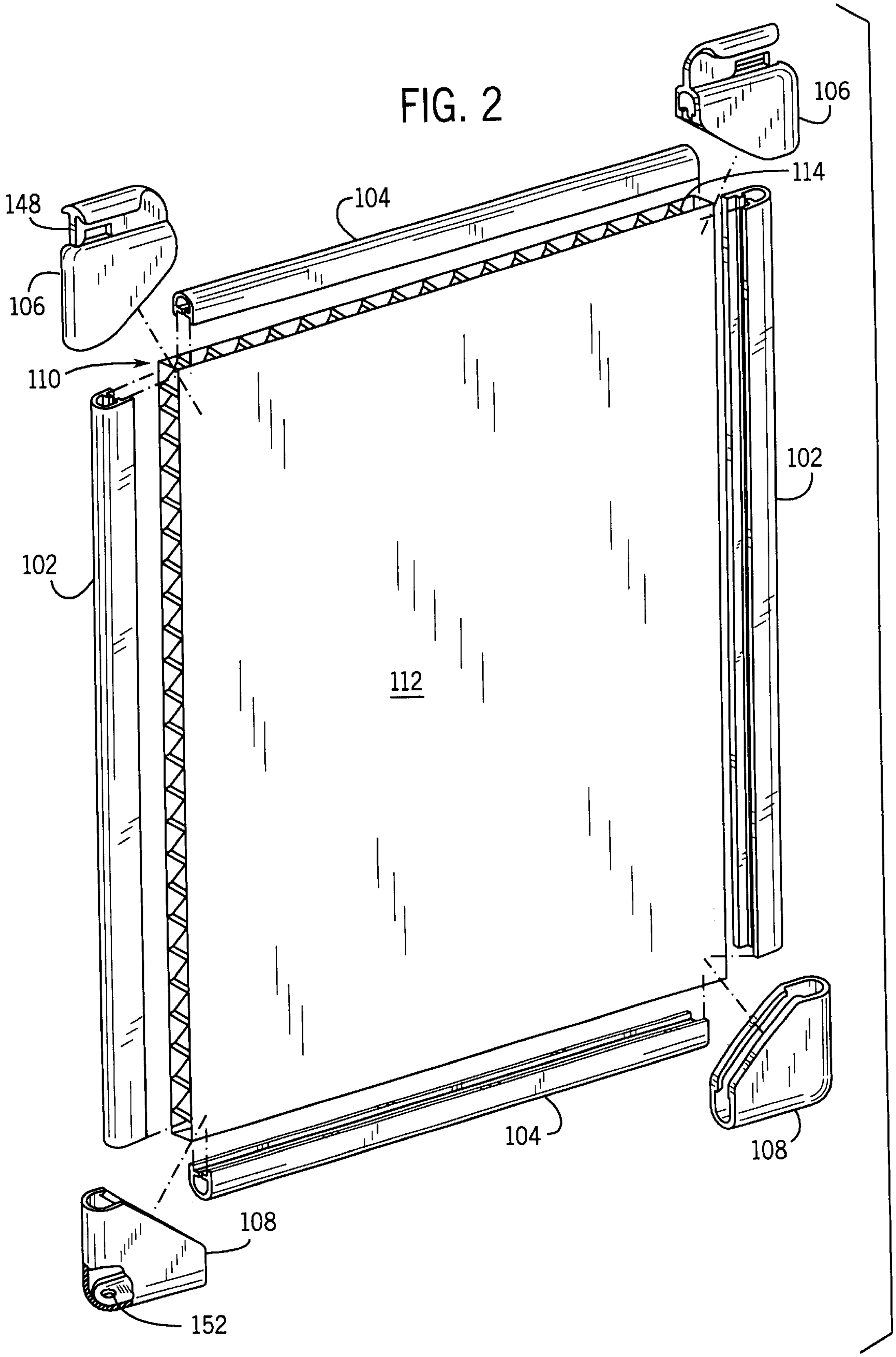
FIG. 2 is an exploded perspective view of the display board.

Referring to FIGS. 1 and 2, a display board 100 is shown according to an exemplary embodiment of the present invention. Display board 100 includes side frame members shown as extruded edge trim members 102 and top and bottom frame members also shown as extruded edge trim members 104. Display board 100 includes four corner members 106 (top) and 108 (bottom) secured to side frame members 102 and top and bottom frame members 104. Display board 100 includes a rigid core 110 providing outer surfaces, namely a front surface 112 and a back surface (not visible).

According to any preferred embodiment, the display board is configured in a generally symmetrical basic form so that the designation of a "front surface" and "back surface" is essentially arbitrary and dependent upon the orientation of the display board with respect to a person intending to use the display board. As shown in the FIGURES, and as will be apparent to those who review this disclosure, the outer surfaces of the display boards may be provided with a wide variety of functional surface treatments (e.g. tackable adhesive, clear film overlay or "photo album", clear film "pocket", writable clear film, cork or tack board, peg board, magnetic board, marker board, dry erase or "white" board, paper or paper tablet, projection screen, etc.) or decorative surface treatments (e.g. graphics display, cloth, etc.) in a wide variety of combinations (i.e. with one surface differing in whole or in part from the other surface) that may be suited or adapted to a wide variety of functional and decorative purposes according to preferred and other alternative or exemplary embodiments of the present invention. According to any preferred embodiment, the display boards are configured for ease and flexibility of use (e.g. recording, mapping, transformation, capture, etc.), display (e.g. sharing and communicating), and storage (e.g. persistence) of information, as well as of mounting and removal from associated mounting structures.

Figure 3:
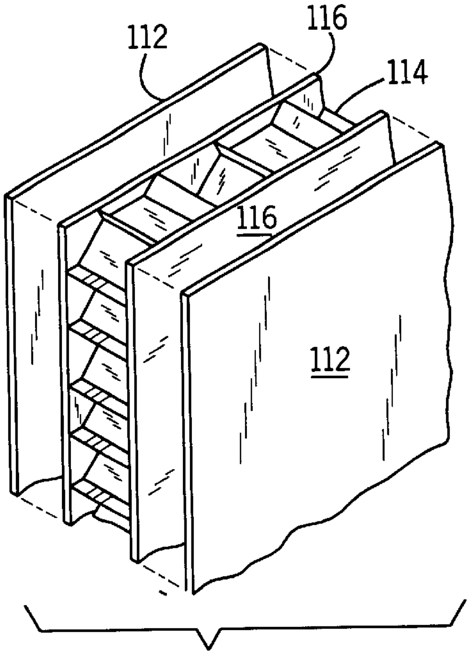
FIG. 3 is a fragmentary exploded perspective view of the display board.
Figure 4:
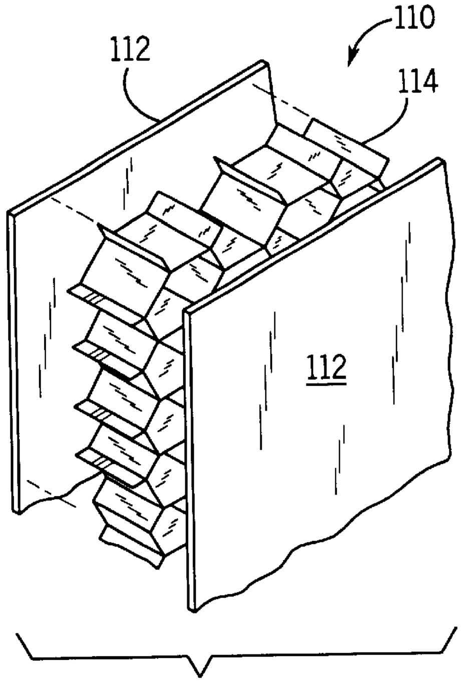
FIG. 4 is a fragmentary exploded perspective view of a display board according to an alternative embodiment.
Figure 7:
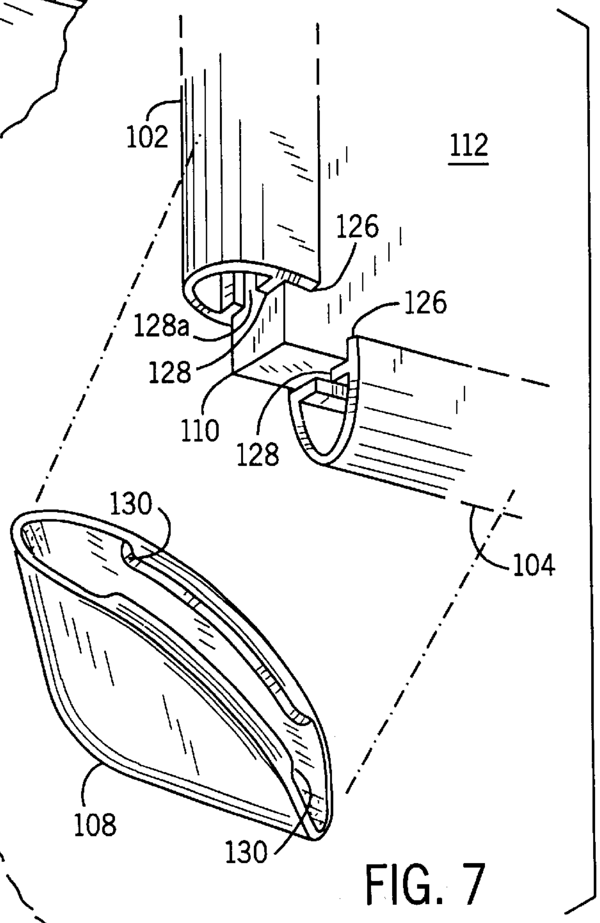
FIG. 7 is a fragmentary partially exploded perspective view of the display board of FIG. 1 showing a mounting arrangement.

As evident from FIGS. 3, 4 and 7, the rigid core of the display board may be formed of any of a variety or materials or have any of a variety of constructions. According to a preferred embodiment, as shown in FIGS. 1 through 3, rigid core 110 of display board 100 is formed of an internal honeycomb core structure 114 having an external facing sheet 116. According to a particularly preferred embodiment, the honeycomb core structure with integrated facing sheet is of a type commercially available from Tenneco Packaging, Inc. of Lake Forest, Ill. Surface 112 of display board 100 is attached to facing sheet 116 (for example, by a hot melt adhesive, or by other methods). According to an alternative embodiment, as shown in FIG. 4, rigid core 110 may be formed from an open honeycomb core structure 114 (i.e. similar to that shown in FIG. 3 but without a external facing sheet) to which surface 112 is attached. According to another alternative embodiment, as shown in FIG. 7, rigid core 110 may be formed from a solid or composite material or any other types of materials. According to any preferred embodiment, the rigid core (and associated frame members) will be of a construction that provides for a display board that is lightweight yet of sufficient structural integrity to suit its intended purposes (i.e. as may be defined by the particular surface treatment and associated mounting structures) and generally resistant to warping and bending. According to a particularly preferred embodiment, the edge trim members are made of a plastic material.

As is shown, side frame members 102 and top and bottom frame members 104 fit over and are secured to the edge of rigid core 110 (e.g. a press fit working with application of an adhesive). Corner members 106 and 108 each fit over and are joined to one of side frame members 102 and one of top or bottom frame members 104 to form a secure frame structure for display board 100. (According to a particularly preferred embodiment, the corner members and frame members are made of a plastic material and are joined by ultrasonic welding; according to alternative embodiments, the members can be joined or attached by adhesives or fastening arrangements.) As shown in FIG. 7, each of frame members 102 and 104 provides a curved exterior but includes a generally orthogonal interior receptacle **128*a* shaped to receive and retain rigid core 110. The receptacle is formed between perimeter edges 126 of each frame member 102 and 104 and a pair of inwardly disposed transverse opposed ribs 128 (generally perpendicular to perimeter edges 126 and extending along the length of each frame member). Each corner member 106 (not shown) or 108 has a generally triangular profile (although other profiles may be used according to alternative embodiments) with a curved exterior and includes an opening configured to receive a corresponding corner portion of rigid core 110 and curved exterior of each of two adjacent frame members 102 and 104. The opening includes a pair of inwardly disposed opposed fins 130 that extend along a central portion of opening between a pair of opposed receptacles (each shaped to receive the curved exterior of frame members 102 or 104). During assembly, the corner member is press fit onto the corresponding corner portion of the rigid core and over the two adjacent frame members. Corner member 108 spreads open at opposed fins 130 (slightly) while crossing frame members 102 and 104, then springs back to locate corner member 108 onto corner portion of rigid core 110**. According to a particularly preferred embodiment, the corner members are able to withstand a "drop" without damage to the display board.

Figure 8:
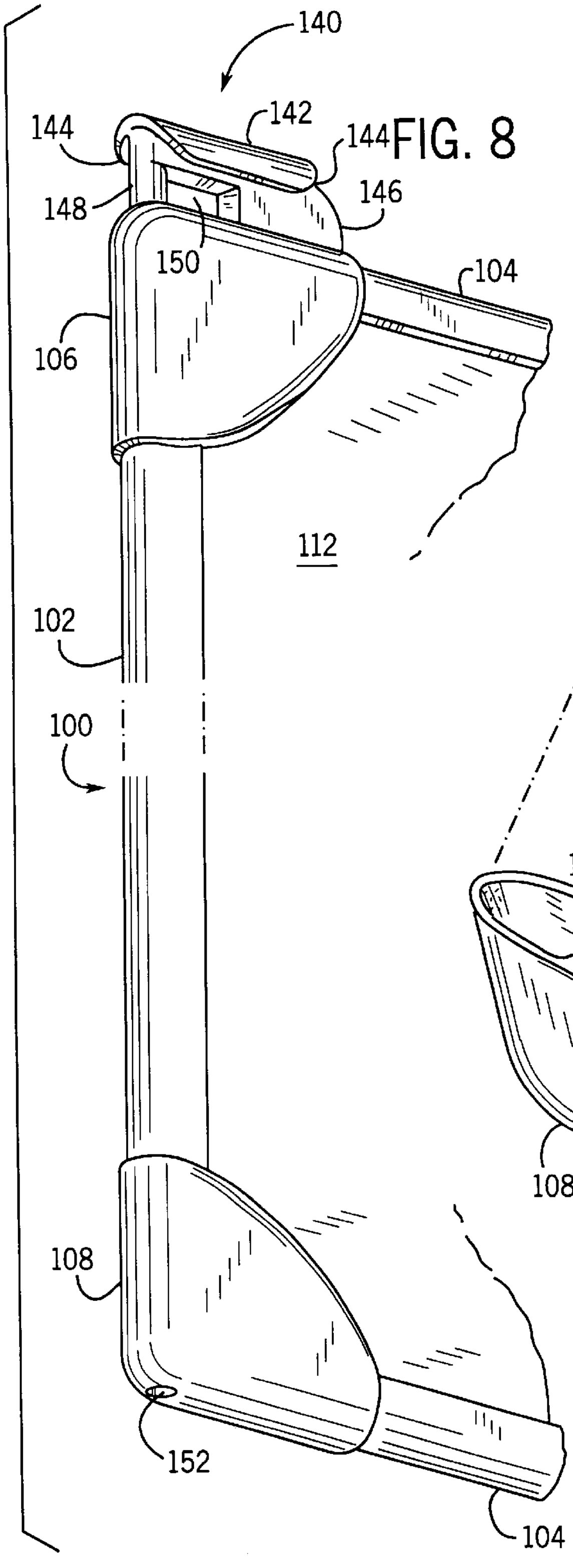
FIG. 8 is a fragmentary perspective view of the display board of FIG. 1 showing a mounting arrangement.

According to an exemplary embodiment of display board 100 shown in FIG. 8, top corner member 106 includes an mounting element shown as an integral post-hook clip 140; bottom corner member 108 includes an aperture 152. Post-hook clip 140 includes a curved top cap 142 coupled to the top of corner member 106 by a web 146. Curved top cap 142 provides two opposed hooks 144. Post-hook clip 140 also includes a post 148 formed in web 146 (adjacent to a clearance slot 150). Bottom corner member 108 includes aperture 152 configured to fit on a pivot pin (not shown). As a result, a "multi-functional" mounting interface is provided and display board 100 is suited for both for hanging (e.g. by the hook of the top corner member with the bottom corner member free of any engagement) and for pivotal mounting (e.g. through the post of the top corner member and the aperture of the bottom corner member); in addition, display board 100 is also suited for other forms of engagement or display.

Referring to FIGS. 9 through 12A, according to an alternative embodiment, top corner member 106 includes a mounting element shown as a repositionable post-hook clip 160. As shown, repositionable post-hook clip 160 is of the same basic arrangement of integral post-hook clip 140, with curved top cap 162 providing hooks 164 and web 166 supporting top cap 162 and including post 168 and clearance slot 170. Repositionable post-hook clip 160 also includes a curved base cap 172 shaped to fit over the top or side of corner member 106. Base cap 172 of post-hook clip 160 includes a pair of inwardly disposed opposed fins 174, each fin having a tab 176 at its leading edge so that when it is installed into corresponding horizontal groove **178*a* or vertical groove 178*b*, post-hook clip 160 is secured by a slot 180 at the terminal end of either of grooves 178*a* or 178*b* which engage tab 176 in a compliant (e.g. "snap") fit (see FIG. 12**A). As a result, depending upon how the repositionable post-hook clip is installed (and the direction of mounting or engagement), the display board may be engaged either in a "landscape" mode or a "portrait" mode.

Referring to FIG. 13, corner member 106 of display board 100 includes a "universal" integral mounting element 182 configured with a pair of caps 184 providing a set of hooks 186 both on the top and the side of corner member 106. Caps 184 also include a pair of opposed projections **188*a* and 188*b* both on the top and the side of corner member 106. Hooks 186 and projections 188*a* and 188*b* are configured for engagement with a mounting structure (not shown in FIG. 13). According to any preferred embodiment, the universal integral mounting element allows both for hanging attachment (e.g. by the hooks, as shown in exemplary FIGS. 26 and 27) or pivotal engagement (e.g. by projections 188*a* and 188*b*, see, e.g. FIGS. 23B and 23**C). The universal integral mounting element (e.g. providing a multi-functional mounting surface) also allows for attachment of the display board in either landscape mode or portrait mode.

Figure 6:
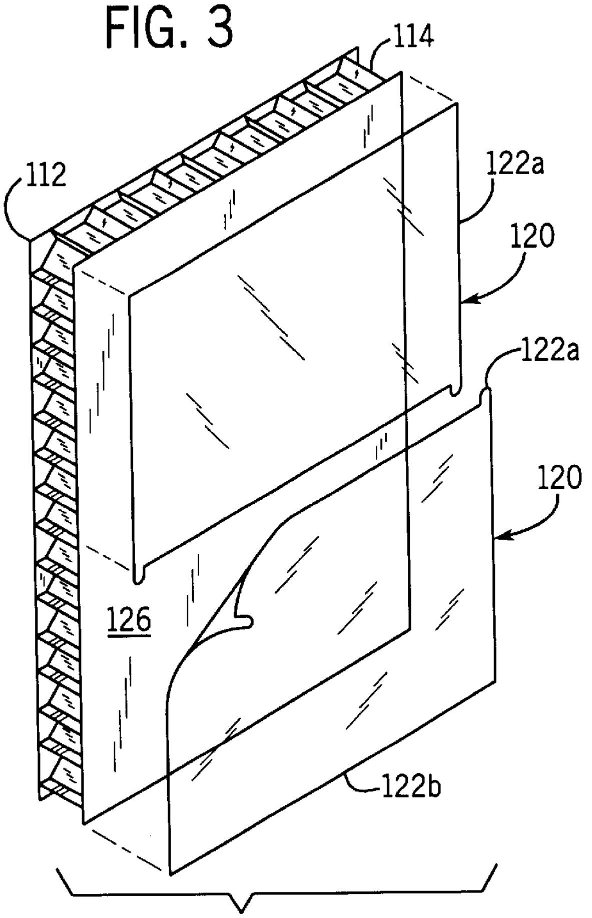
FIG. 6 is a partially exploded perspective view of the construction of the display board of FIG. 5.
Figure 5B:
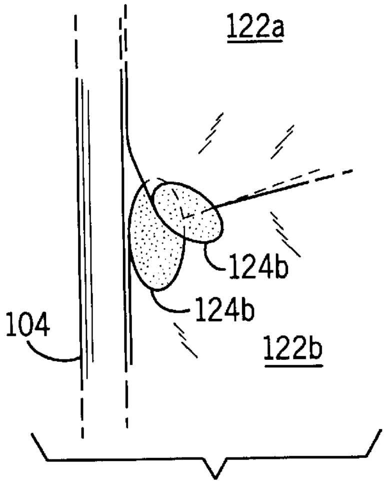
FIGS. 5B through 5D are fragmentary perspective view of the display board of FIG. 5 showing a detail of lifting tabs according to an alternative embodiment.
Figure 5C:
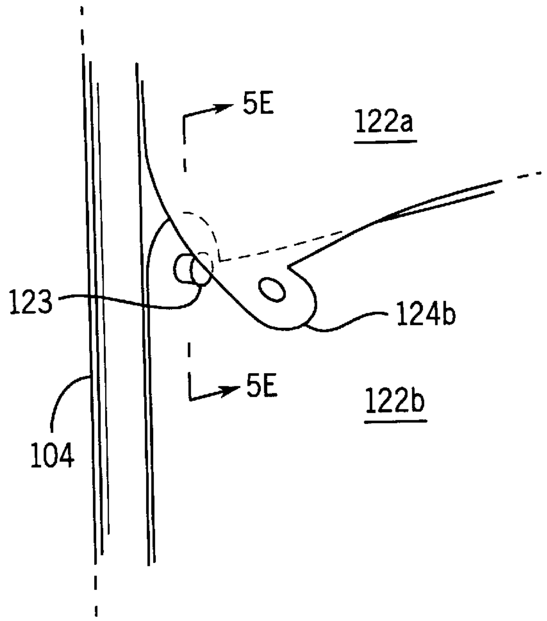
Figure 5D:
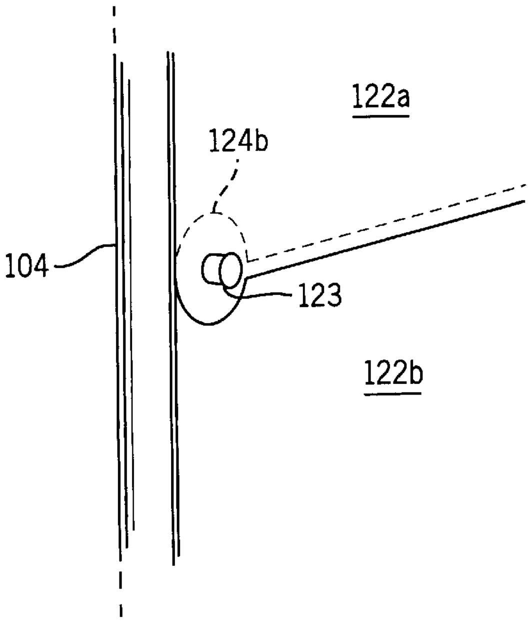
Figure 5E:
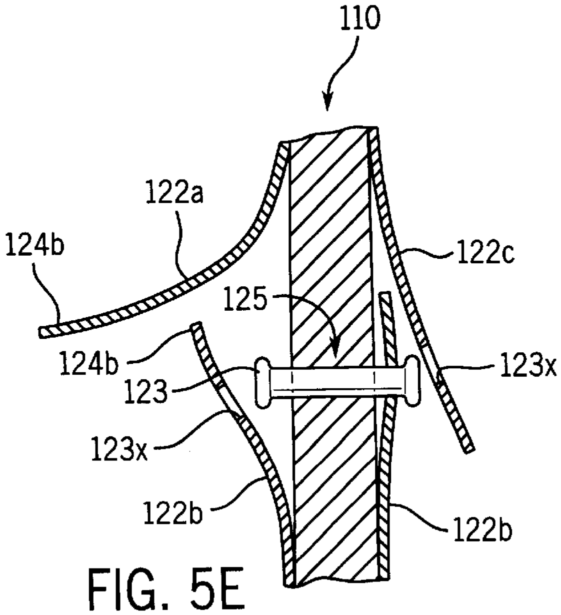
FIG. 5E is a sectional plan view of the display board of FIG. 5 taken at line 5E—5E in FIG. 5C.

As indicated, the surfaces of the display board may be provided with any of a wide variety of surface treatments, both functional and decorative, in a wide variety of combinations (i.e. one surface of a display board may have in whole or in part a different surface treatment than the other surface) and portions. According to any preferred embodiment, the surface treatment of the display boards will allow the display of one or more "layers" of information on each surface. In FIG. 1, display board 100 includes a writable surface 112 (e.g. a Melamine paper dry-erase or other "white board" surface); the other surface of the display board may have a reusable adhesive (e.g. "tacky" or repositionable posting surface treatment). As shown in FIGS. 5 and 6, display board 100 includes with a clear film cover 120 (e.g. overlay) over a tackable surface 112*b* (e.g. "photo album"). As shown, clear film cover 120 includes an upper sheet 122*a* and a lower sheet 122*b*; surface 112 (not shown in FIG. 5) beneath clear film cover 120 is provided with a light adhesive (e.g. "tackable", "tacky" or "sticky") surface treatment so that both upper sheet 122*a* and lower sheet 122*b* of clear film cover 120 and sheets of paper or other materials (e.g. "paper capture" for display beneath the clear film cover) will removably adhere to surface 112 (upper sheet and lower sheet may lift off in any direction or one, or three or more sheets may be provided according to alternative embodiments). According to a particularly preferred embodiment, each sheet of the clear film cover is made of a material that is "writable" (either permanently or erasably, i.e. reusably for a number of cycles). As shown in FIGS. 5, 5A and 5B, each sheet of clear film cover 120 may include a lifting tab 124*a* (FIG. 5A) that is of the same material as the sheet or a lifting tab 124*b* (FIG. 5B) that is of a different material or treatment than the sheet (e.g. a colored plastic flap that is more readily visible and non-adhesive). FIGS. 5C through 5E show a post 123 inserted into display board 100 that coacts with holes 123*x* to secure lifting tabs 1246 (for upper sheet 122*a* and lower sheet 122*b*) to surface 112 of display board 100. Post 123 may be inserted on one side of the display board or (as shown in FIG. 5E) may be provided in a two-headed post 125 that extends through core 110 of display board 100.

Figure 6A:
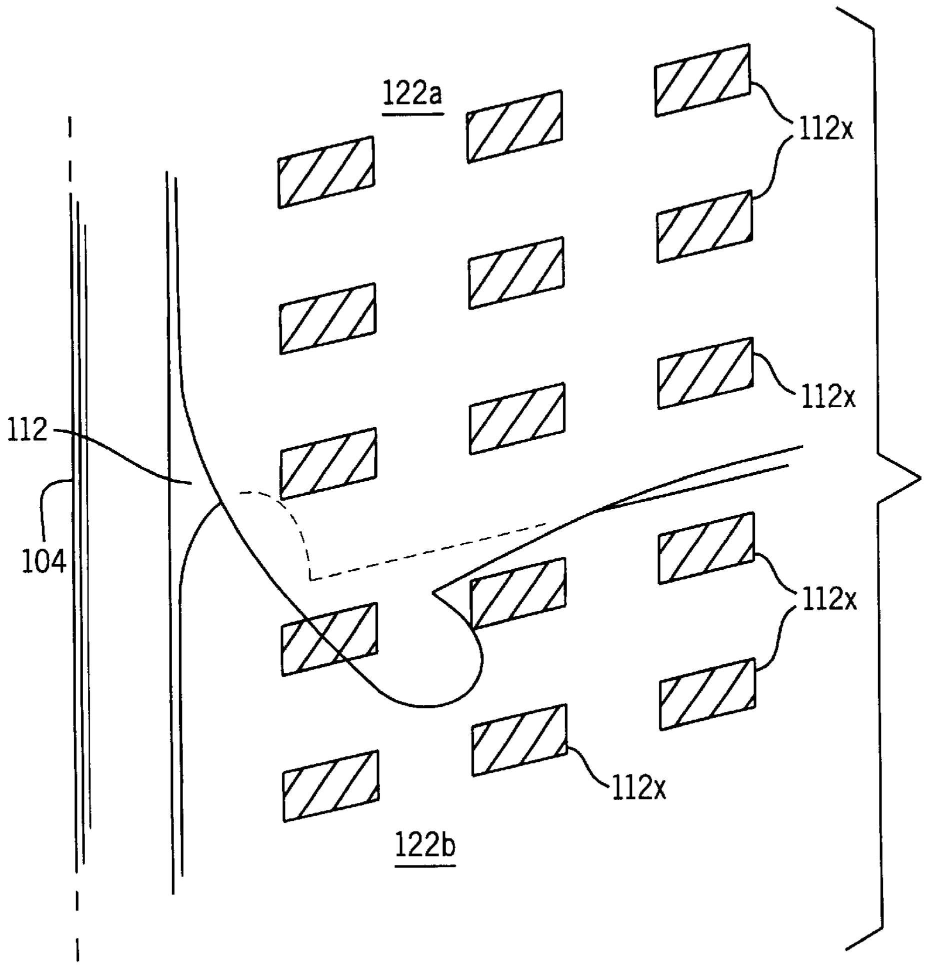
FIG. 6A is a fragmentary perspective view of a display board according to an alternative embodiment.

According to a particularly preferred embodiment, the clear film cover is a dry-erase polyester film sheet of a 0.007 inch thickness with acrylic hardcoat and 90 percent gloss level commercially available from Tekra Corporation of New Berlin, Wis. under the name MARNOT (TM). The tacky surfaces for the display boards according to particularly preferred embodiments are of a type similar to the POST-IT (TM) memoboard/bulletin board adhesive surface products commercially available from 3M Corporation of St. Paul, Minn.; "tackiness" is reduced from the typical range of 75–125 grams to a range of approximately 20–50 grams when used with display boards providing the clear film cover. Preferably, tacky (or "tackable") surface treatments will provide at least 250 cycles of "stick on" and "peel off" use (whether with the clear film cover or directly with sheets of paper or other material). According to an alternative embodiment shown in FIG. 6A, surface 112 of display board 100 is provided with a series of "tacky" (e.g. reusable adhesive) sections 112*x* sized and selectively arranged to reduce lift off force while maintaining higher tackiness; "tacky" sections could be in various shapes or patterns, such as stripes.

According to preferred embodiments, the display boards are provided in a variety of sizes, though typically in a rectangular shape suitable for use and display of information in either portrait mode or landscape mode. Typical sizes would include 34 by 46 inches or a half-size 22 by 34 inches, though many other sizes are available according to alternative embodiments. According to any particularly preferred embodiment, the display boards are sized to correspond to the standard delivery format of the materials from which they are assembled (e.g. roll widths or sheet sizes of film material or adhesive surfaces, etc.). (The core of the display board may also be provided in a variety of widths.)

FIGS. 14 through 16 show exemplary embodiments of accessories for use with one or more display boards. FIG. 14 shows a storage cup clip 190 including a cup-shaped receptacle 192 configured to contain markers 194 (shown in phantom lines) or the like. A clip portion 196 of storage cup clip 190 includes a pair of curved projections 198 shaped and sized to fit securely onto frame member 102 of display board 100. According to any preferred embodiment, the clip portion will be fit securely onto frame member (e.g. as to prevent undesired slipping or sliding along frame member when receptacle is loaded) but the curved projections will deform readily to allow both attachment and removal of the storage cup clip when desired. FIG. 15 shows a utility clip 200. Utility clip 200 provides two clip portions 202 each having a pair of curved projections 204 connected by a central web 206. Clip portions 202 are shaped and sized to fit onto frame member 102 of a display board 100*b*. As shown, utility clip 200 can be used to attach adjacent display boards 100*a* and 100*b* by their adjacent frame members (e.g. providing a display board "interlock"); alternatively, the utility clip can be used to attach a marker to a display board. According to any preferred embodiment, the clip portions of the utility clip are configured to securely attach to the frame member of the display board (or display boards) yet will readily allow for detachment. FIG. 16 shows a label clip 210 formed from a pair of curved projections 212 coupled by a flat web 214. A label 216 (e.g. a paper slip or the like) can be slid into a slot 218 formed by grooves 219 in web 214 and is held in place against frame member 102 by spring tension. As shown, label clip 210 fits securely (and removably) onto frame member 102 of display board 100 by spring tension and is made of a clear plastic material (e.g. styrene) so that label 216 is readily visible through flat web 214. According to any preferred embodiment, the clips are made of a compliant, spring-like material such as plastic, and will be provided with a mating profile, whether provided by projections or other engaging elements, that are suitably matched to the shape or construction of the corresponding frame or edge of the display boards to allow selectively for secure attachment and removal.

Referring to FIGS. 17 through 45, a variety of mounting structures for display boards are shown according to preferred and alternative embodiments of the present invention. The mounting structures are adapted to mount or stand the display boards on other structures, for example, floors, architectural walls, panel walls, systems furniture, other articles of furniture, etc. According to a preferred embodiments, the mounting structures are configured for display and use with (and storage of) the display boards shown and described in FIGS. 1 through 16. The variety of mounting structures that may be used with the display boards illustrates the flexibility and adaptability of display boards and their mounting interfaces. However, it is important to note that according to alternative embodiments that will be apparent to those who review this disclosure, the mounting structures can readily be adapted for use or interfacing (e.g. hanging, pivot mount, press fit, leaning, etc. in a variety of modes, such as landscape mode or portrait mode) with a wide variety of display boards having a wide variety of alternative sizes, shapes and constructions. It is also important to note generally that according to any preferred embodiment, the display board system is intended to promote and advance the efficient use, display and storage of information and layers of information on display boards (regardless of the format by which the information is placed on the display boards) through their mounting interfaces and associated mounting structures.

Figure 17:
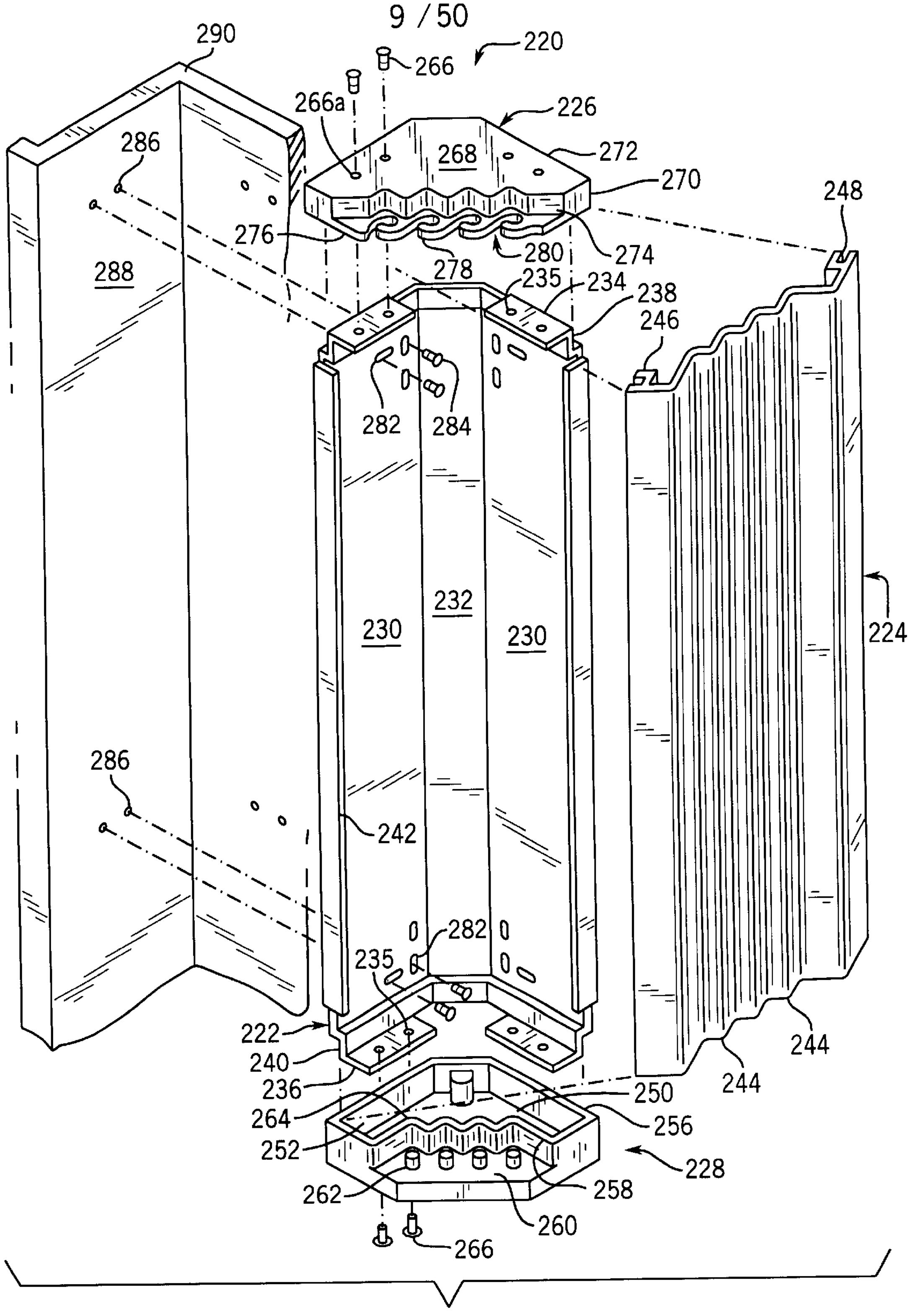
FIG. 17 is an exploded perspective view of a mounting structure for a display board system according to an exemplary embodiment.

Referring specifically to FIG. 17, a mounting structure is shown as a rack 220. Rack 220 provides a pivotal mounting interface for display boards 100 (e.g. in the manner of a flip book with ready visibility of both surfaces of display boards 100). Rack 220 includes a center frame 222 and a cover 224; rack 220 also includes a cap 226 and a base 228 securing frame 222 and cover 224 into an integrated structure. Frame 222 includes two side walls 230 and a center wall 232. Side walls 230 of frame 222 each include a top mounting tab 234 and a bottom mounting tab 236, which project horizontally from an upper ledge 238 or lower ledge 240 at the top and bottom of frame 222, respectively. Each of side walls 230 of frame 222 also include a vertical trim rail 242. According a particularly preferred embodiment, the center frame is integrally formed (e.g. folded) from sheet metal. Cover 224 includes a series of vertical corrugations 244 and has a vertical trim hook 246 within each lateral end forming a groove 248. Each vertical trim hook 246 of cover 224 is configured to engage corresponding vertical trim rail 242 of frame 222 (e.g. within groove 248), holding cover 224 onto frame 222. According to a particularly preferred embodiment, the cover is formed from an extruded plastic material. Base 228 includes a flat bottom 250 and a core 252 (above bottom) having rear and side walls 256 providing a profile configured to contain lower ledge 240 of center frame 222 and a front wall 258 providing a corrugated profile corresponding generally to corrugations 244 of cover 224 (slightly offset and larger). A horizontal ledge 260 including four vertical pegs 262 (e.g. rounded posts) extends from front wall 258 of base 228. Each bottom mounting tab 236 of frame 222 fits within core 252 of base; threaded mounting holes 235 in each bottom mounting tab 236 of frame 222 correspond to mounting holes 264 in core 252 to allow base 228 to be secured to frame 222 with threaded fasteners 266. Cap 226 includes a flat top 268 and a core 270 (beneath top 268) having rear and side walls 272 providing a profile configured to contain upper ledge 238 of center frame 222 and a front wall 274 providing a corrugated profile corresponding generally to corrugations 244 of cover 224 (slightly offset and larger). A horizontal plate 276 extends from front wall 274 of cap 226; horizontal plate 276 includes four curved hooks 278 forming four retaining slots 280 (having a narrowing retaining profile as shown). Each top mounting tab 234 of frame 222 fits within core 270 of cap 226; threaded mounting holes 235 in each top mounting tab 234 of frame 222 correspond to mounting holes 266a in core 270 to allow cap 226 to be secured to frame 222 with a threaded fastener 266 (or a thread forming fastener). According to a particularly preferred embodiment, the base and cap are formed from a plastic material.

According to any particularly preferred embodiment, the rack is adapted for mounting to a structure provided by a wall or other article (e.g. by any of a variety of conventional or other mounting arrangements). As shown in FIG. 17, each side wall 230 of center frame 222 of rack 220 contains a mounting arrangement shown as a pattern of mounting holes 282 (e.g. upper and lower set of adjustment slots) through which fasteners (shown as screws 284) are used to secure rack 220 in corresponding mounting holes 286 in a vertical structure shown as an architectural wall 288. As shown in FIG. 17, rack 220 is mounted into a corner 290 of architectural wall 288 and thus is mounted at each side wall 230 of frame 222. According to alternative embodiments, the rack can be mounted by one of its side walls against a single wall or structure providing a vertical frame, or by a wide variety of other mounting arrangements that will become apparent to those who review this disclosure; the pattern of mounting holes can be arranged to fit a wide variety of mounting structures, such as walls or frames.

Figure 18:
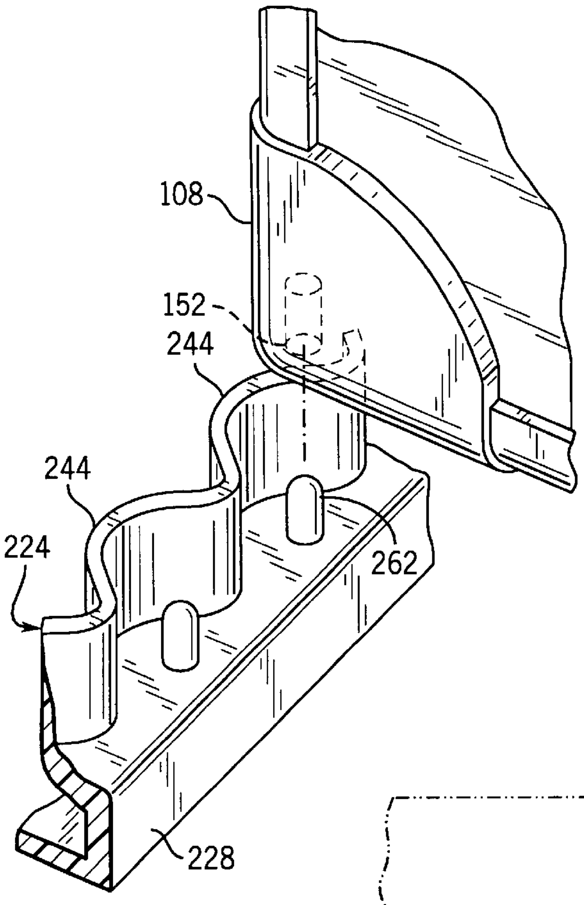
FIG. 18 is a fragmentary exploded perspective view of the mounting structure of FIG. 17 showing the installation of a display board.
Figure 20:
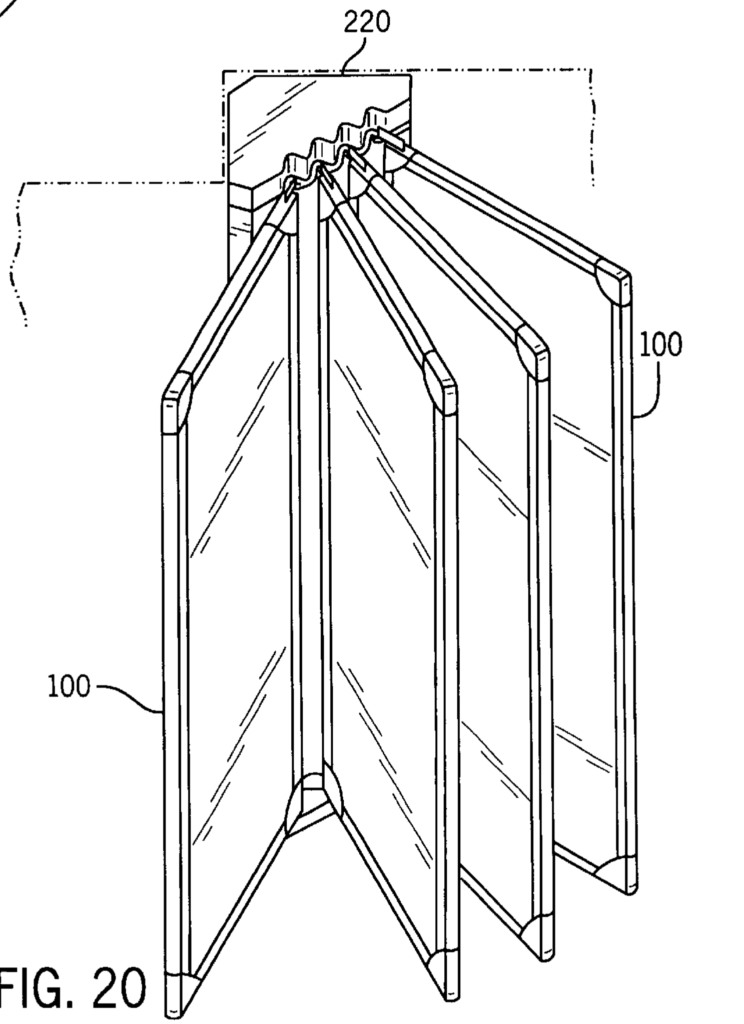
FIG. 20 is a perspective view of the mounting structure of FIG. 17 wherein a plurality of display boards have been installed.
Figure 19A:
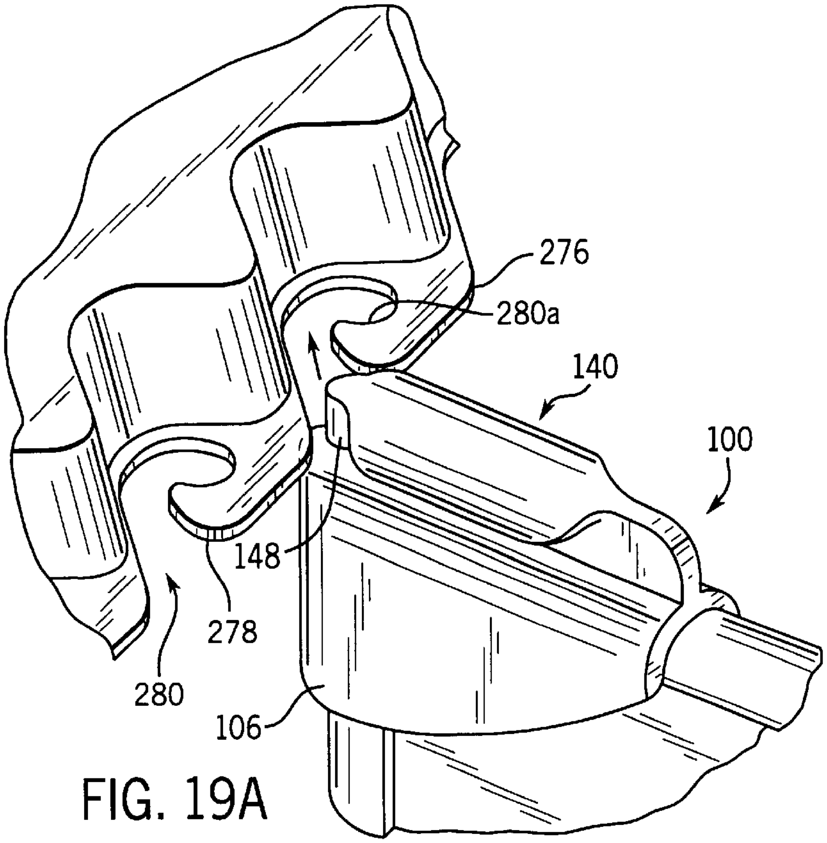
FIGS. 19A and 19B are fragmentary exploded perspective views of the mounting structure of FIG. 17 showing the installation of a display board.
Figure 19B:
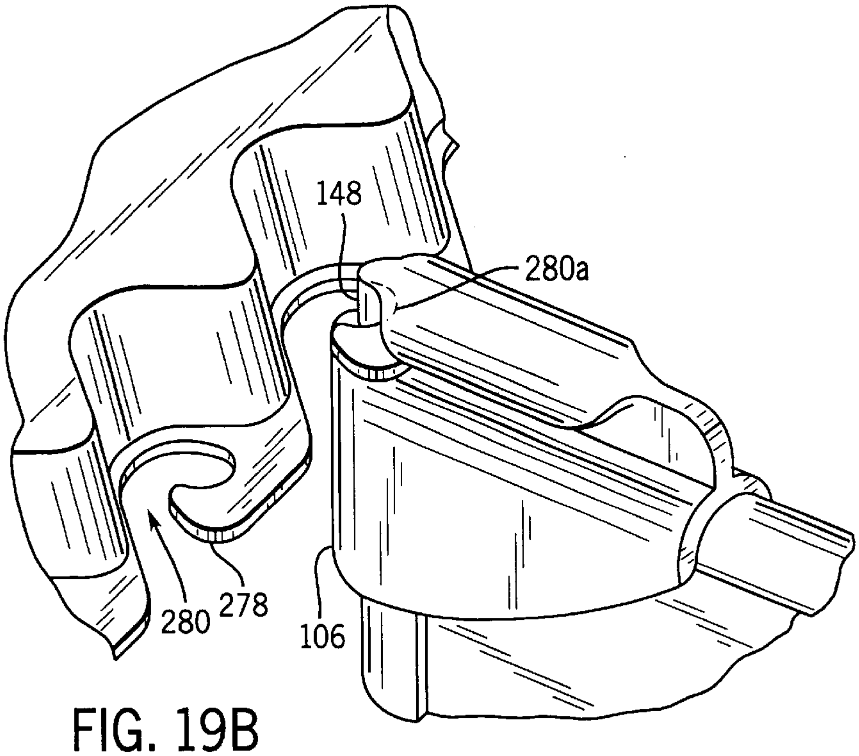

Referring to FIGS. 18 through 20, the interface between the display board system and rack 220 is shown. As is evident from FIG. 20, rack 220 provides a pivotal mounting interface for one or a plurality of display boards (four are shown as according to a particularly preferred embodiment, though according to alternative arrangements the mounting structure can provide for any number of display boards). In FIG. 18, peg 262 of base 228 of rack 220 is shown being engaged through an aperture 152 in bottom corner member 108 of display board 100. Corrugations 244 in cover 224 of rack 220 provide a guide (visual and physical) to assist the installation of display boards (e.g. to "find" peg). In FIGS. 19A and 19B, hook 278 and corresponding retaining slot 280 of cap 226 of rack 220 is shown being engaged by post 148 of top corner member 106 of display board 100. In FIG. 19A, post 148 is disengaged and at the relatively wide opening of retaining slot 280; in FIG. 19B, post 148 is engaged (e.g. "gripped") having been guided around hook 278, namely slid into and around the narrowing retaining profile of retaining slot 280, and into a secure, trapped (placement) fit at a terminus 280*a* of retaining slot 280 (e.g. terminus 280*a* has an inner diameter or profile slightly larger than an outer diameter of cylindrical post 148). The weight of the display board serves to retain the post in the terminus of the retaining slot in use (e.g. pivotal movement of the display board). According to alternative embodiments, the rack can be of a variety of sizes allowing for installation of a greater or lesser number of display boards (e.g. with more or less than four pegs and corresponding retaining slots).

Figure 21:
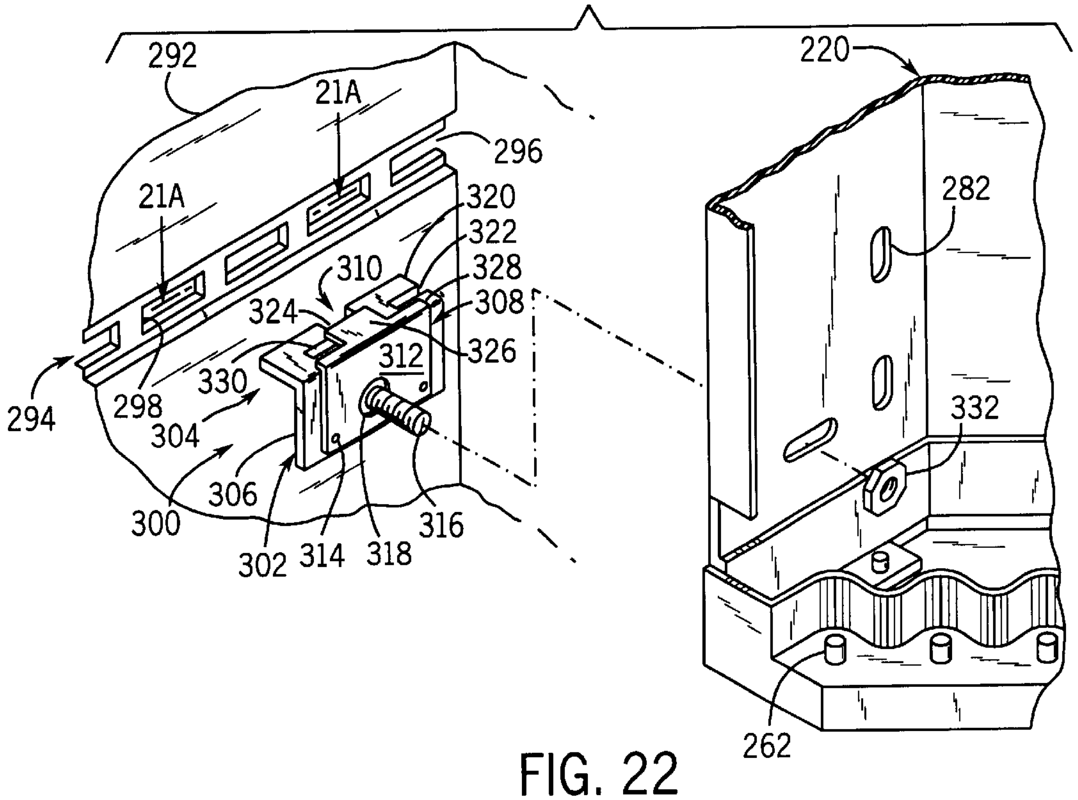
FIG. 21 is a fragmentary exploded perspective view of the mounting structure of FIG. 17 including a mounting arrangement according to an exemplary embodiment.
Figure 22:
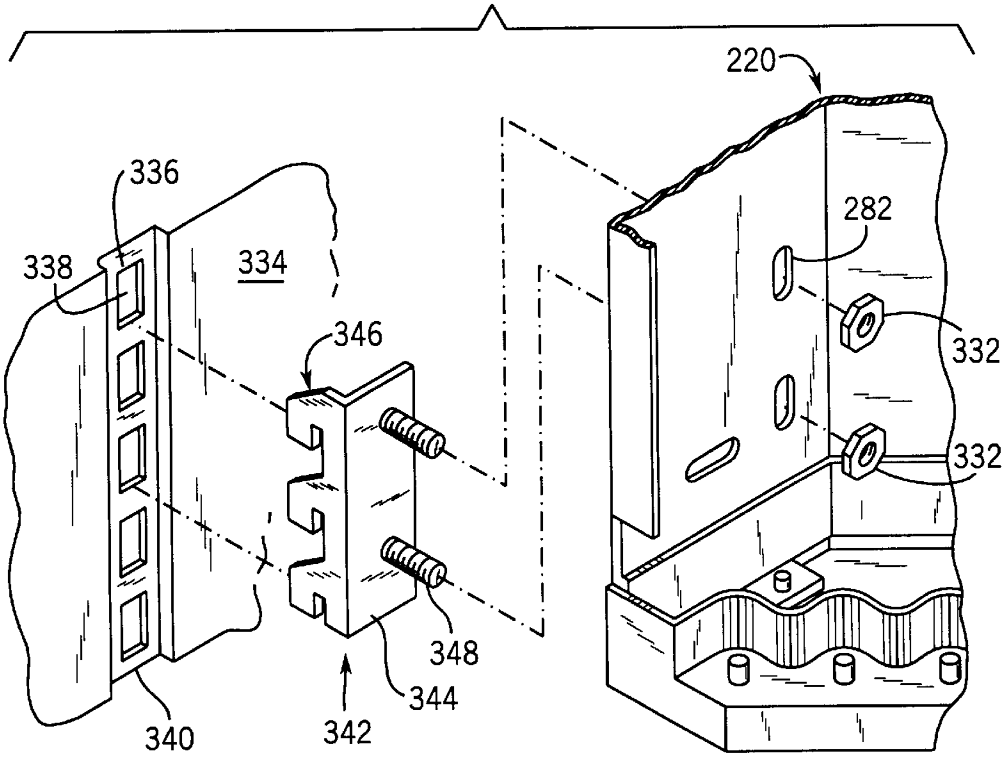
FIG. 22 is a fragmentary exploded perspective view of the mounting structure of FIG. 17 including a mounting arrangement according to an exemplary embodiment.

FIGS. 21 and 22 show exemplary mounting arrangements for securing rack 220 to a panel wall system. As shown in FIG. 21, panel wall 292 includes a horizontal slotted rail 294 including a repeating arrangement of slots 296 spaced apart by webs 298. A mounting bracket 300 is configured to mount rack 220 to panel wall 292. Mounting bracket 300 includes a base 302 (having a "L"-shaped profile with a top 304 and a side wall 306) and a spring clip 308 (also having a "L"-shaped profile with a top 310 and a side wall 312) that is joined to base 302 by welding or the like (e.g. two spot welds 314 are shown) so that the corresponding side walls are ordinarily maintained in facing contact under a holding or biasing force. A threaded rod 316 is joined to side wall 306 of base 302 and projects through an oversized aperture 318 in side wall 312 of spring clip 308. Top 304 of base 302 includes two hooks 320 each forming a retaining slot 322 separated by a gap 324; top 310 of spring clip 308 includes a tab 326 flanked by two flaps 328. Each hook 320 of base 302 of mounting bracket 300 is sized for insertion within slot 296 of horizontal slotted rail 294 of panel wall 292. As shown, a space 330 is formed between tab 326 and flap 328 of spring clip 308 within retaining slot 322 of hook 320 of base 302. Referring to FIG. 21A, mounting bracket 300 is shown inserted into horizontal slotted rail 294 prior to engagement; hooks 320 have been inserted into slots 296 (not shown) of horizontal slotted rail 294 and tab 326 of spring clip 308 rests against web 298 of horizontal slotted rail 294 so that the corresponding side walls 306 and 312 of base 302 and spring clip 308 have temporarily been urged apart. Referring to FIG. 21B, mounting bracket 300 has been securely engaged within horizontal slotted rail 294; the corresponding side walls of base 302 and spring clip 308 are in facing contact, and web 298 is retained within space 330 provided by mounting bracket 300. (Tab 326 thus secures mounting bracket 300 until spring clip 308 is separated (e.g. pried apart from base for deinstallation.) With mounting bracket 300 engaged within horizontal slotted rail 294 at the designated mounting points (e.g. upper and lower), rack 220 is cantilevered from panel wall 292. As shown, mounting between mounting bracket 300 and rack 220 is effected through a corresponding aperture (shown as a mounting slot 282 in FIG. 21) with a fastener (shown as a nut 332 in FIG. 21 to be threaded onto threaded rod 316).

Referring to FIG. 22, a mounting arrangement for securing rack 220 to a panel wall 334 having a vertical slotted rail 336 (providing a series of slots 338 spaced apart by webs 340) is shown. A mounting bracket 342 (of an "L"-shaped profile) has a base 344 and set of rearwardly projecting hooks 346 sized to fit into slots 338 and to engage webs 340 of vertical slotted rail 336; a pair of threaded rods 348 project forward from base 344 of mounting bracket 342. With mounting bracket 342 engaged within vertical slotted rail 336 at the designated mounting points (e.g. upper and lower), rack 220 is cantilevered from panel wall 334. As shown, mounting between mounting bracket 342 and rack 220 is effected through a corresponding aperture pattern (shown as mounting slots 282) with a set of fasteners (shown as a pair of nuts 332 to be threaded onto each threaded rod 348). According to a particularly preferred embodiment, the mounting bracket may include a spring clip or other locking member.

Figure 23B:
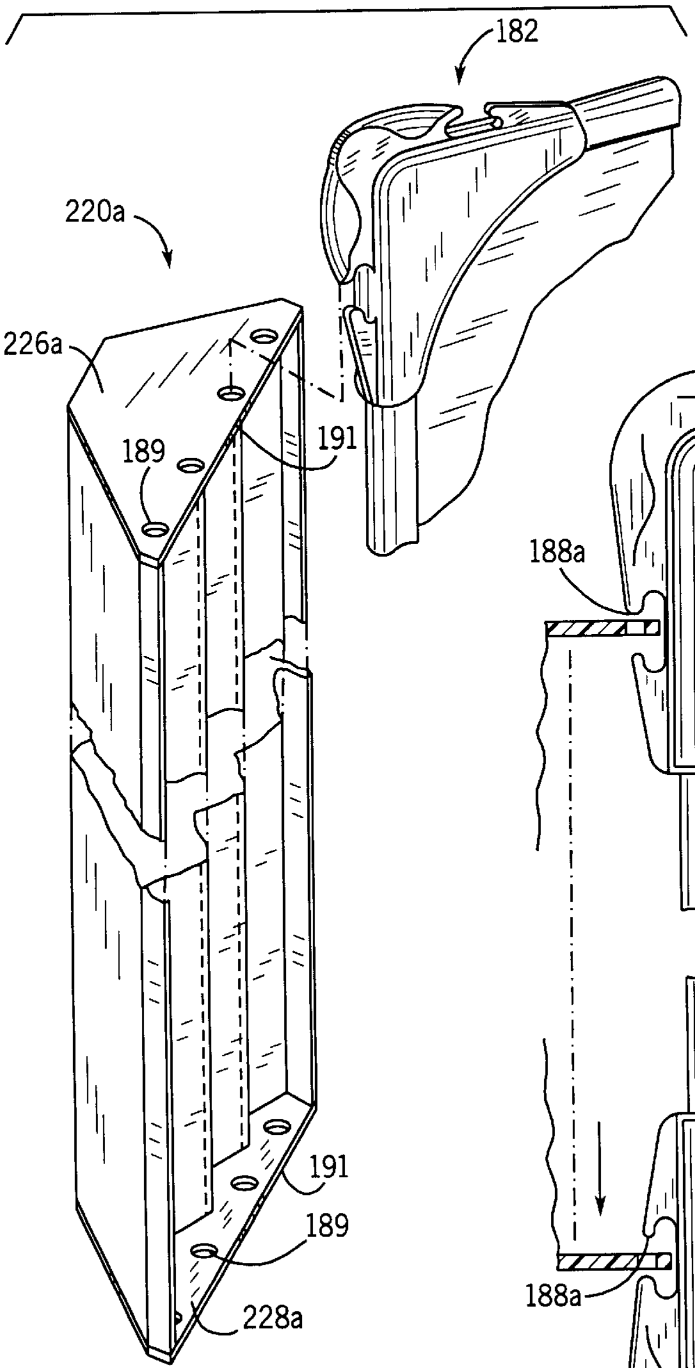
FIG. 23B is an exploded perspective view of a mounting structure for a display board system according to an alternative embodiment adapted to provide an interface for the display board of FIG. 13.
Figure 23C:
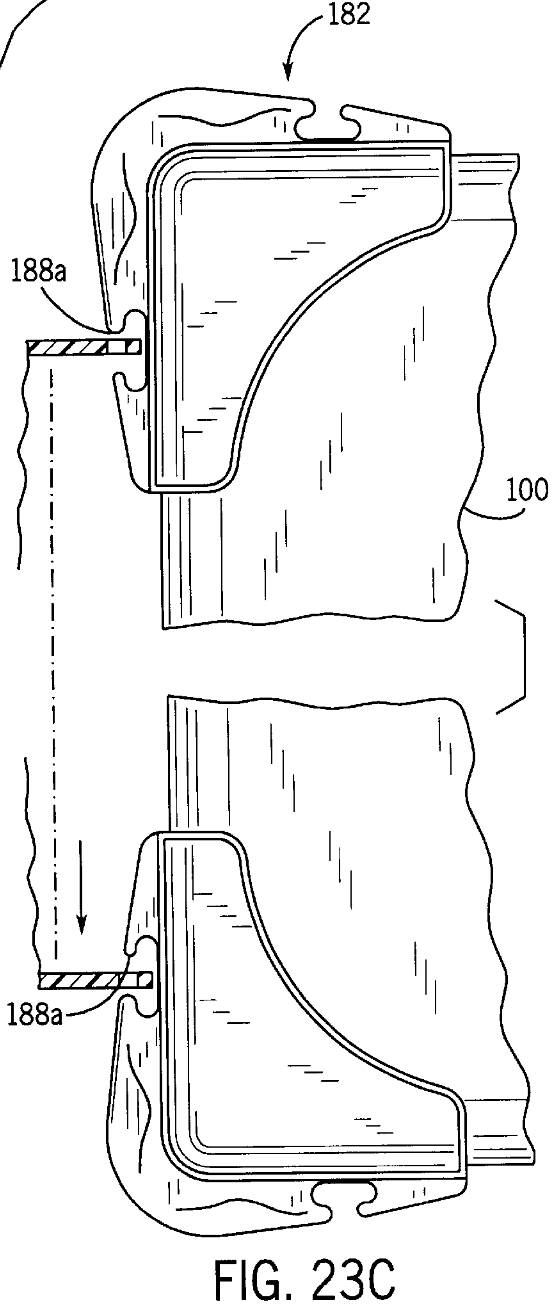
FIG. 23C is a fragmentary elevation view of the mounting structure of FIG. 23B.

Referring to FIGS. 23 and 23A, a storage tray 350 for a rack 220 is shown (along with a mounting interface). Storage tray 350 includes a horizontal floor 352 having a ledge or rim 354 and vertical walls (e.g. a back wall 356 and two side walls 358). Each of the vertical walls of storage tray 350 includes a vertical peg 360 that can be securely press fit into a corresponding aperture 362 in the bottom of base 228 of rack 220. When storage tray 350 is installed onto base 228 of rack 220 tools (shown in phantom lines as a marker 194 and an eraser 195) can be stored or removed through a front opening 366 between rim 354 and the bottom 364 of base 228. According to an alternative embodiment shown in FIGS. 23B and 23C, a modified rack 220*a* with cap 226*a* and base 228*a* providing apertures 189 from a web 191 accommodates the display board mounting interface shown in FIG. 13.

Referring to FIGS. 24 through 27, a mounting structure is shown as a rail system according to exemplary embodiments. Referring to FIG. 24, rail system 370 is adapted to provide a generally horizontal rail 372 (for hanging display boards 100 from a panel wall 374 or similar structure) having at each end a pivotal mounting interface shown as a self-adjusting hook assembly 376. Hook assembly 376 includes a hook 378 (formed from a horizontal cap 380 with a downwardly projecting peg 382) pivotally coupled to a end fitting 384 through a pivot post 386 (e.g. peg).

Figure 25D:
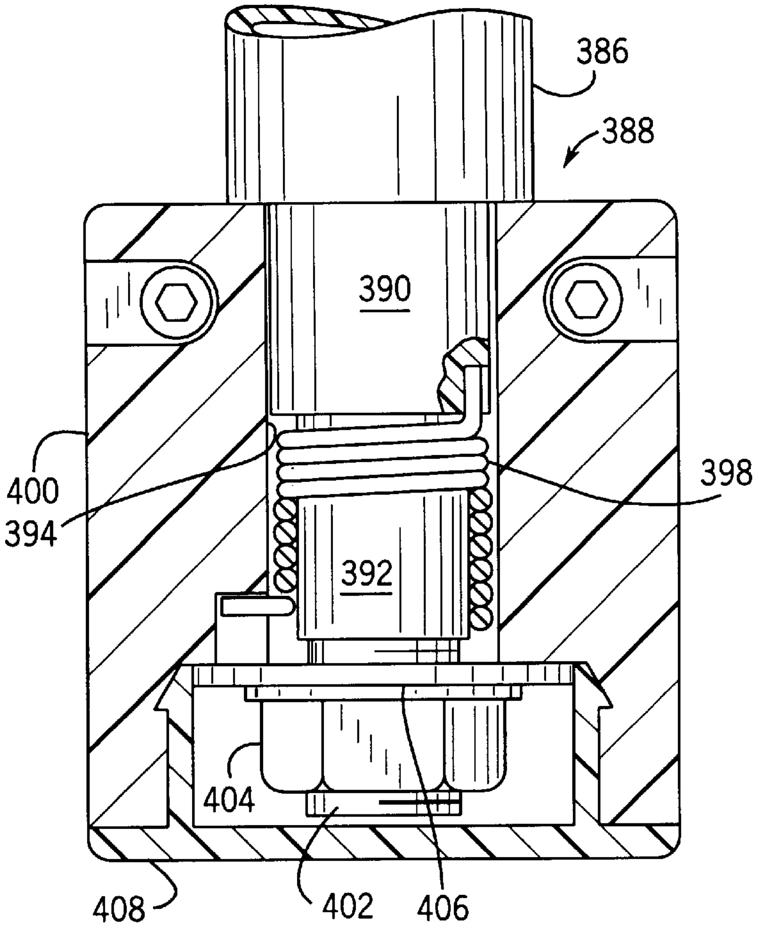
FIG. 25D is a fragmentary sectional elevation view of the mounting structure of FIG. 24 taken at line 25D—25D in FIG. 26A.
Figure 33G:
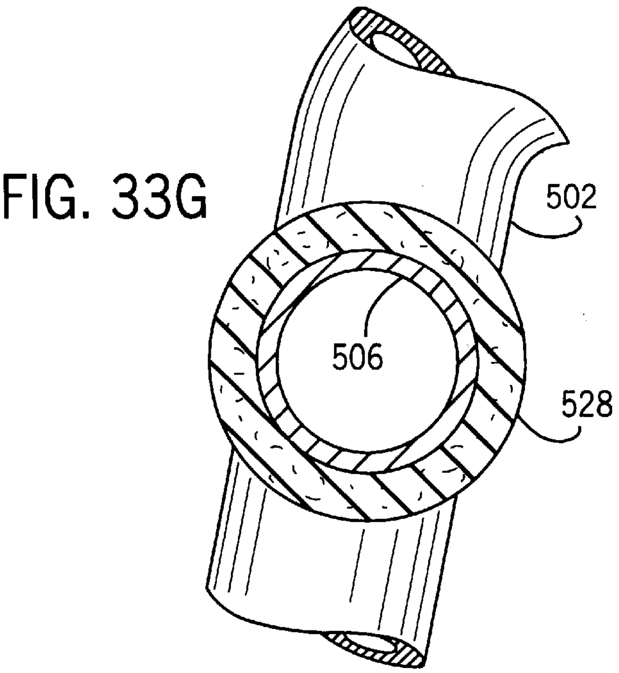
FIG. 33G is a sectional elevation view of a board pad of the mounting structure taken at line 33G—33G in FIG. 33A.
Figure 33A:
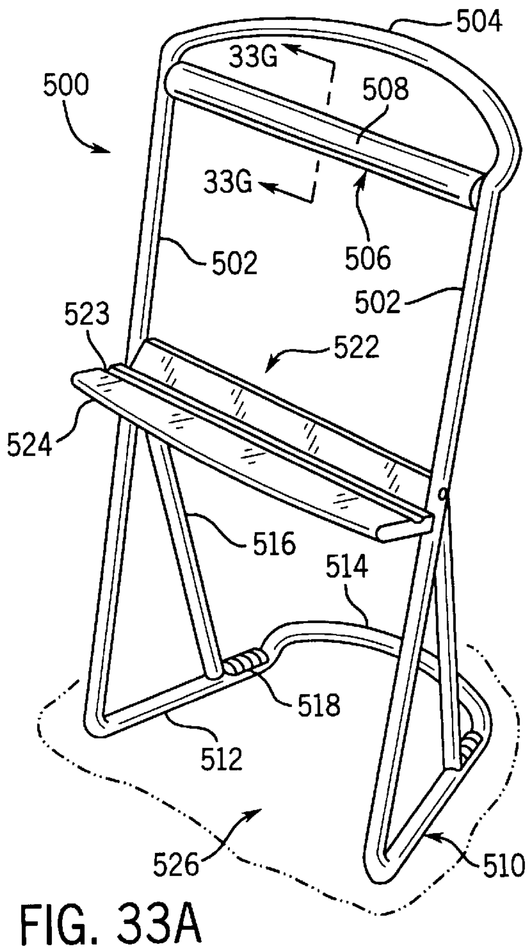
FIGS. 33A through 33C are perspective views of a mounting structure for a display board system according to an exemplary embodiment.
Figure 33B:
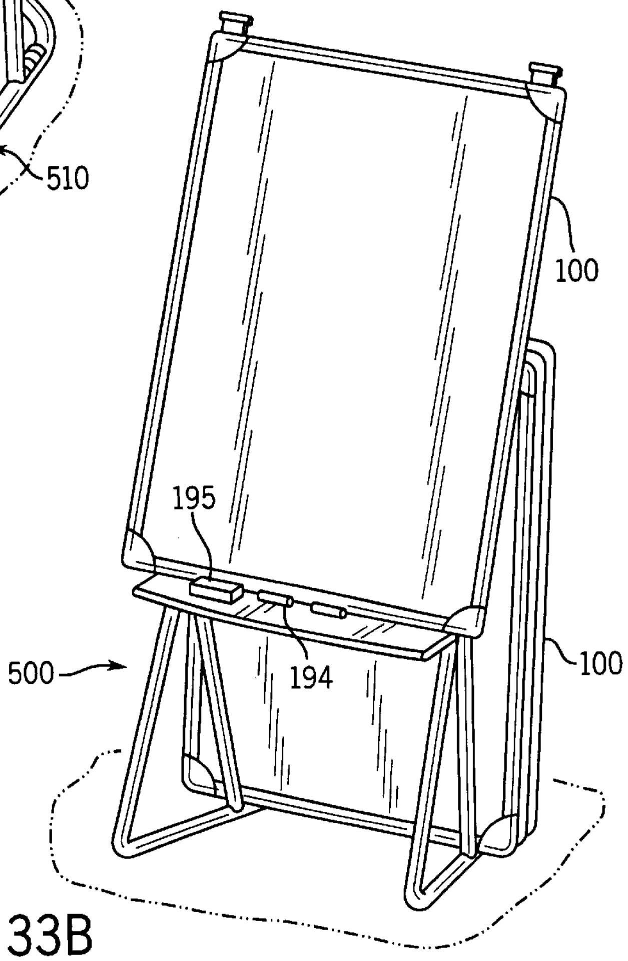
Figure 33C:
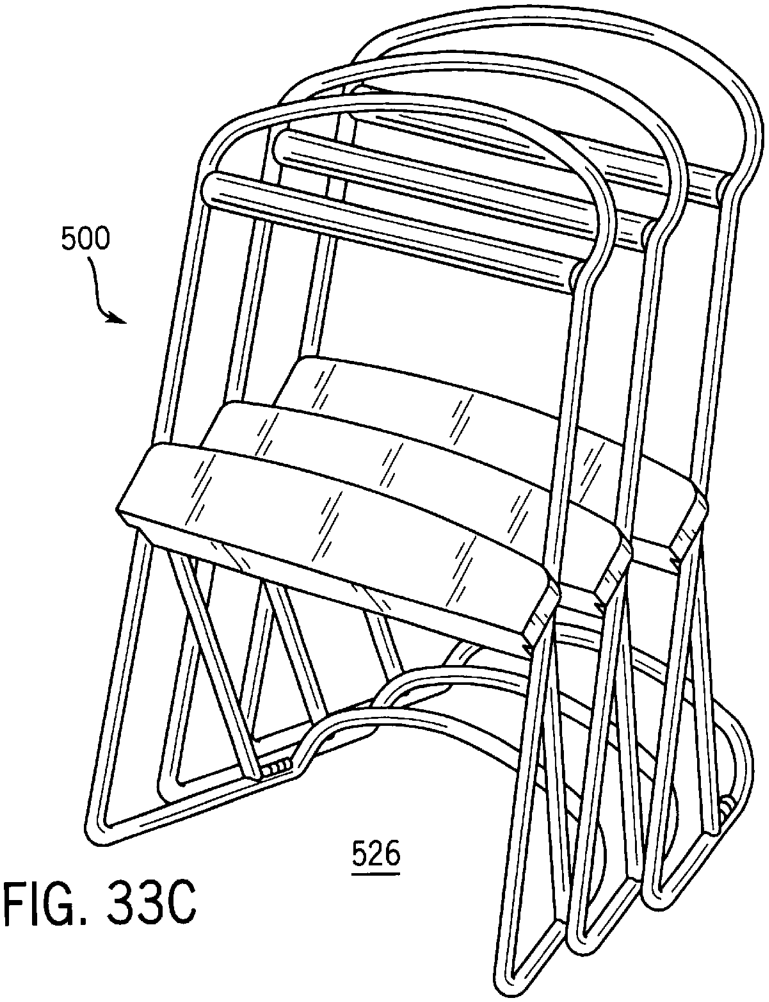
Figure 33D:
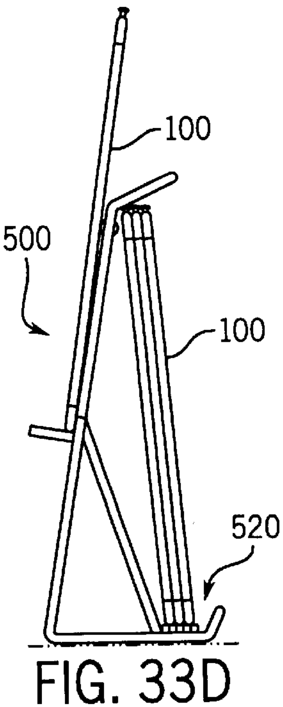
FIGS. 33D through 33F are side elevation views of the mounting structure of FIGS. 33A through 33C.
Figure 33E:
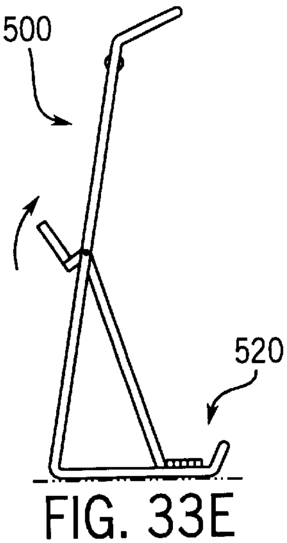
Figure 33F:
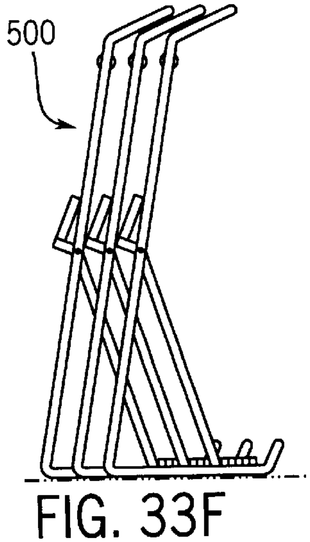

As shown in FIG. 25C, rail 372 is pivotally coupled to hook assembly 376. FIG. 25D shows the detail of the pivotal coupling of hook assembly 376 according to an exemplary embodiment. Pivot post 386 includes a double shoulder bolt 388 having an outer stage 390 and an inner stage 392 and fitted within an aperture 394 (e.g. collar) in end fitting. A torsion spring 398 is installed around and secured to outer stage of double shoulder bolt 388 at one end and secured within end fitting 396 at the other end. Inner stage 392 of double shoulder bolt 388 has a threaded end 402 and is secured within end fitting 400 by a locking nut 404 (with washer 406). An end cap 408 is fitted onto the base of end fitting 400 after inner stage 392 of double shoulder bolt 388 has been secured within end fitting 400 so as to allow pivotal movement of hook (not shown) with respect to end fitting 400 (through pivot post 386); torsion spring 398 is biased to tend to pivot the hook toward rail (e.g. pulling the peg into contact with the rail). According to the exemplary embodiments, hook assembly 376 is adapted to adjust to the width of the panel wall (or other structure) from which it is suspended (within a range defined by the reach or length of the hook). For example, hook assembly 376 is shown engaged with a relatively wide panel wall 374*a* in FIG. 25A and with a relatively thin panel wall 374*b* in FIG. 25B.

Referring to FIGS. 27 and 27A (and corresponding to FIGS. 25A through 25C), a single track rail 410 is shown with a corresponding hook assembly 376. Single track rail 410 has a generally "L"-shaped profile with a vertical base portion 412 and a horizontal rail portion 414 (projecting to one side along base portion 412). Rail portion 414 has a single track 416 with a retaining rim 418 at its leading edge. Hook assembly 376 includes an end fitting 384 secured to each end of single track rail 410 by fasteners shown as screws 420 extending through apertures 422*a* in end fitting 384 and threaded into corresponding apertures 422 in base portion 412 of single track rail 410. To suspend display board 100 from rail 410, hook 144 of corner member 106 of display board 100 is engaged within corresponding track 416 of rail 410 (see, e.g. FIG. 27). Referring to FIGS. 26 and 26A (and corresponding to FIG. 25D), a dual track rail 424 is shown with a corresponding hook assembly 426. Dual track rail 424 has an inverted "T"-shaped profile with a vertical base portion 428 and two horizontal rail portions 430 each providing a track 432 with a retaining rim 434 at its leading edge. Hook assembly 376 includes an end fitting 400 secured to each end of dual track rail 424 by fasteners shown as screws 420 extending through apertures 422*a* in end fitting 400 and threaded into corresponding apertures 422 in base portion 428 of dual track rail 424. To suspend one display board 100 from rail 424, hook 144 of corner member 106 of display board 100 (one or more) is engaged within corresponding track 432 of dual track rail 424 (see, e.g. FIG. 26).

Referring to FIGS. 28 through 31, a mounting structure is shown as a tray arrangement according to exemplary embodiments. As shown, tray 440 is configured for attachment to a mounting bracket 442 (which is mounted to a structure such as a wall 446 by a mounting screw 448) or to a mounting frame 444 (which is placed on a horizontal surface such as a shelf 450). Mounting bracket 442 is formed with a central mounting plate 452 having upper and lower tracks 454. Mounting frame 444 is a wire frame structure formed with upper and lower horizontal frame members 456 that span across right and left legs 458; legs 458 are of an "L"-shape each having a vertical frame member 460 and a horizontal support 462 (shown with cylindrical feet 464 installed). Tray 440 includes upper and lower arms 466, each having a groove 468 for engagement either with upper and lower tracks 454 of mounting bracket 442 or with upper and lower horizontal frame members 456 of mounting frame 444. Upper and lower arms 466 of tray 440 support a horizontal platform 470 having an inner vertical rim 472 and an outer vertical rim 474. When tray 440 is installed onto mounting bracket 442 or mounting frame 444, its upper and lower arms 466 with platform 470 form a sturdy support structure for a display board 100 (which will lean against a vertical structure such as wall 446 or another article and will stand on inner vertical rim 472); platform 470 forms a support structure for tools (not shown) such as markers or the like between inner vertical rim 472 and outer vertical rim 474. (According to a particularly preferred embodiment, the support structure is made of an extruded plastic material.) Referring to FIGS. 30 and 31, tray 440 is mounted to wall 446 with mounting brackets 442 (preferably at least two). Support of display boards 100 (two are shown) is augmented by a pair of horizontally projecting grips 476 mounted to wall 446. Grips 476 include a compliant grip portion compliant retaining members shown as 478 and a mounting flange 480 (secured to wall 446 by a fastener shown as screw 482 threaded into wall 446). Grips 476 are mounted to wall 446 at a spacing that is essentially identical to the width of display board 100; when display board 100 is press fit between grips 476 a holding force is provided against frame members 102 of display board 100 by each contacted compliant grip portion 478 of grips 476 (which deform slightly). According to a particularly preferred embodiment, compliant grip portion 478 includes a series of deformable fins 484 and is made of an elastomeric material so that display board is securely held but conveniently removed. The holding force provided by the grips may be adjusted by variations in the shape and profile of the grip portions (e.g. the thickness and spacing of the deformable fins, if fins are employed), as well as the material of construction, the spacing distance of mounting to the wall, etc. according to alternative embodiments.

Referring to FIG. 32, a mounting structure is shown as a mat according to an exemplary embodiment. Mat 490 provides a top surface 492 having a series of vertically projecting guides 494 (shown as having varying heights) and a bottom surface 496 given a non-skid surface treatment (according to any conventional method). When mat 490 is installed on a horizontal surface such as a work surface or shelf 450 (as shown), it provides at one or more of its projecting guides 494, a stand or support for the base of a display board 100 (shown in phantom lines) leaning against a vertical structure (shown in phantom lines as a wall). Other of the projecting guides may serve as holders for tools such as markers or the like. According to any particularly preferred embodiment, the mat is made of a rubber or plastic material.

Referring to FIGS. 33A through 40, a mounting structure is shown as an easel (e.g. stand or cart) according to exemplary embodiments. According to any preferred embodiments, each of the easels is formed from a welded steel tube structure, although other materials may be used according to alternative embodiments. A nesting easel 500 is shown in FIGS. 33A through 33G. Nesting easel 500 is a rigid structure having a pair of substantially upright rearwardly tilted side frame members 502 coupled to a curved back or handle member 504 and to a horizontal cross member 506 covered by a board pad 508. Side frame members 502 are coupled to a base 510. Base 510 has a pair of legs 512 coupled by a center portion 514 (providing base 510 with a tapering "V"/"U"-shaped profile) and a pair of substantially upright forwardly tilted support frame members 516. At the junction of each leg 512 and center portion 514 of base 510 a support pad 518 (e.g. of a compliant or elastomeric material) is provided; tapered center portion 514 of base 510 is raised to provide a capturing lip 520. A folding tray assembly 522 including a (plastic) tray 524 (of an "L"-shaped profile) is pivotally coupled across side frame members 502 (e.g. by a bolt or other conventional pivotal mounting arrangement); tray assembly can be pivoted from a deployed position (shown in FIG. 33A) to a stowed position (shown in FIG. 33C). A display board 100 rests on tray 524 (with a retaining groove 523) and against board pad 508 for display (as shown in FIGS. 33B and 33D); an exposed portion of tray 524 is available for holding tools such as markers 194 and erasers 195. Display boards 100 not in use can be stored in base 510 of easel 500 (as shown in FIGS. 33B and 33D) resting on support pads 518 and against board pad 508; capturing lip 520 of base 510 will serve to keep leaning display boards 100 within base 510. As is shown in FIGS. 33C and 33F, after tray assembly 522 has been stowed, open front portion 526 of base 510 of one easel can be fitted onto tapered center portion 514 of base 510 of an adjacent easel so that one easel can be nested into the adjacent easel in a repeating pattern. According to a particularly preferred embodiment, as shown in FIG. 33G, board pad, which is intended to prevent damage or marring of the display boards, is made of a neoprene wrap 528 fitted over cross member 506.

Figure 34A:
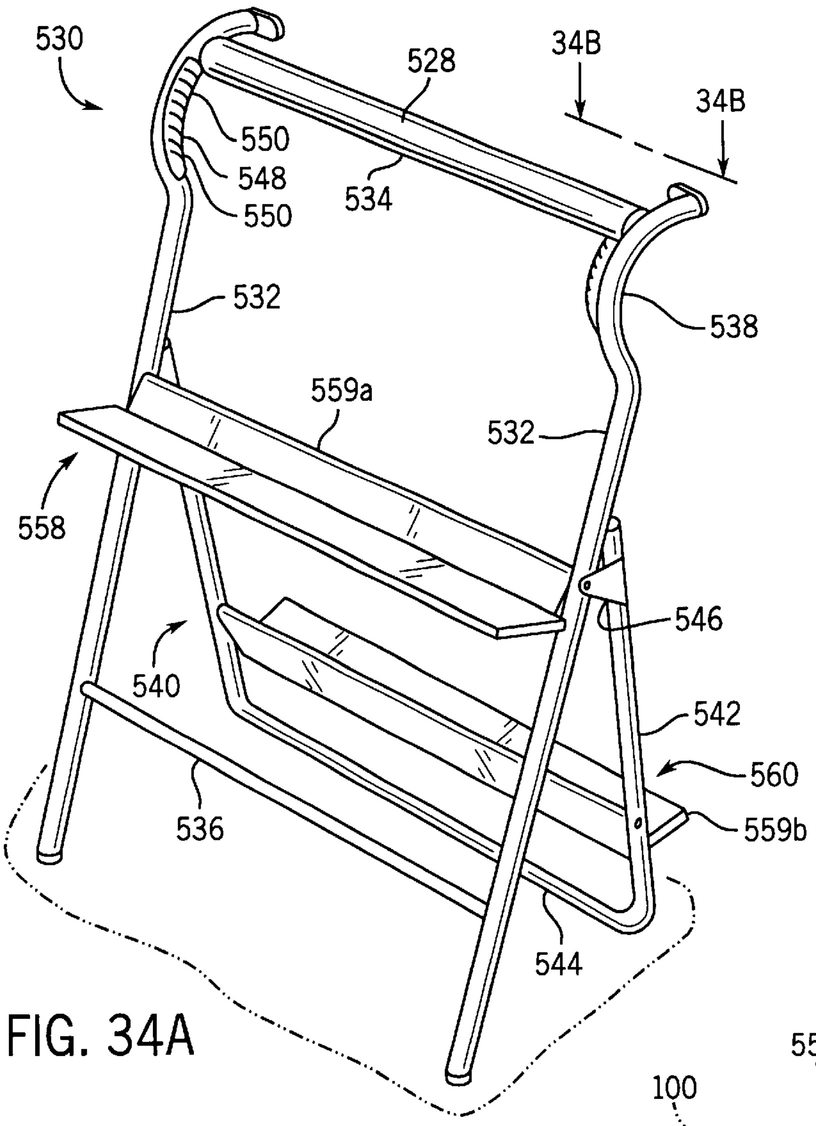
FIG. 34A is a perspective view of a mounting structure for a display board system according to an exemplary embodiment.
Figure 34B:
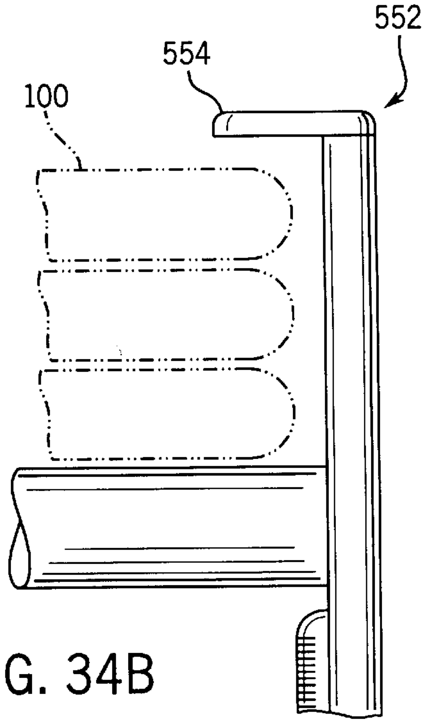
FIG. 34B is a fragmentary sectional perspective view of the mounting structure of FIG. 34A taken along line 34B—34B in FIG. 34A.
Figure 34C:
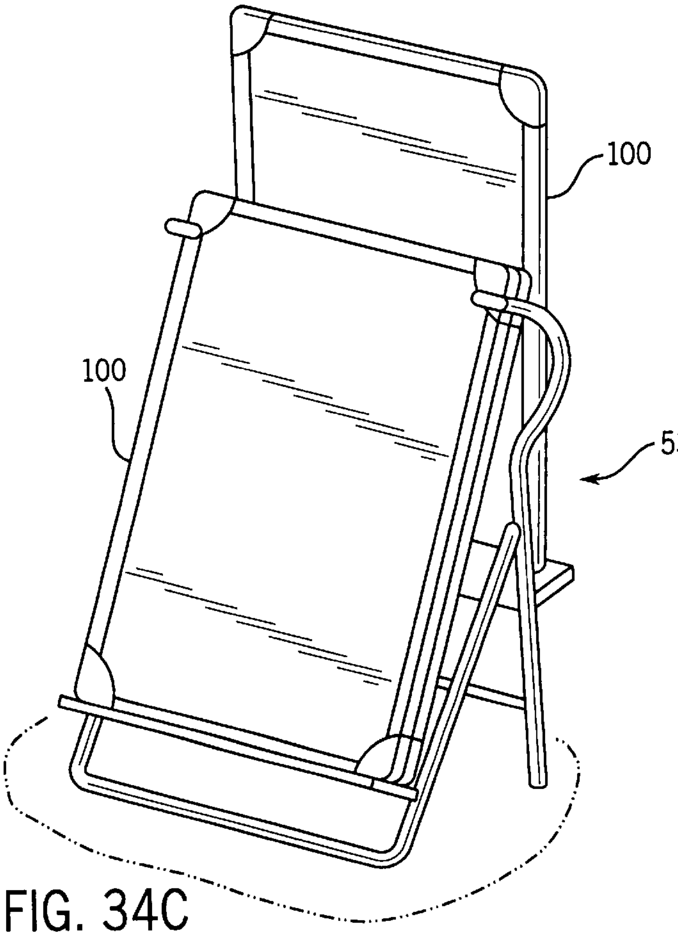
FIGS. 34C through 34E are perspective elevation views of the mounting structure of FIG. 34A.
Figure 34E:
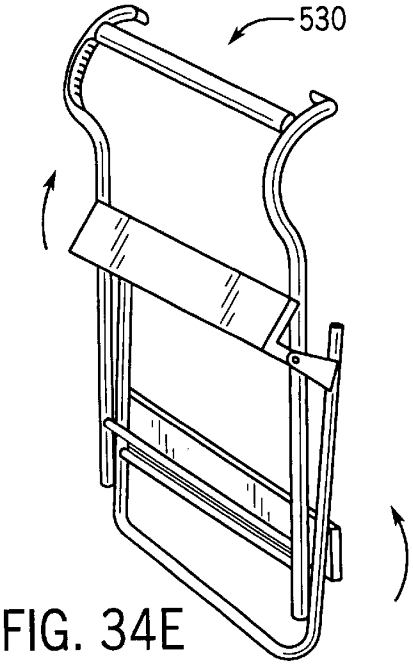
Figure 34D:
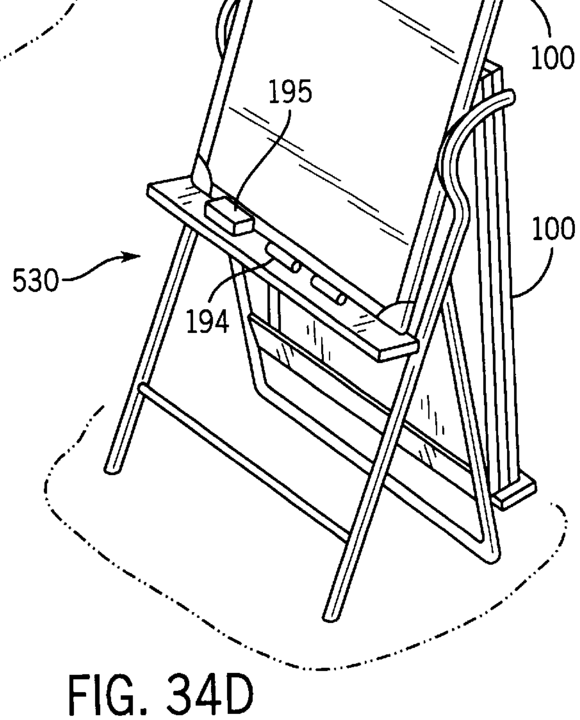
Figure 35:
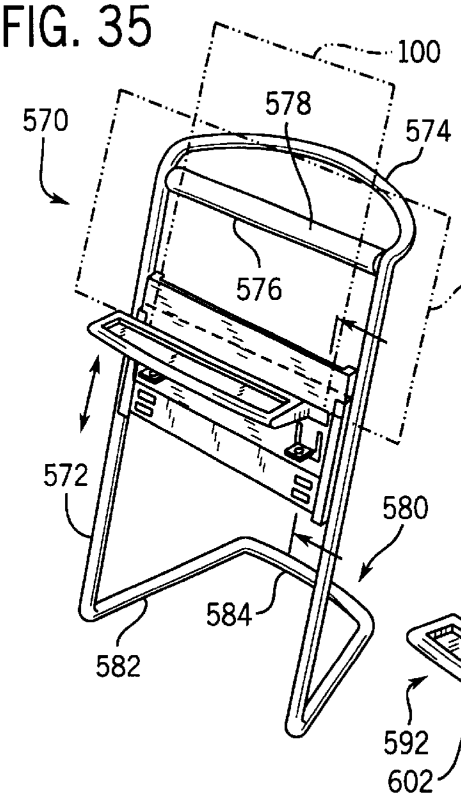
FIG. 35 is a perspective view of a mounting structure for a display board system according to an exemplary embodiment.
Figure 36:
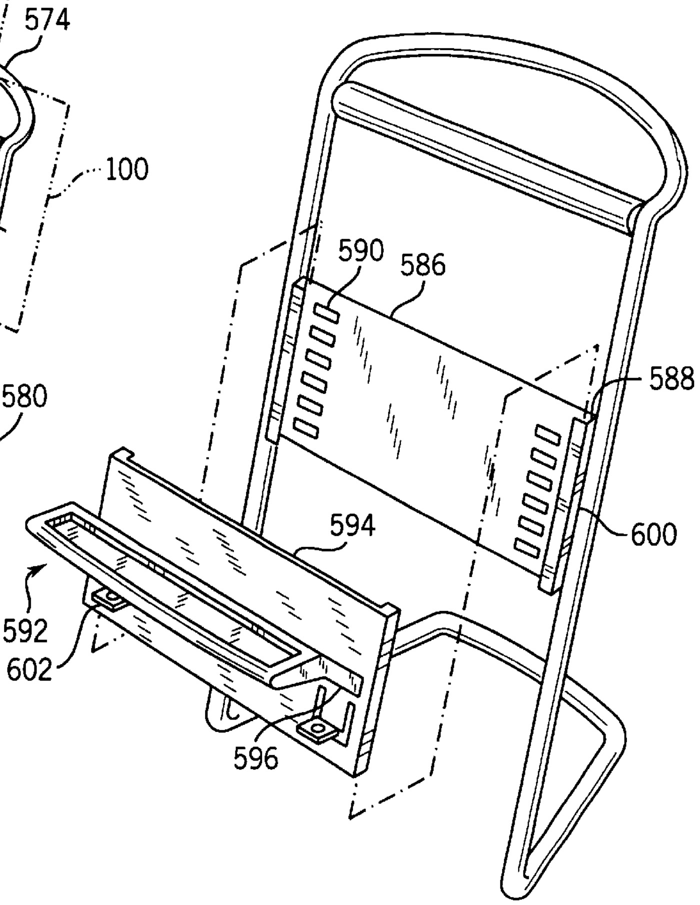
FIG. 36 is an exploded perspective view of the mounting structure of FIG. 35.
Figure 37A:
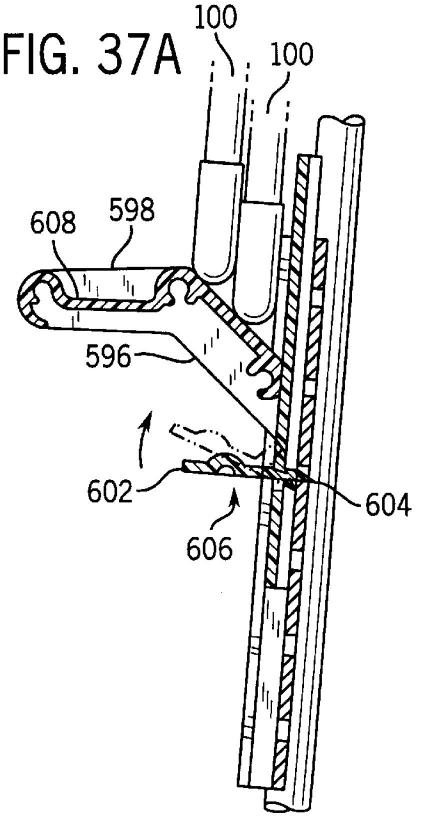
FIGS. 37A and 37B are fragmentary sectional elevation views of the mounting structure of FIG. 35.
Figure 37B:
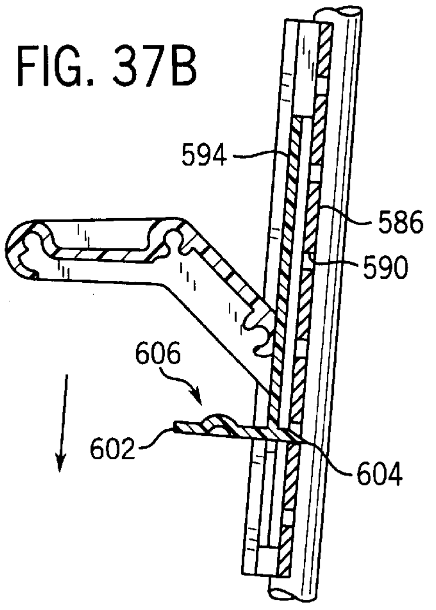

A folding easel 530 is shown in FIGS. 34A through 34E. Folding easel 530 is a rigid structure having a pair of substantially upright rearwardly tilted side frame members 532 coupled to an upper horizontal cross member 534 covered by a board pad 528 and a lower horizontal cross member 536. Side frame members 532 have a curved upper portion 538. A folding base 540 is pivotally coupled to side frame members 532. Folding base 540 includes a pair of support arms 542 and a center member 544 (e.g. folding base 540 has a "U"-shaped profile). Support arms 542 of folding base 540 include a projecting tab 546 for pivotal coupling to side frame member 532. At each curved upper portion 538 of side frame members 532 a compliant retaining system including a grip 548 (e.g. of a compliant or elastomeric material) having deformable fins 550 (e.g. ribs) is provided. At each of upper exposed ends 552 of side frame members 532 a flexible flap 554 (e.g. of a compliant or elastomeric material) is provided (see FIG. 34B) to form a holding area 556 for display boards 100 (shown in phantom lines). An upper folding tray assembly 558 (with a retaining groove 557) including a plastic tray 559*a* (of an "L"-shaped profile) is pivotally coupled across side frame members 532, as shown in FIG. 34E, along with folding base 540 through tabs 546. A lower folding tray assembly 560 including a plastic tray 559*b* (e.g. substantially identical to plastic tray 559*a* of upper folding tray assembly 558) is pivotally coupled across support arms 542 of folding base 540. According to any preferred embodiment, the pivotal couplings are effected by bolts or other conventional pivotal mounting arrangements. Upper and lower tray assemblies 558 and 560 can be pivoted from a deployed position (shown in FIG. 34A) to a stowed position (shown in FIG. 34E). A display board 100 rests on upper tray 559*a* and against board pad 528 for display. As shown in FIG. 34D, display board 100 is securely held between grips 548; an exposed portion of upper tray 559*a* is available for holding tools such as markers 194 and erasers 195. Display boards 100 not in use can be stored in holding area 556 of easel 530 resting on lower tray 559*b* and against board pad 528 or against adjacent display boards (as shown in FIGS. 34C and 34D). Flexible flaps 554 will serve to keep leaning display boards within base 540. As is shown in FIGS. 34C, at least one of the display boards stored in holding area 556 is also visible from the rear of easel 530. When folding easel 530 is not in use, as shown in FIG. 34E, upper and lower tray assemblies 558 and 560 can be stowed and folding base 540 can be folded onto to side frame members 532, forming a compact structure.

An adjustable easel 570 is shown in FIGS. 35 through 37B. Easel 570 is a rigid structure having a pair of substantially upright rearwardly tilted side frame members 572 coupled to a curved back or handle member 574 and to a horizontal cross member 576 covered by a board pad 578. Side frame members 572 are coupled to a base 580. Base 580 has a pair of legs 582 coupled by a center portion 584 (providing base 580 with a tapering "U"-shaped profile). A tray support plate 586 is coupled across side frame members 572. Plate 586 includes at each lateral side a track 588 and a pattern of adjustment slots 590. An adjustable tray assembly 592 including a base frame 594 having an arm 596, from which extends a horizontal tray 598, is adjustably mounted to plate 586 across side frame members 572. Base frame 594 of tray assembly 592 includes at each lateral side a guide block 600 which fits within corresponding track 588 of plate 586 to allow for guided vertical movement of tray assembly 592 with respect to plate 586. Base frame 594 of tray assembly 592 also includes at each lateral side a locking member formed as a releasable tab 602 (e.g. a "finger release"). Each locking member 602 includes a rearward projection 604 that is biased into a position that will engage any adjacent corresponding adjustment slot 590 of plate 586 as tray assembly 592 is guided vertically within track 588 of plate 586. When projection 604 is engaged in any corresponding adjustment slot 590, tray assembly 592 is retained in the corresponding vertical position with respect to plate 586 (see FIG. 37B). Each locking member also includes a release lever 606; lifting of release lever 606 disengages projection 604 from adjustment slot 590 and frees tray assembly 592 for vertical movement with respect to plate 586 (see phantom line disclosure in FIG. 37A). Vertical adjustment of the position of tray assembly 592 with respect to plate 586 is therefore defined by the pattern of adjustment slots within plate 586, each adjustment slot providing a discrete vertical position for tray assembly. A display board 100 (shown in phantom lines in both landscape and portrait mode in FIG. 35) rests on arm 596 of tray assembly 592 and against board pad 578 for display or use. Tray 598 which includes a base depression 608 is available for holding tools such as markers and erasers (not shown). According to any particularly preferred embodiment, the easel is made of a welded steel structure and the tray assembly is formed from a plastic material.

Figure 38:
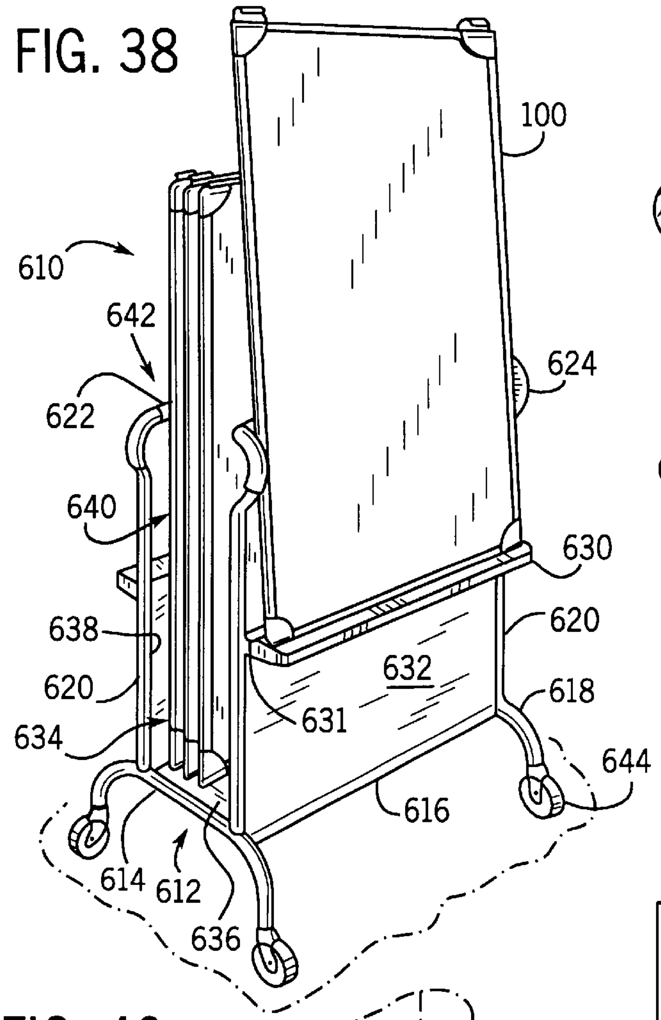
FIG. 38 is a perspective view of a mounting structure for a display board system according to an exemplary embodiment.
Figure 39:
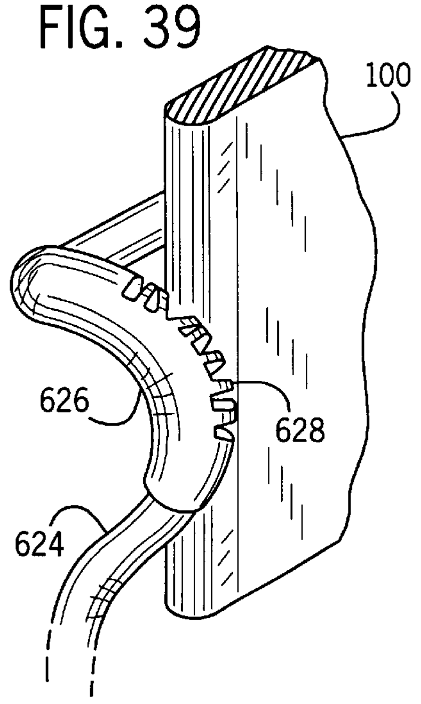
FIG. 39 is a fragmentary perspective view of the mounting structure of FIG. 38 showing a mounting arrangement for a display board.

A mobile easel 610 is shown in FIGS. 38 and 39. Mobile easel 610 is a generally rigid and symmetrical structure including a generally rectangular base frame 612 having relatively short horizontal side cross members 614 (one is visible in FIG. 38) and relatively long horizontal front (or lower) cross members 616 (one is visible in FIG. 38). Base frame 612 also includes four curved legs 618 (three are visible in FIG. 38) and two sets of generally vertical support frame members 620 (three are visible in FIG. 38). Each set of support frame members 620 is coupled by a horizontal upper cross member 622 (parallel to a corresponding lower cross member 616 of base frame 612). Each support frame member has a curved upper portion 624. At each curved upper portion 624 of support frame members 620 a compliant retaining system (or compliant member) shown as a grip 626 (e.g. of a compliant or elastomeric material) having deformable fins (or ribs) 628 is provided. A horizontal tray assembly 630 (with a retaining groove 631) is installed across each set of support frame members 620 at a location between upper cross member 622 and lower cross member 616. A folded panel 632 (e.g. a sheet metal panel folded into a rectilinear "U"-shaped profile) is mounted between base frame 612 and each set of support frame members 620 (below each tray assembly 630) to form a stowing area 634 for display boards 100 between each set of support frame members 620. A display board 100 may rest on each tray assembly 630 and upper cross member 622 (which may be covered with a board pad) for display or use. As shown in FIGS. 38 and 39, display board 100 is securely held between grips 626; an exposed portion of each tray assembly 630 is available for holding tools such as markers 194 and erasers 195 (not shown). Stowing area 634 is provided with a floor 636 and walls 638 (by panel 632) for secure storage of display boards 100 that are not in use. However, stowing area 634 also has open end 640 and an open top 642 to allow insertion and removal of display boards 100 in an accessible and convenient fashion. Mobile easel 610 includes rotatable wheels 644 on each of four curved legs 618, installed by known and conventional arrangements according to any preferred embodiment (e.g. with either all four wheels free to turn or with two straight wheels, etc.).

Figure 40:
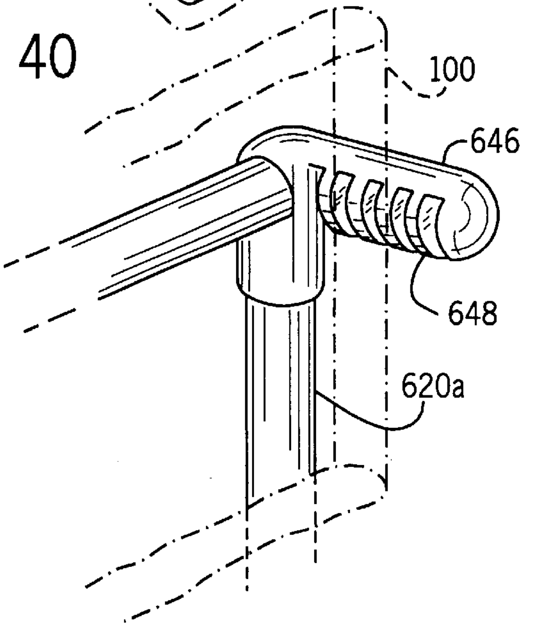
FIG. 40 is a fragmentary perspective view of a mounting structure for a display board system showing a mounting arrangement for a display board according to an alternative embodiment.

FIGS. 39 and 40 show arrangements for the compliant retaining system according to exemplary embodiments. As shown in FIG. 39, curved grip 626 installed on upper curved portion 624 of support frame member 620 (e.g. rail) of the easel includes fins 628 (e.g. ribs) that deform when a display board 100 is press fit into display on the easel (to a shape and extent determined by the position of the display board within the grip) to secure display board 100 to the easel for working and use (e.g. display, writing, erasing, configuring, transport with a mobile easel, etc.). As shown in FIG. 40, according to an alternative embodiment, a grip peg 646 is installed at the interference of vertical support frame member 620*a* and horizontal upper cross member 622*a* and horizontal cross member 622 of the mounting structure (e.g. easel). Grip peg 646 also includes fins 648 (e.g. projections, ribs or fingers, etc.) that deform to secure a display board 100 (shown in phantom lines) to the easel for use; as is evident, fins 648 are thicker than shown in FIG. 39. As will become apparent to those who review this disclosure, a wide variety of compliant materials may be used for the grips, which according to alternative embodiments may be in a variety of shapes and may or may not include deformable fins (e.g. projections, ribs). According to a preferred embodiments, the grips are made of a compliant material that is soft and durable and can be formed by molding, such as an elastomer or plastic. According to any particularly preferred embodiment, the grips include a series of deformable fins and are formed from an elastic material so that each display board is securely held but may conveniently be removed without damage or marring. The holding force and stiffness provided by the grips may be adjusted by variations in the shape and profile of the grips (e.g. the thickness and spacing of the deformable fins, if fins are employed), as well as the material of construction, location of the grips, orientation of the grips, the spacing distance of the grips, or number of grips (e.g. one or more), etc., according to alternative embodiments.

Figure 41:
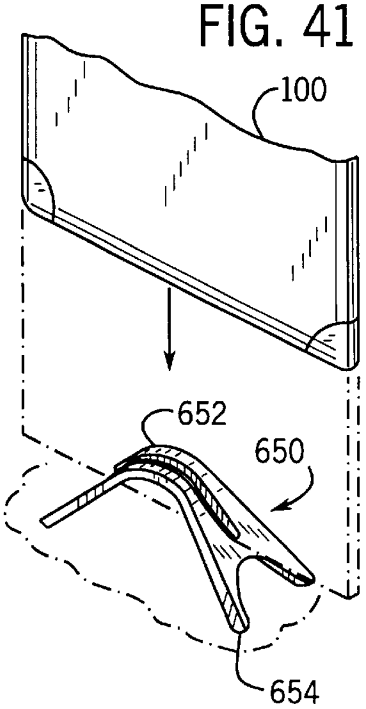
FIG. 41 is an exploded perspective view of a mounting structure for a display board system according to an exemplary embodiment.

Referring to FIG. 41, a mounting structure is shown as a stand 650 according to an exemplary embodiment. Stand 650 is formed as a unitary structure and is of a generally symmetrical shape. Stand 650 includes a slot 652 for holding a display board 100 and four legs 654 arranged to provide a relatively stable base for display of display board 100. According to a particularly preferred embodiment, the stand is formed from a molded plastic material (e.g. blow molded). As shown, stand 650 has a shape that allows for stacking of one or more additional stands on top of each other.

Figure 45:
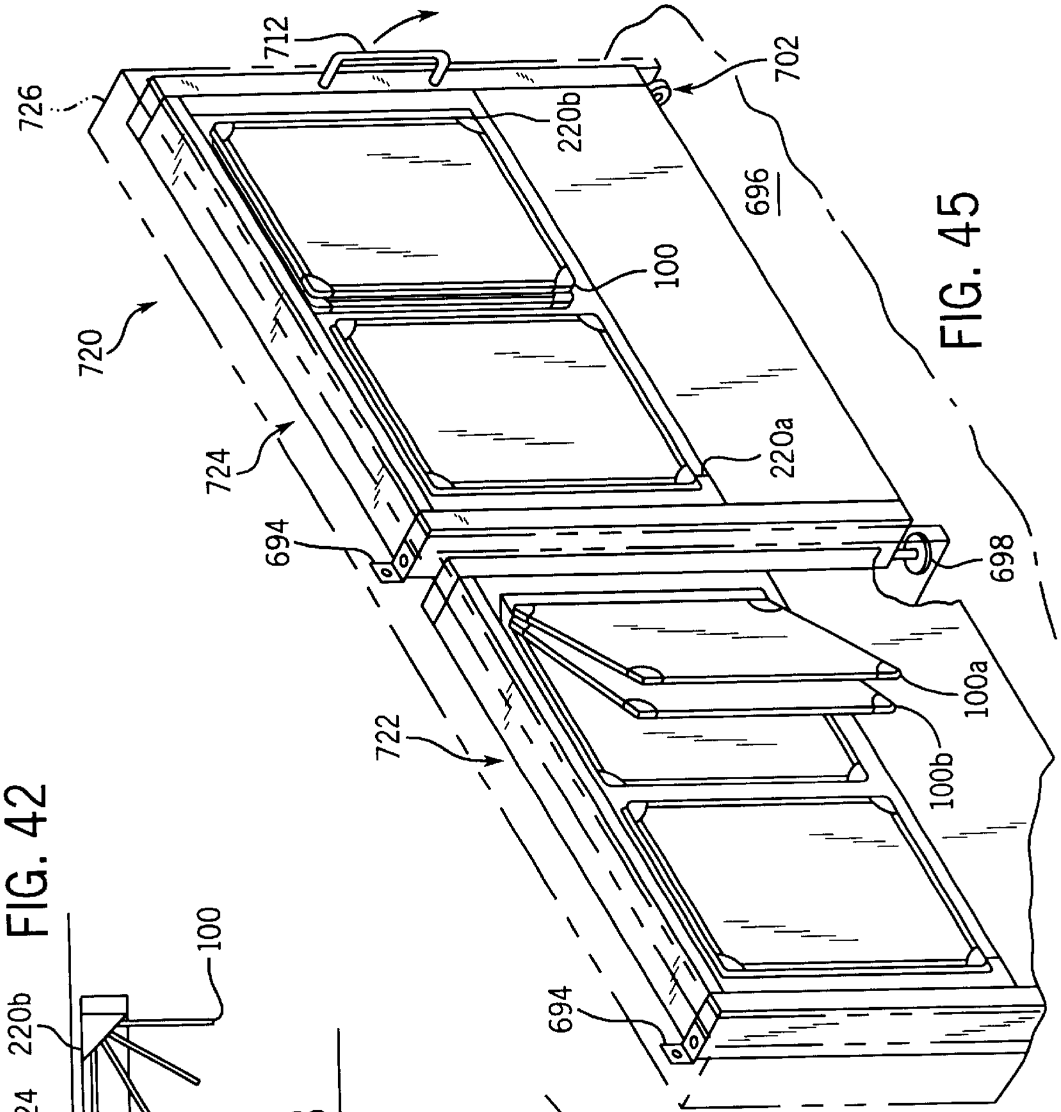
FIG. 45 is a perspective view of the mounting structure of FIGS. 42 and 43.
Figure 42:
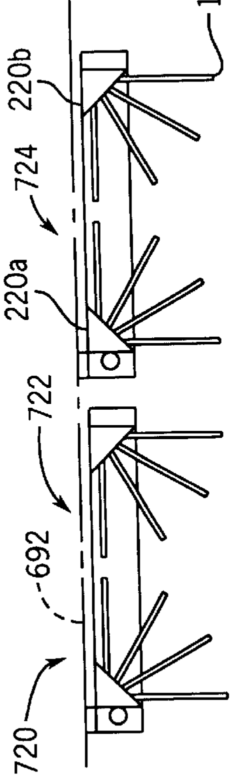
FIGS. 42 and 43 are top plan views of a mounting structure for a display board system according to an exemplary embodiment.
Figure 43:
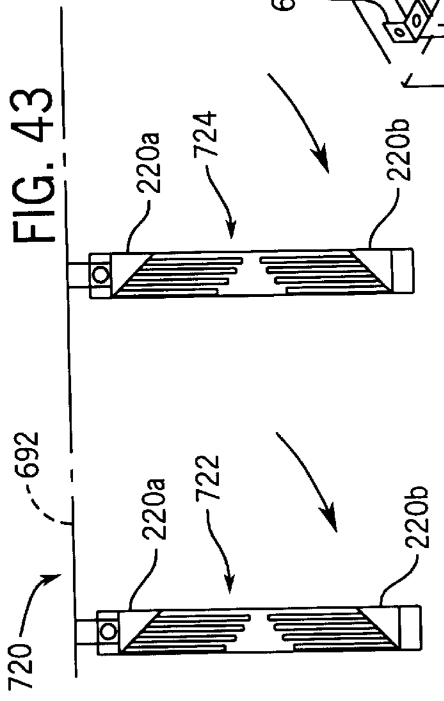
Figure 44:
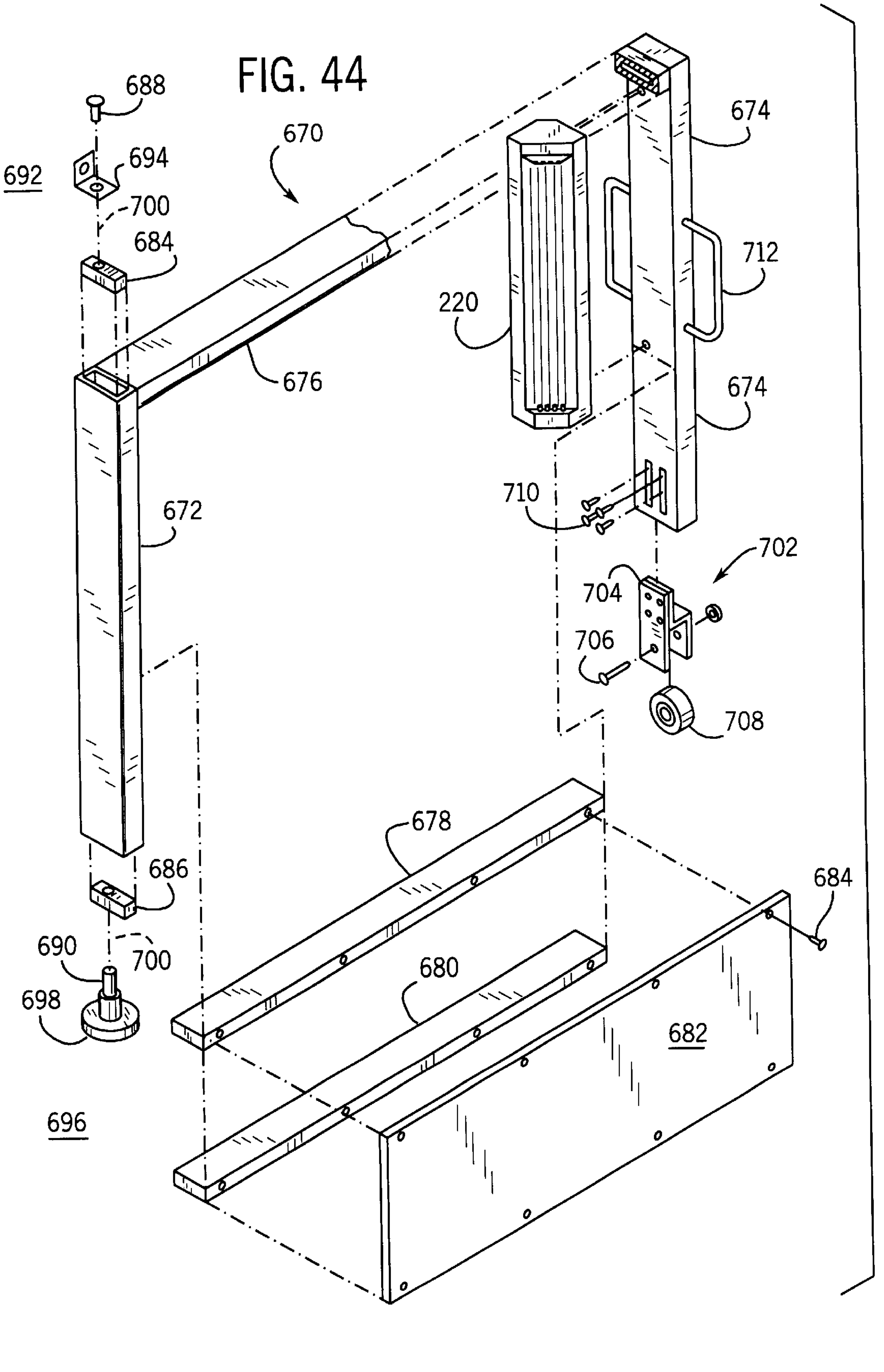
FIG. 44 is a fragmentary exploded perspective view of the mounting structure of FIGS. 42 and 43.

Referring to FIGS. 42 through 45, a mounting structure is shown as an articulating frame system according to exemplary embodiments. As shown in FIGS. 42 through 45, the articulating frame system can be configured to include a rack of a type shown in FIG. 17 to allow for display and use of display boards. (According to alternative embodiments, display boards may interface with the articulating frame system by any of a wide variety of other mounting structures and methods, including those shown in other FIGURES.) Referring to FIG. 44, an articulating frame 670 includes a pair of vertical frame members 672 and 674 coupled by a horizontal upper cross member 676, a horizontal intermediate cross member 678, and a horizontal lower cross member 680 (e.g.

each member preferably being a rectangular steel tube welded to form the structure). A base panel 682 or cladding is fastened (e.g. by threaded fasteners 684) to intermediate and lower cross members 678 and 680. Vertical frame member 672 is provided with a pair of hinge blocks 684 (upper) and 686 (lower), each configured to receive a hinge pin 688 (upper) and 690 (lower). Upper hinge pin 688 is secured to a wall 692 (or other structure) by a mounting bracket 694; lower hinge pin is secured to (or stands on) a floor 696 on a circular foot 698; upper and lower hinge pins share a pivotal axis 700. Vertical frame member 674 includes a wheel assembly 702 at its base. Wheel assembly 702 includes a frame 704 and an axle 706 retaining a wheel 708 for rotation; wheel assembly 702 is mounted to base of vertical frame member 674 by threaded fasteners 710 (e.g. screws). A rack 220 is mounted to vertical frame member 674 (and alternatively also to vertical frame member 672) so that display boards can be installed for use and display. Two handles 712 are also mounted to vertical frame member 674. Articulating frame 670 is configured for pivotal movement (e.g. with respect to wall 692 or another structure) about axis 700 rolling along wheel 708 in a range of motion between a fully stowed position and a fully deployed position. Referring to FIGS. 42, 43 and 45, an articulating frame system 720 including two articulating frames 722 and 724 is shown. Each articulating frame 722 and 724 includes two racks 220*a* and 220*b*. Each of racks 220*a* and 220*b* include four display boards 100. In FIG. 42, each articulating frame 722 and 724 is stowed, but display boards 100 are deployed. In FIG. 43, each articulating frame 722 and 724 is deployed, but display boards 100 are stowed. In FIG. 45, each articulating frame 722 and 724 is stowed in a space frame 726 (shown in phantom lines), but certain display boards 100*a* and 100*b* are partially deployed. As will become evident to those who review this disclosure, a wide variety of configurations are possible for the articulating frame system, employing variations of size, shape, orientation, arrangement, mounting structures, etc., as well as variations in the deployment of display boards.

ADDITIONAL ALTERNATIVE EMBODIMENTS

Referring to FIGS. 46–73E, additional alternative and exemplary embodiments of the display board system are shown.

Figure 46:
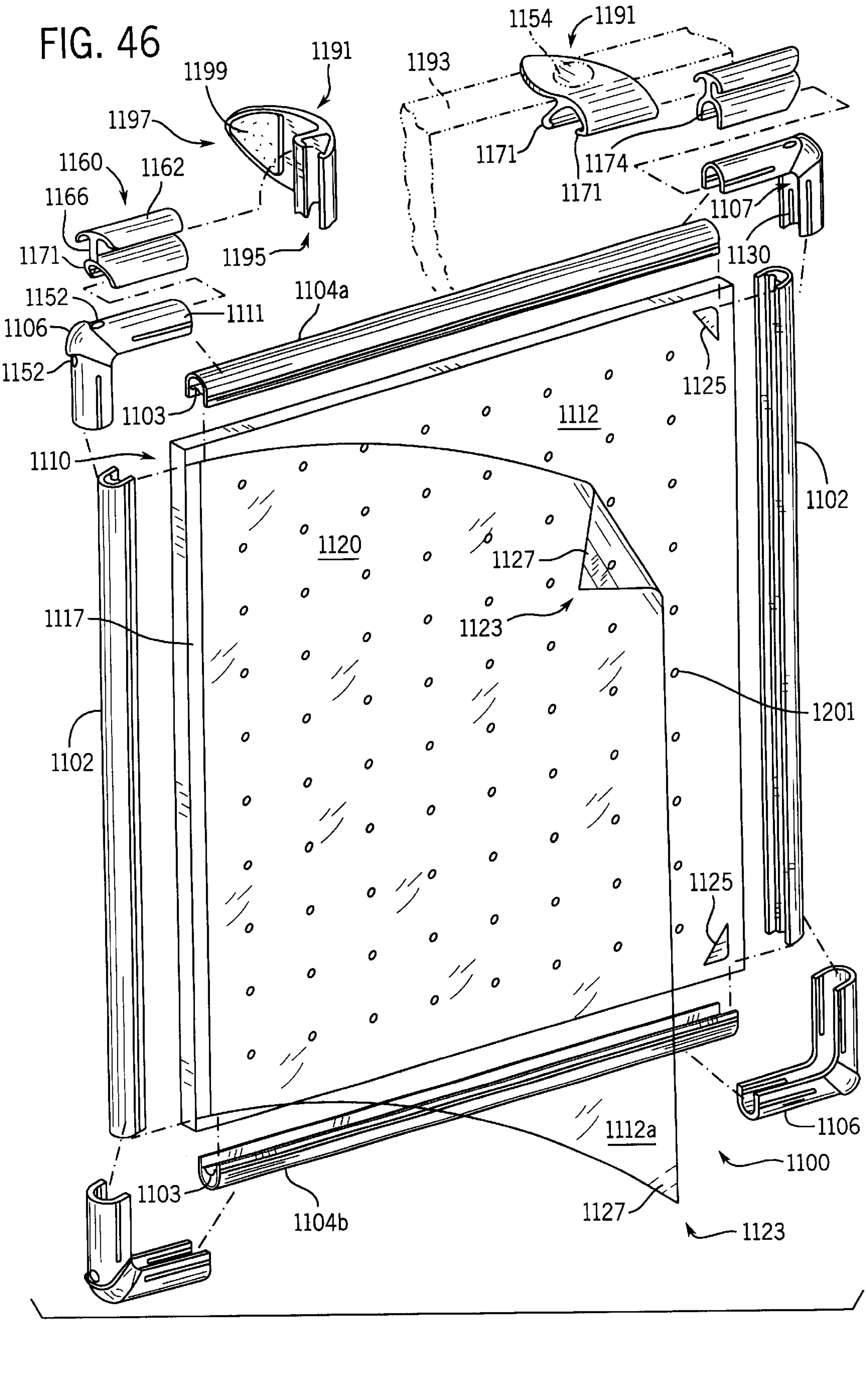
FIG. 46 is an exploded perspective view of a display board according to an alternative embodiment.
Figure 50C:
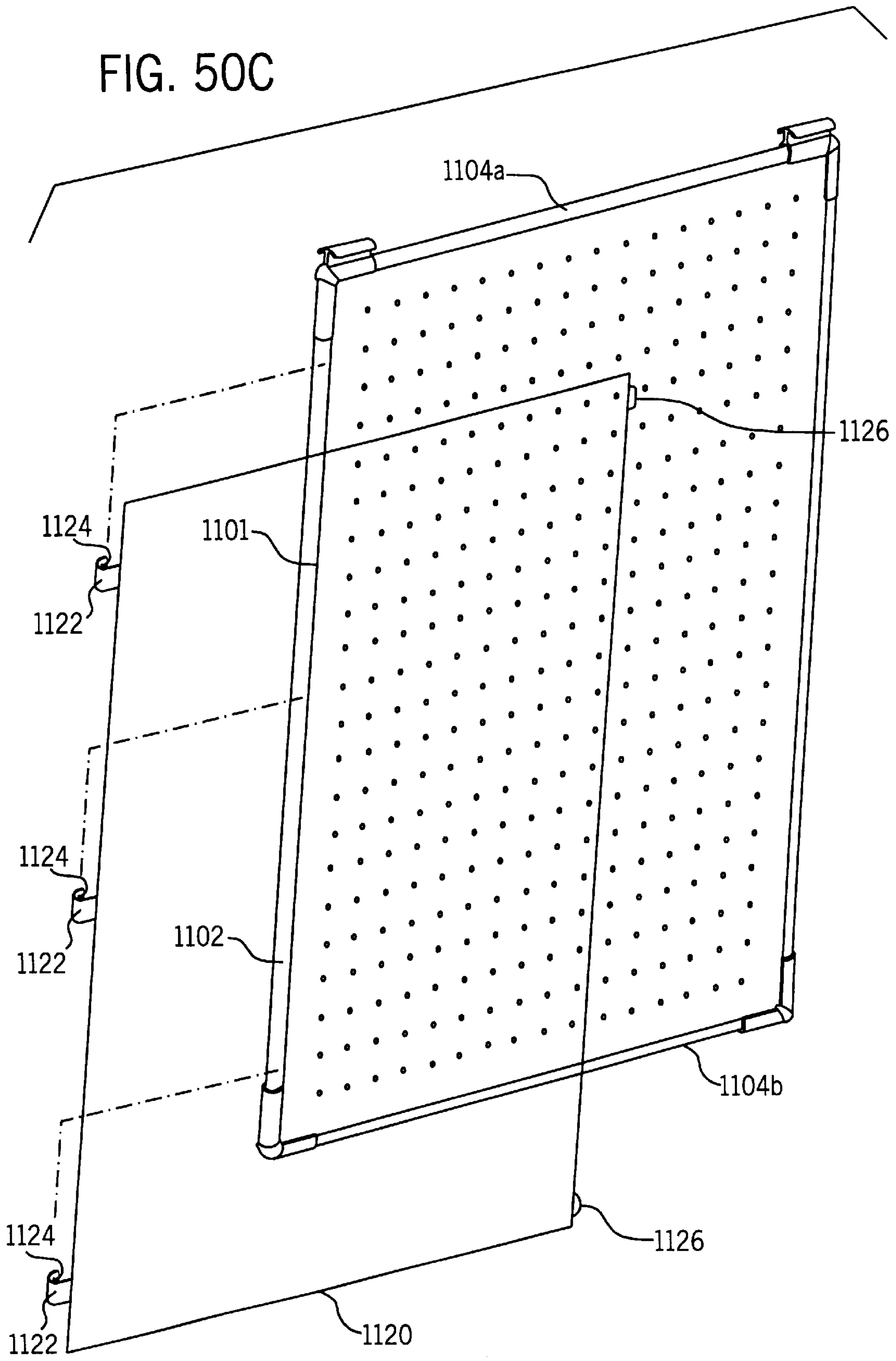
FIG. 50C is an exploded perspective view of a display board according to an alternative embodiment.

Referring to FIGS. 46, 50A, and 50B, a display board 1100 is shown according to an alternative embodiment. Display board 1100 includes extruded edge trim members shown as side frame members 1102, a top frame member 1104*a*, and a bottom frame member 1104*b*. Display board 1100 also includes four corner members 1106 secured to side frame members 1102 and top frame member 1104*a* and bottom frame member 1104*b*. According to a particularly preferred embodiment, the extruded edge trim members are made of a plastic material.

Referring to FIGS. 48 and 49, display board 1100 further includes a rigid solid core 1110 providing outer surfaces, namely a front surface 1112 and a back surface 1113 (shown in FIGS. 48 and 49). Solid core 1110 of display board 1100 may be formed of any of a variety or materials or have any of a variety of constructions. According to a preferred embodiment, solid core 1110 of display board 1100 is formed by a foam core structure. According to a particularly preferred embodiment, the foam core structure is made of 2.5 pound expanded polystyrene. Front surface 1112 of display board 1100 is attached to facing sheet 1116 (for example, by a hot melt adhesive, or by other methods). According to a particularly preferred embodiment, front surface 1112 and back surface 1113 are sheets of polystyrene, and are preferably attached to solid core 1110 with an adhesive such as a polypropylene based, hot melt adhesive commercially available as a product designated "HM 4177" from Hot Melt Technologies of Detroit, Mich. According to any preferred embodiment, solid core 1110 (and associated side frame members 1102, top frame member 1104*a*, and bottom frame member 1104*b*) will be of a construction that provides for a display board that is lightweight yet of sufficient structural integrity to suit its intended purposes (i.e. as may be defined by the particular surface treatment and associated mounting structures) and generally resistant to warping and bending.

Referring to FIGS. 46 through 48, side frame members 1102 and top frame member 1104*a* and bottom frame member 1104*b* fit over and are secured to the edges of core 1110. According to a preferred embodiment, each extruded edge trim member is attached to the display board with a "press fit" working with an adhesive that is applied to the extruded edge trim member prior to assembly upon the display board. According to alternative embodiments, various other assembly arrangements may include fasteners or fastening elements of any type working with or without an adhesive. Side frame members 1102 and top frame member 1104*a* and bottom frame member 1104*b* include a member (shown as a strip 1103 of material) spanning the width of the extruded edge trim members. Strip 1103 includes a shape that is intended to provide a biasing or "spring" effect that permits deformation (e.g. spread or expand) as the extruded edge trim member is being fitted over the edge of solid core 1110 during assembly. Also, strip 1103 includes a shape that is intended to provide a guide (e.g. a "stop" or "seat") for positioning solid core 1110. After assembly, the strip remains at least partially deformed (i.e. flexed or in tension) to maintain a secure "grip" on the core of the display board. Strip 1103 also defines a space 1105 that receives excess glue that is displaced during assembly of the display board.

Corner members 1106 each fit over and are joined to side frame members 1102 and either top frame member 1104*a* or bottom frame member 1104*b* to form a secure frame structure for display board 1100. (According to a particularly preferred embodiment, corner members 1106 and extruded edge trim members are made of a plastic material and are joined by adhesives; according to alternative embodiments, the members can be joined or attached by ultrasonic welding or any of a variety of fastening arrangements.) Corner members 1106 each have a first portion 1108*a* and a second portion 1108*b*. First portion 1108*a* and second portion 1108*b* generally provide corner members 1106 with an "L"-shaped profile (although other profiles may be used according to alternative embodiments).

First portion 1108*a* and second portion 1108*b* of corner members 1106 each define an opening 1107 configured to receive a corresponding curved exterior of adjacent extruded edge trim members (i.e. side frame members 1102 and top frame member 1104*a* or bottom frame member 1104*b*). Referring to FIGS. 48 and 49, first portion 1108*a* and second portion 1108*b* include a pair of inwardly disposed opposed first ribs 1176 that extend from an inner surface, and a pair of outwardly disposed second ribs 1178 that extend from a curved exterior surface 1111. First ribs 1176 are disposed along a central portion of the inner surface and are configured to engage grooves 1101 of the extruded edge trim members (e.g. side frame member 1102, top frame member 1104*a*, or bottom frame member 1104*b*). (Second ribs 1178 are disposed along a central portion of exterior surface 1111 and are configured to engage the grooves of any of a variety of mounting elements.) During assembly, the corner member deforms (slightly) to engage two adjacent extruded edge trim members and the corresponding corner portion of the rigid core. According to any particularly preferred embodiment, the corner members are intended to be able to withstand a "drop" (i.e. in typical use) without damage to the display board.

Corner members 1106 also each include apertures 1152 configured to fit on or engage any of a number of mounting elements (e.g. a pivot pin as shown in FIG. 55) of a mounting structure.

As a result and as shown in the examples in the FIGURES, any number of a variety of mounting interfaces or structures are provided such that display board 1100 is suited for hanging (e.g. by a hook attached to the top corner member with the bottom corner member free of any engagement, or by a mounting bracket for resting on a ledge that also can be attached to top corner members), for pivotal mounting (e.g. by using a post attached to the top corner member and an aperture in the bottom corner member), and other forms of multi-functional engagement or display. According to any alternative embodiment, the mounting structures may also include indicia 1154 that is configured to provide any of a variety of information (e.g. trade names or trademarks, product or project names, or the like).

Referring to FIGS. 46, 47B, and 49, corner members 1106 are configured to receive a mounting element shown as a repositionable post-hook clip 1160. Repositionable post-hook clip 1160 is configured to secure display board 1100 to any number of mounting arrangements on a variety of mounting structures. As shown, repositionable post-hook clip 1160 includes a curved top cap 1162 providing hooks 1164, a web 1166 supporting top cap 1162, a post 1168, a clearance slot 1170, and an angled end portion 1173 configured to abut an angled portion 1179 of corner member 1106. Repositionable post-hook clip 1160 also includes a curved base cap 1172 shaped to fit over first portion 1108*a* or second portion 1108*b* of corner members 1106. An inner surface of base cap 1172 of repositionable post-hook clip 1160 includes a pair of opposed grooves 1174 configured to receive corresponding outwardly disposed second ribs 1178 of corner member 1106. According to a preferred embodiment, repositionable post-hook clip 1160 is attached to corner member 1106 by a sliding engagement such that grooves 1174 receive outwardly disposed second ribs 1178 of corner member 1106. According to a particularly preferred embodiment, the grooves on the post-hook clip have a varying depth that is configured to variably engage the rib on the corner member (e.g. applies an increasing amount of pressure to provide a secure interference-type or "snap" fit). According to an alternative embodiment, repositionable post-hook clip 1160 and corner member 1106 are coupled with a compliant (e.g. "snap") fit. As a result, depending upon how the repositionable post-hook clip is installed (and the direction of mounting or engagement), the display board may be engaged either in a "landscape" mode or a "portrait" mode (e.g. in association with a mounting structure).

Repositionable post-hook clip 1160 further includes a plurality of fins 1163 configured to prevent inadvertent or accidental dislodgment of display board 1100 (which may occur, for example, when information is being applied to the display board) when suspended from a mounting structure such as an "L"-shaped beam mounting structure 1410 (as shown in FIG. 49 or single track rail 410 shown in FIGS. 27 and 27A or the like) or a "T"-shaped mounting structure (e.g. dual track rail 424 shown in FIGS. 26 and 26A). Fins 1163 extend outwardly from curved top cap 1162 adjacent web 1166. When suspended from "L"-shaped mounting structure, ribs 1163 are disposed under the bottom surface of the beam such that upward movement of display board 1100 causes contact between fins 1163 and the beam and prevents repositionable post-hook clip 1160 from being dislodged from the beam. According to a preferred embodiment, to suspend or remove the display board from the beam, the display board is rotated or pivoted about the top cap of the repositionable post-hook clip approximately ten degrees. According to an alternative embodiment of a mounting structure, the repositionable post-hook clip may be configured to suspend the display board from a "J"-shaped beam mounting structure or any number of suitable shape or profile.

Referring to FIGS. 50B, 57, and 58, a mounting arrangement for any of a variety of items (e.g. displayed items such as flip chart tablet 1180, informational materials, display board, or the like) is shown as including a peg or a projection such as a mounting peg 1165. According to a preferred embodiment, the items have a slot 1182 configured to receive mounting peg 1165. Mounting peg 1165 is attached to display board 1100 with a snap-fit type of engagement and includes a curved portion 1167 and a peg 1161. Curved portion 1167 includes one or more (inwardly disposed) ribs 1169 and a flange 1171. Ribs 1169 are configured to engage grooves 1101 of an extruded edge trim member (e.g. top frame member 1104) of display board 1100. Flange 1171 extends outwardly from mounting peg 1165 opposite peg 1161 and is configured to provide the user with a gripping and leverage member when removing mounting peg 1165 from the extruded edge trim member. According to alternative embodiments, mounting peg 1165 may be configured to engage any of a variety of components including corner member 1106 or repositionable post-hook clip 1160. When mounting peg 1165 is configured to engage corner member 1106, ribs 1169 are disposed beneath outwardly disposed second ribs 1178. According to an alternative embodiment, the projection (e.g. the mounting peg) has internal features (e.g. grooves comparable to grooves 1174 on the post-hook clip 1160) that are configured to receive ribs 1178 of corner member 1106. When mounting peg 1165 is configured to engage repositionable post-hook clip 1160, one or more ribs 1169 are designed to engage hooks 1164 of curved top cap 1162.

As shown in the Figures, mounting peg 1165 may be employed to suspend any of a variety of articles or items (e.g. displayed items such as informational materials, display board, flip chart, pocket curtain, etc.). For example, FIG. 50B shows a pocket curtain 1175 suspended from a pair of mounting pegs 1165. Pocket curtain 1175 includes a flexible sheet 1177, a shaft 1185 attached to the top of sheet 1177, apertures 1187 located adjacent to shaft 1185, and a display arrangement 1189. According to a preferred embodiment, display arrangement 1189 includes a plurality of pockets 1190 configured to receive any of a variety of items (e.g. papers (as shown in FIG. 50B), cards, presentation tools, writing instruments, etc.). According to alternative embodiments, various other arrangements may be employed including one or more pockets or compartments with varying shapes, sizes, proportions, pattern, orientation (e.g. direction of the opening) and quantity.

Referring to FIG. 46, a mounting structure for a displayed item such as a display board, flip chart tablet, or the like, is shown as a mounting bracket 1191. Mounting bracket 1191 is configured to attach to the displayed item and rest on a horizontal ledge 1193 (shown in phantom line). Horizontal ledge 1193 can be any number of surfaces, including a partition wall, table, another display board, easel, etc. Mounting bracket 1191 includes a board interface 1195 and a ledge interface 1197. When mounting bracket 1191 is coupled to display board 1100, ledge interface 1197 is in a substantially horizontal position. According to a preferred embodiment, ledge interface 1197 includes a pad 1199 (e.g. made from elastomeric material or the like). Pad 1199 is intended to provide a soft, non-abrasive, non-skid surface to engage horizontal ledge 1193. According to a preferred embodiment, board interface 1195 includes a pair of opposing ribs 1171 and is configured to engage curved top cap 1162 of repositionable post-hook clip 1160. According to alternative embodiments, board interface 1195 may be configured to engage any of a variety of components of the displayed item, including extruded edge trim members (such as side frame members 1102, top frame member 1104*a*, or bottom frame member 1104*b*) or corner member 1106. When ledge interface 1197 is configured to engage extruded edge trim members, opposing ribs 1171 are designed to engage grooves 1101 of the extruded edge trim members. (When board interface 1195 is configured to attach to side frame member 1102, ledge interface 1197 and board interface 1195 are offset approximately ninety degrees so that the ledge interface is configured to rest on horizontal ledge 1193.) When board interface includes internal features (e.g. grooves comparable to grooves 1174 on post-hook clip 1160) that are configured to receive ribs 1178 of corner member 1106. Alternatively, board interface 1195 is configured to engage corner member 1106, opposing ribs 1171 are designed to be disposed beneath outwardly disposed second ribs 1178.

Referring to the exemplary embodiments shown in FIGS. 46, 47A, 47B, 50A, and 50B, the surfaces of the display board may be provided with any of a wide variety of surface treatments, both functional and decorative, in a wide variety of combinations (i.e. one surface of a display board may have in whole or in part a different surface treatment than the other surface and portions). According to any preferred embodiment, the surface treatment of the display boards will allow the display of one or more "layers" of information on each surface. Front surface 1112 and/or back surface 1113 of display board 1100 includes a writable surface treatment 1112*a* (e.g. a Melamine paper dry-erase or other "white display board" surface); the other surface of the display board may have a "tacky" or repositionable posting surface treatment 1112*b* such that documents may be temporarily displayed, i.e. a tacky surface coating formed by a reusable adhesive applied to the surface of the display board. According to a particular preferred embodiment, flexible sheet 1177 of pocket curtain 1175 also includes writable surface treatment 1112*a*.

Front surface 1112 or back surface 1113 and solid core 1110 are intended to also provide, among other things, a "tackable" structure that permits the insertion of a device (such as a thumbtack or similar fasteners) to secure the displayed materials in place. According to a preferred embodiment, in addition to providing display board 1100 with the "tackable" structure, the display board surface (i.e. front surface 1112 and/or back surface 1113) may be provided with tacky surface coating 1112*b*, which may include an adhesive surface treatment (e.g. a "light" adhesive providing a "tacky" or "sticky" surface) so that sheets of paper (and other flat media) or other displayed materials will removably adhere to the front surface 1112 or back surface 1113 (e.g. "paper capture" for display beneath the clear film cover).

According to a preferred embodiment, display board 1100 includes a clear film cover 1120 (e.g. an overlay) that may be permanently or removably attached to display board 1100 (e.g. by adhesives, tape, insert fasteners, clip members, etc.) over tacky surface coating 1112*b* (e.g. "photo album"). As shown, clear film cover 1120 is a single sheet attached to one side of display board 1100. According to a preferred embodiment, clear film cover 1120 is transparent; according to alternative embodiments, the clear film cover can be wholly or partially translucent or opaque. During assembly, before side frame member 1102 is attached to display board 1100, clear film cover 1120 is affixed to front surface 1112 or back surface 1113 (e.g. by double-sided tape 1117) adjacent a vertical edge of display board 1100 (thereby sandwiching clear film cover 1120 between the side frame member 1102 and solid core 1110). According to an alternative embodiment, clear film cover 1120 may be attached to display board 1100 with any number of appropriate fasteners such as staples or the like. Alternatively, clear film cover 1120 may be attached adjacent a horizontal edge of display board 1100 before top frame member 1104*a* or bottom frame member 1104*b* are attached to solid core 1110.

According to an alternative embodiment (shown in FIGS. 50A and 50C), clear film cover is removably attached to one of the edge trim members (e.g. side frame member 1102) with a pair of U-shaped clips 1122. U-shaped clips 1122 are shaped and sized to fit onto extruded edge trim members (i.e. side frame members 1102, top frame member 1104*a*, and/or bottom frame member 1104*b*) in a snap or compliant fit. According to a preferred embodiment, U-shaped clips 1122 have internal features (e.g. ribs 1124 comparable to ribs 1174 on corner members 1106) that are configured to engage grooves 1101 on the extruded edge trim member.

Clear film cover 1120 is configured to cover substantially the entire front surface 1112 or back surface 1113 of display board 1100. Alternatively, one or more clear film cover sheets are employed to cover a portion or substantially all of the surfaces of the display board. According to a particularly preferred embodiment, each sheet of the clear film cover is made of a material that is "writable" (either permanently or erasably, i.e. reusably for a number of cycles). As indicated, display board 1100 is provided with any of a wide variety of arrangements to hold clear film cover 1120 against front surface 1112 and/or back surface 1113.

According to a preferred embodiment, clear film cover 1120 includes a corner 1123 configured to provide a flange extending away from front surface 1112 or back surface 1113 of display board 1100. Corner 1123 may be grasped by the user to facilitate peeling clear film cover 1120 away from display board 1100. A label 1439 attached to clear film cover 1120 adjacent to corner 1123 providing additional rigidity to clear film cover 1120 and informing the user where clear film cover 1120 may be grasped. According to an alternative embodiment, clear film cover 1120 is provided with one or more lifting tabs 1126. Tabs 1126 may be grasped by the user to facilitate peeling clear film cover 1120 away from front surface 1112 or back surface 1113 of display board 1100.

Referring to FIGS. 46 through 50A, a system of magnets 1121 may be employed to further secure clear film cover 1120 to display board 1100. According to a preferred embodiment, the magnets are low grade vinyl magnets. A first set of magnets 1125 is attached to front surface 1112 and/or back surface 1113 adjacent corner member 1106 opposite the edge where clear film cover 1120 attaches to display board 1100. A second set of magnets 1127 is attached to clear film cover 1120 at a position corresponding to first set of magnets 1125. A second set of magnets 1127 is disposed on inner surface of clear film cover 1120 with the adhesive disposed on the magnet. Alternatively, second set of magnets 1127 is attached to an outer surface 1129 of clear film cover 1120 thereby sandwiching clear film cover 1120 between the magnets. According to an alternative embodiment, tackable surface coating 1112*b* does not fully cover front surface 1112, but is trimmed to allow first set of magnets 1125 to attach to front surface 1112. According to an alternative embodiment, system of magnets 1121 may be used with U-shaped clips 1122 to secure clear film cover 1120 to display board 1100.

According to a preferred embodiment, front surface 1112, back surface 1113, clear film cover 1120 and/or display arrangement 1189 includes indicia 1201 (shown as dots). Indicia 1201 may be any of a variety of decorative or functional patterns or forms (e.g. outlines of shapes, pictorials, dots, lines, grids, etc.) that are intended to assist or enable the application, orientation, and arrangement of information to display board 1100 such as materials, papers, dry-erase ink, flow charts, graphs, and the like. By providing an ordered arrangement or series of indicia 1201, the user may display or lay out information in an organized fashion. Also, when user is writing on display board 1100, indicia 1201 (such as dots or horizontal lines) are intended to assist in the level, straightness, proportionately and consistently sized display of information. Further, when the user is displaying materials (e.g. papers), on a "tackable" surface or a "tacky" surface, indicia 1201 (dots or lines) are intended to assist in the level and ordered application of materials. Further, indicia assist the user in applying any number of graphs, flow charts, or schematics. According to a particularly preferred embodiment, when indicia 1201 are applied to a "writable" surface, indicia 1201 are made from ultraviolet light cured ink (commercially available as a product designator of "Sericol 18039" from Sericol of Kansas City, Mo.).

Referring to FIGS. 51A through 51E, a mounting structure is shown as a folding easel 1530. Folding easel 1530 is a collapsible mounting structure shown in a partially open position in FIGS. 51A and 51B, and in the folded position in FIG. 51E. Folding easel 1530 includes a substantially upright rearwardly tilted front frame member 1531, a forwardly tilted rear frame member 1533, and a pivot mechanism 1535.

Front frame member 1531 includes a first side portion 1537, a second side portion 1539, and a horizontal upper portion 1541. According to a preferred embodiment, first side portion 1537 and second side portion 1539 each include a foot 1543*a* and rear frame member 1533 includes a foot 1543*b*. Foot 1543*a* is weighted and is intended to provide stability when folding easel 1530 is being used (e.g. when user is applying information or writing on display board 1100). Weighting of foot 1543*a* may occur by any number of a variety of ways (e.g. an insert made of dense material, constructing foot 1543*a* itself out of a relatively dense material, etc.). According to a particularly preferred embodiment, the front frame member (first side portion 1537, second side portion 1539, and horizontal upper portion 1541) is integrally formed from a single tube (e.g. steel or aluminum).

Figure 51B:
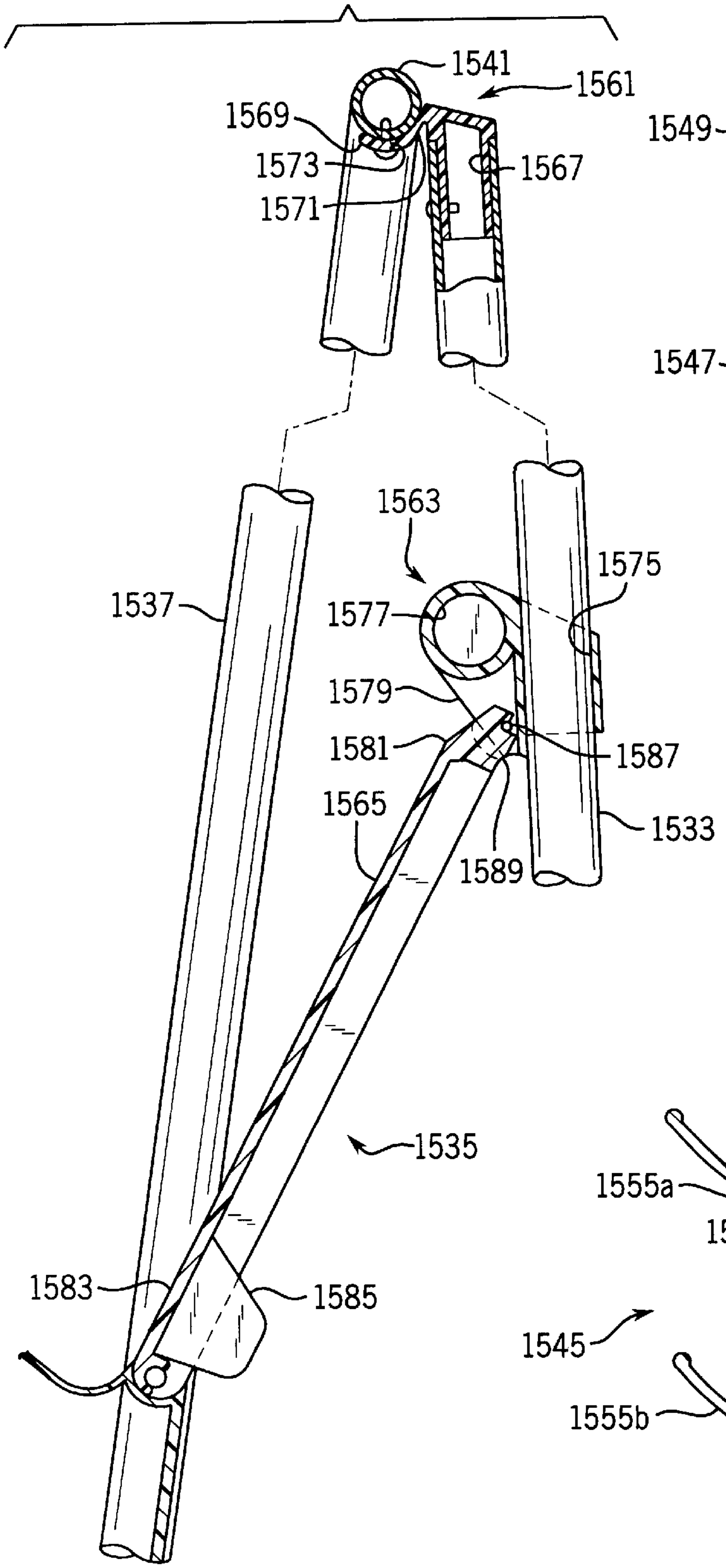
FIG. 51B is a fragmentary sectional perspective view of the mounting structure of FIG. 51A taken along line 51B—51B.
Figure 51D:
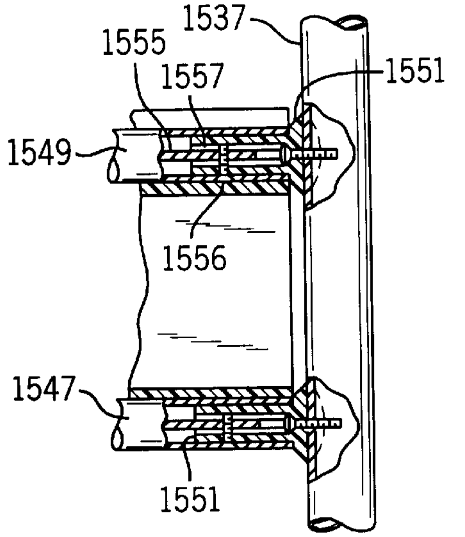
FIG. 51D is a fragmentary sectional perspective view of the mounting structure of FIG. 51A taken along line 51D—51D.
Figure 51C:
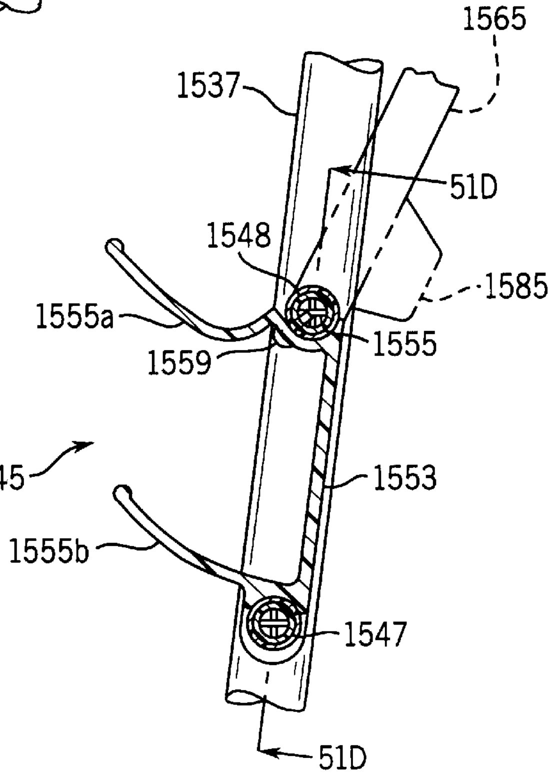
FIG. 51C is a fragmentary sectional perspective view of the mounting structure of FIG. 51A taken along line 51C—51C.

Referring to FIGS. 51A, 51C and 51D, a tray assembly 1545 is coupled to first side portion 1537 and second side portion 1539 of front frame member 1531. Tray assembly 1545 includes a lower tube 1547, a pair of upper tubes 1549, a plurality of inserts 1551, and a plastic tray 1553. Lower tube 1547 and upper tubes 1549 are coupled to first side portion 1537 and second side portion 1539 by inserts 1551 (e.g. working with fasteners such as screws). Inserts 1551 are disposed within ends of lower tube 1547 and outer ends of upper tubes 1549 and are configured to conform to the side of first side portion 1537 and second side portion 1539 portion to permit a secure attachment. According to a preferred embodiment, a plate 1555 is inserted into a groove 1557 of insert 1551 such that a fastener 1556 is threaded into the plate to provide a secure engagement between the tube and the inset. Plastic tray 1553 includes an upper portion 1555*a* and a lower portion 1555*b* (the upper and lower portion preferably have "U"-shaped profiles and are integrally molded). Plastic tray 1553 is configured to be captured between lower tube 1547 and upper tubes 1549. According to a preferred embodiment, a plurality of fasteners 1559 further secures tray 1553 to tube 1549.

Referring to FIG. 51B, pivot mechanism 1535 of folding easel 1530 includes a hinge member 1561, a sliding member or collar 1563, and a prop or pivoting arm 1565. Hinge member 1561 includes a plug or insert portion 1567, a mounting member 1569, and a hinge 1571 (which couples mounting member 1569 to insert portion 1567). Insert portion 1567 is configured to be inserted into rear frame member 1533 and can be held in place by any of a variety of methods, e.g. by an interference fit and/or a fastener (shown as a screw). Top portion 1569 includes an aperture 1573 and is configured to conform to horizontal upper portion 1541 and to be connected by a fastener (shown as a screw). Hinge member 1561 is configured to pivot rear frame member 1533 about hinge 1571. According to a preferred embodiment shown in FIG. 51B, hinge member 1561 is a molded article with a living hinge.

Collar 1563 includes a generally vertical bore 1575, a generally horizontal bore 1577, and a lower portion 1579. Vertical bore 1575 is configured to slidably engage rear frame member 1533, such that when rear frame member 1533 pivots (e.g. easel is being closed or opened), vertical bore 1575 slides along rear frame member 1533. Horizontal bore 1577 is configured to receive the user's finger such that when the user lifts folding easel 1530 by horizontal bore 1577, folding easel 1530 collapses due to the balance and weighting of the structure. In such a collapsed or folded position, folding easel 1530 can be stored or transported.

Figure 51E:
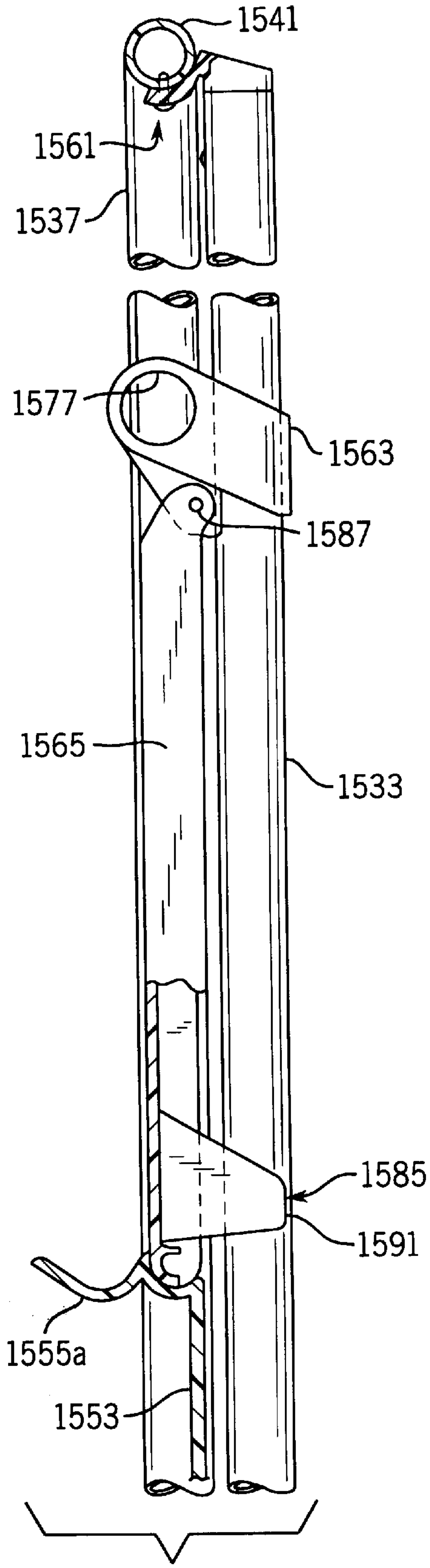
FIG. 51E is a fragmentary sectional perspective view of the mounting structure of FIG. 51A.

Pivoting arm 1565 includes a first end 1581 rotatably coupled to collar 1563, a second end 1583 rotatably coupled to (and configured to rotate about) horizontal upper tubes 1549, and a retaining member (shown as a compliant grip 1585) located adjacent second end 1583. When folding easel 1530 is in a fully open position, pivoting arm 1565 is in the substantially horizontal position and grip 1585 rests against tray assembly 1545. First end 1581 includes a pin 1587 and a middle portion 1589 adjacent to pin 1587. Pin 1587 and middle portion 1589 serve as a support and bearing surface for lower portion 1579 of collar 1563 when folding easel 1530 is in the substantially open position (shown in FIGS. 51A and 51B) and the substantially folded position (shown in FIG. 51E). Grip 1585 includes projections 1591 that are configured to receive rear frame member 1533 in a snap fit or interference fit engagement (as shown in FIG. 51E). As such, folding easel 1530 may be secured in a folded position for folded position display (e.g. propped against a wall), storage, transport.

Figure 52A:
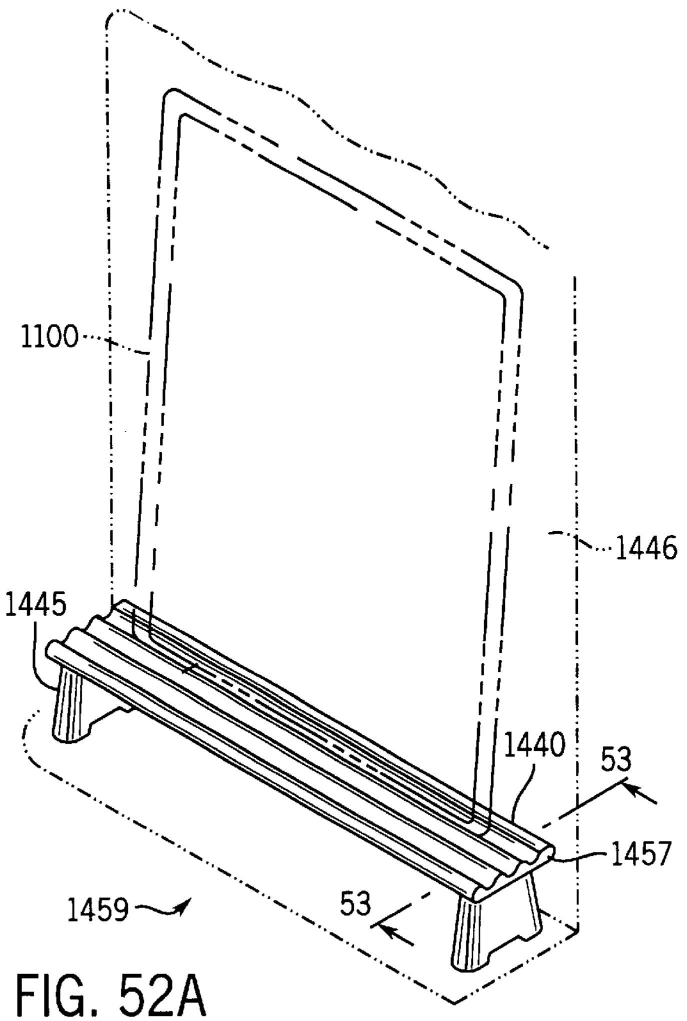
FIG. 52A is a perspective view of a mounting structure for a display board system according to an exemplary embodiment of the present invention.
Figure 53:
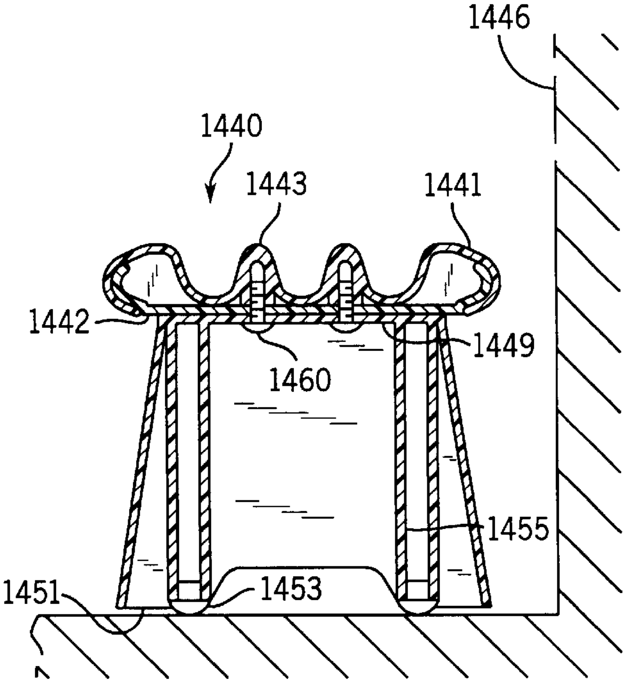
FIG. 53 is a fragmentary sectional perspective view of the mounting structure of FIG. 52 taken along line 53—53.
Figure 52B:
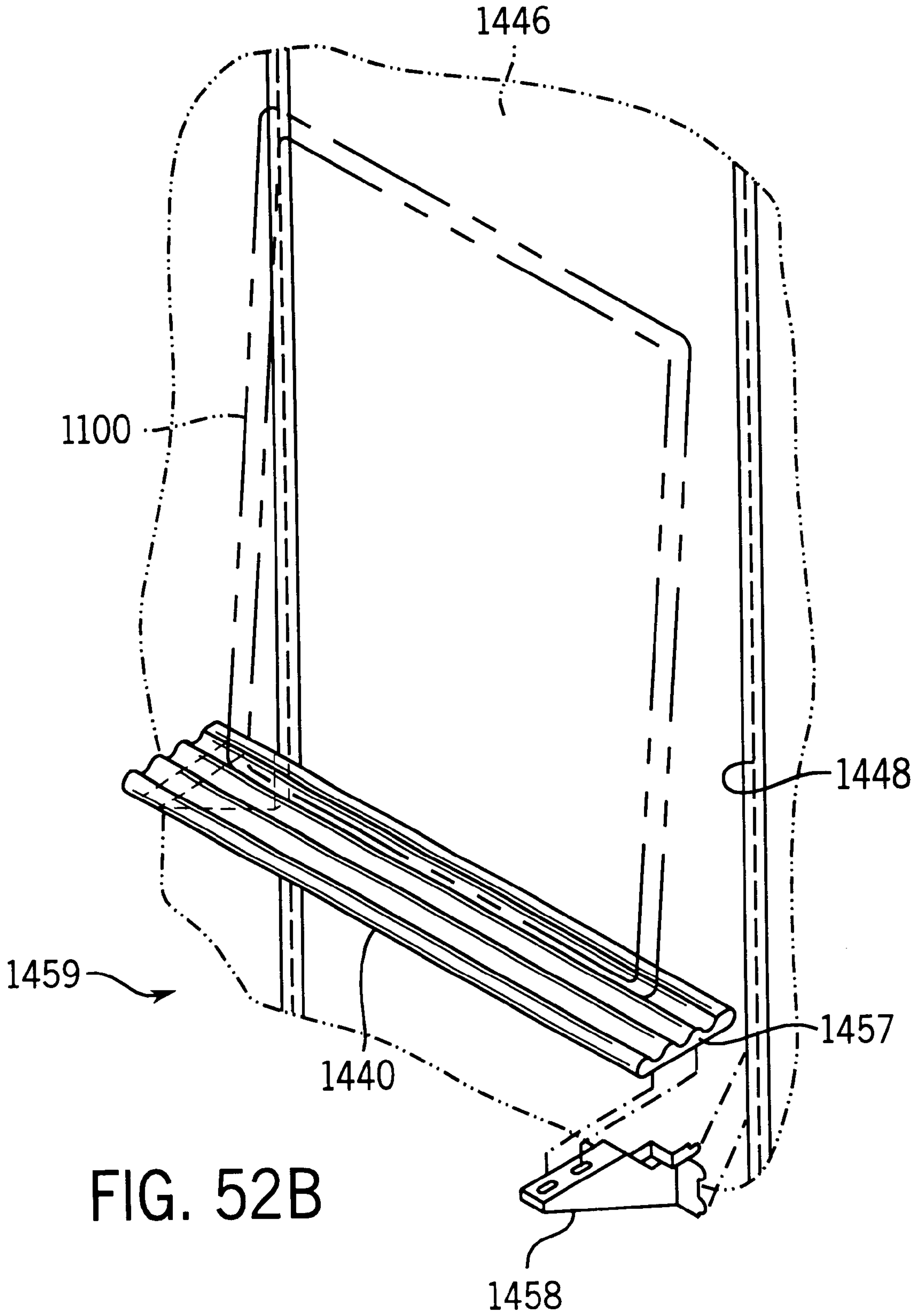
FIG. 52B is a perspective view of a mounting structure for a display board system according to an exemplary embodiment of the present invention.

Referring to FIGS. 52A, 52B, and 53, a mounting structure for one or more display boards 1100 is shown as including or providing a tray arrangement 1459. Tray arrangement 1459 includes a tray 1440 and a pair of supports (e.g. free standing supports 1445, mounting brackets 1458, or the like).

Tray 1440 includes upper surface 1441 and end caps 1457. Upper surface 1441 has a an undulating or varying surface formed by a plurality of vertically projecting guides 1443 that extend longitudinally along upper surface 1441 of tray 1440. Upper surface 1441, with guides 1443, is configured to provide a stand or support for display board 1100 (shown in phantom lines in FIGS. 52A and 52B). When tray 1440 is attached to the supports, the tray and supports form a sturdy mounting structure for display board 1100 (which may lean against a vertical structure such as wall 1446 or other article). Upper surface 1441 also forms a support structure or reservoir between adjacent guides 1443 for tools such as markers or the like (not shown). According to a particularly preferred embodiment, upper surface 1441 is formed by extrusion (e.g. plastic or metal such as aluminum) and end caps 1457 are molded plastic.

The supports may be provided in any number of configurations, including freestanding supports 1445 (as shown in FIGS. 52A and 53), mounting bracket 1458 (as shown in FIG. 52B), or the like. Freestanding supports 1445 are configured to attach to and support tray 1440 and each includes a top surface 1449 and a bottom surface 1451. End cap 1457 provides a lower surface 1442 wherein fasteners shown as screws 1460 connect the supports, lower surface 1442 of end cap 1457, and upper surface 1441. Bottom surface 1451 of freestanding supports 1445 is configured to rest on a floor or other work space. According to a preferred embodiment, free standing supports 1445 further include feet 1453, which are inserted into apertures in bottom surface 1451 and held by an interior support wall 1455 or boss adjacent the apertures. According to an alternative embodiment, the feet may be threaded to the interior support wall to allow for adjustment.

According to an alternative embodiment shown in FIG. 52B, the supports are comprised of a set of mounting brackets 1458. Mounting brackets 1458 are configured to attach to lower surface 1442 of end cap 1457 by fasteners, and to attach to wall 1446 (shown as a wall portion of a panel system) having rails 1448 configured to receive mounting brackets 1458. According to alternative embodiments, the brackets may be configured to attach (directly or indirectly) to any number of vertical structures including structural (e.g. drywall) walls or the like.

Referring to FIGS. 54 and 55, a mounting structure for one or more display boards 1100 is shown as including a rack 1220. Rack 1220 is configured to be mounted to a wall or other article (e.g. a structural wall, an architectural wall, or any other of a variety of conventional or other mounting arrangements) and is intended to provide a pivotal mounting interface for display boards 1100 (e.g. in the manner of a flip book with ready visibility of both surfaces of display boards 1100). Rack 1220 includes an upper interface 1226 and a lower interface 1228.

Upper interface 1226 includes a top section 1268, a bottom section 1270, each having surface 1272 and a front surface 1274. Surfaces 1272 are configured to abut to a structural or architectural wall using any number of a variety of mounting arrangements. A plate 1276 is positioned between top section 1268 and bottom section 1270 and extends out from front surface 1274. Plate 1276 includes five curved hooks 1278 forming five retaining slots 1280 (having a narrowing retaining profile as shown) aligned generally to vertical pegs 1262 of lower interface 1228. As evident from FIG. 56, upper interface 1226 is assembled by coupling top section 1268, plate 1276, and bottom section 1270 with fasteners 1275. According to a preferred embodiment, top section 1268 and bottom section 1270 are molded plastic articles having internal features 1273 configured to receive fasteners 1275 (e.g. threaded, or press-fit, or the like).

Lower interface 1228 includes a front surface 1258 providing a corrugated profile corresponding generally to engagements for display boards (slightly offset and larger). Extending from front wall 1258 of base 1228 is a horizontal ledge 1260 with a plurality of vertical pegs 1262 (shown as five rounded posts). Horizontal ledge 1260 further includes an upwardly extending pad 1264 wherein corner member 1106 of display board 1100 rests on pad 1264, which is intended to provide a bearing surface or frictional input for the corner member to slide against or to be held in a static position after being positioned or released by the user. According to a particularly preferred embodiment, pad 1264 is made from a medium density, closed cell sponge; alternatively, the pad may be made from any of a wide variety of other types of foam, sponge, or other compressible material having the desired characteristics. According to an alternative embodiment, the front wall 1258 further include vertical ribs 1265 configured to provide a guide (visual and physical) to assist the installation of the corner member of display board 1100 (e.g. to locate or "find" peg 1262).

As is evident from the Figures, rack 1220 is intended to provide a pivotal mounting interface for one of a plurality of display boards (one is shown as according to a particularly preferred embodiment, though according to alternative arrangements the mounting structure can provide for any number of display boards). In FIG. 54, hook 1278 and corresponding retaining slot 1280 of upper interface 1226 of rack 1220 are shown being engaged by post 1168 of corner member 1106 of display board 1100. Post 1168 is disengageable at the relatively wide opening of retaining slot 1280. Post 1168 is engaged (e.g. "gripped") having been guided around hook 1278, namely slid into and around the narrowing retaining profile of retaining slot 1280, and into a secure, trapped (placement) fit at a terminus 1280*a* (e.g. terminus 1280*a* has an inner diameter or profile slightly larger than an outer diameter of cylindrical post 1168). The weight of the display board serves to retain the post in the terminus of the retaining slot in use (e.g. pivotal movement of the display board). In FIG. 55, peg 1262 of lower interface 1228 is shown being engaged through aperture 1152 in corner member 1106 of display board 1100.

FIGS. 59 through 60 show an exemplary embodiment of accessories for use with one or more display boards. FIG. 59 shows a utility clip 1200. Utility clip 1200 includes two clip portions 1202, each having a pair of curved projections 1204 connected by a central web 1206 having outwardly extending ribs 1207 configured to center the attached article. Clip portions 1202 are shaped and sized to fit onto extruded edge trim members of a display board 1100. Utility clip 1200 may be used to attach adjacent display boards by their adjacent extruded edge trim members (e.g. providing a display board "interlock"). According to a preferred embodiment, clip portions 1202 each have ribs 1203 that are configured to engage grooves 1101 of side frame members 1102, top frame member 1204*a*, or bottom frame member 1204*b* (yet will readily allow for detachment). Ribs 1203 of clip portions 1202 are also configured to attach presentation tools (e.g. a marker, eraser, pointer, etc.) to display board 1100 (shown in phantom lines). According to any preferred embodiment, utility clip 1200 is made of a compliant, spring-like material such as plastic, and will be provided with a mating profile, whether provided by projections or other engaging elements, that are suitably matched to the shape or construction of the corresponding frame or edge of the display boards to allow selectively for secure attachment and removal.

Referring to FIGS. 61 through 64B, a mounting structure is shown as a mobile easel 1610. Mobile easel 1610 is a generally rigid and symmetrical structure and includes a base frame 1612 and a sub-board or panel 1611 mounted to base frame 1612 by a first set of panel support brackets 1613*a* and a second set of panel support brackets 1613*b*. According to an alternative embodiment, the mobile easel includes a second panel attached to the opposite side of the base frame with panel support brackets.

Base frame 1612 includes horizontal side cross members 1614 and four legs 1618, each having a rotatable caster 1617 (providing a rotating wheel 1619) so that mobile easel 1610 may roll across a floor F. According to a preferred embodiment, horizontal side cross members 1614 and the respective legs 1618 are formed as an integrally molded unit (or an integrally cast unit) and bottom member 1616 is formed of an integrally molded or fabricated unit that forms a pan.

Base frame 1612 also includes a pair of generally vertical support frame members 1620 coupled by horizontal lower cross members 1621 and horizontal upper cross members 1622. Support frame members 1620 each have a curved upper portion 1624 with an arcuate cross section (preferably tear-drop shaped), that is configured to correspond the profile of a user's hand and intended to provide an ergonomic interface when mobile easel 1610 is being rolled across the floor or otherwise positioned by the user. According to a preferred embodiment, vertical support frame members 1620 are formed from as an integral part (e.g. bent tubing, cast, molded, etc.).

Support frame members 1620, lower cross members 1621, and upper cross members 1622 are configured to define a stowing area 1615 for display boards 1100 or other related articles. According to a preferred embodiment, stowing area 1615 is open and accessible from the sides, which is intended to allow insertion and removal of display boards in a convenient fashion.

As shown, front panel 1634 is formed from multiple sheets or panels coupled together (shown in the FIGURES as two panels), which are intended to increase rigidity of the panel. Panel 1611 includes a front panel 1634, a back panel 1636, a pair of retaining members (shown as compliant grips 1628) attached to panel 1611, a tray assembly 1630 coupled to panel 1611, and an engagement portion 1632. Front panel 1634 includes a plurality of front depressions 1631 and back panel 1636 includes a plurality of back depressions 1633 that substantially align with and contact back depressions 1633 when front panel 1634 is coupled to back panel 1636. Front panel 1634 is coupled to back panel 1636 by any of a variety of coupling methods (e.g. ultrasonic welding, fasteners, heat staking, etc.). According to a preferred embodiment, front panel 1634 and back panel 1636 are separately molded and pressed or joined together at the edges and at front depressions 1631 and back depressions 1633 to form a rigid structure.

Engagement portion 1632 is located on back panel 1636 and configured to interface with first set of panel support brackets 1613*a* and second set of panel support brackets 1613*b*. Engagement portion 1632 may be formed by any number of operations (e.g. machining, integrally molding, attaching rails to back panel 1638 using fasteners, ultrasonic welding, heat, etc.). Engagement portion 1632 includes vertical slot 1651, a first portion 1641, a second portion 1643, and a third portion 1645. Second portion 1643 and third portion 1645 each include a horizontal slot 1646 and provide an engagement surface 1647 that interfaces with panel support brackets 1613*a* and 1613*b* to support panel 1611.

Both first set of support brackets 1613*a* and second set of support brackets 1613*b* are rigid molded plastic articles that are coupled to horizontal upper cross member 1622 and horizontal lower cross member 1621. First set of panel support brackets 1613*a* and second set of panel support brackets 1613*b* each include a pair of notches 1649 having a "U"-shaped profile, an angled portion 1653, a base 1655, a stem 1657 extending from base 1655, and a neck 1659 connecting stem 1657 and angled portion 1653. Base 1655 is attached to the respective horizontal member with fasteners (e.g. threaded, press fit, integral press fit, or the like). According to a preferred embodiment, brackets 1613*a* and brackets 1613*b* are identical, and first set of panel support brackets 1613*a* are attached to horizontal member 1621 with notches 1649 facing generally upward; second set of panel support brackets 1613*b* are attached to horizontal member 1622 with notches 1649 facing generally downward (i.e. rotated 180 degrees from first set of panel support brackets 1613*a*). First set of panel support brackets 1613*a*, second set of panel support brackets 1613*b*, and slots 1646 are configured to provide multiple positions (e.g. three) in which panel 1611 may be vertically secured. In each position, notches 1649 of first set of panel support brackets 1613*a* engage engagement surface 1647 of slot 1646 (second portion 1643, or third portion 1645). According to an alternative embodiment, the panel may be held in place anywhere along the length of the slot.

Figure 64A:
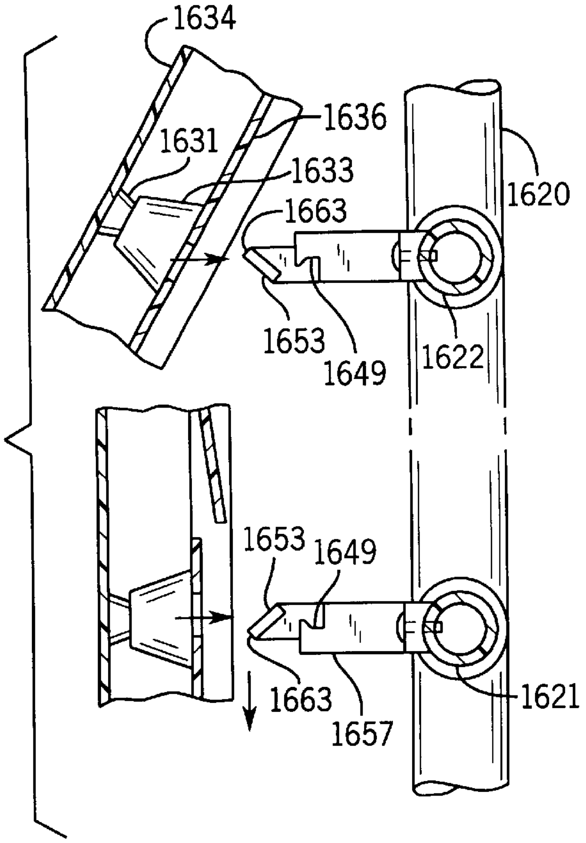
FIG. 64A is a fragmentary sectional perspective view of the mounting structure of FIG. 61A taken along line 64A—64A.
Figure 64B:
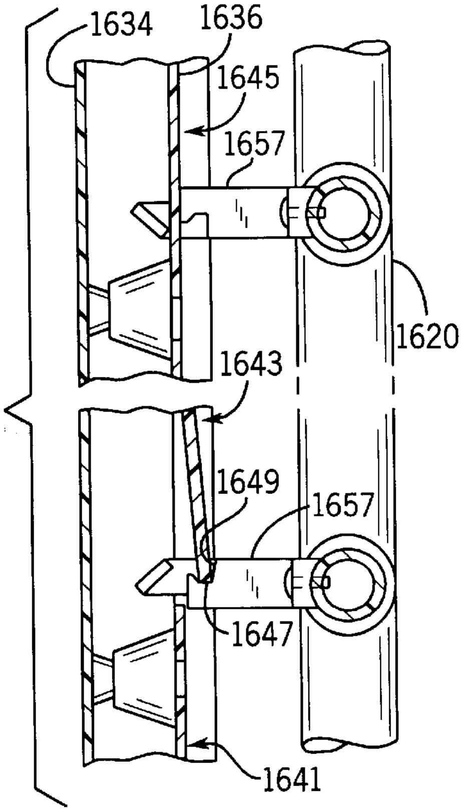
FIG. 64B is a fragmentary sectional perspective view of the mounting structure of FIG. 61A taken along line 64B—64B.

Referring to FIGS. 64A and 64B, panel 1611 is mounted to base frame 1612 by angling the panel approximately twenty degrees to engage second set of panel support brackets 1613*b* and slots 1646 of third portion 1645 (in alternative embodiments any angular orientation may be used, although a range from 15 to 30 degrees may be preferred). After angled portions 1653 are inserted through slots 1646, panel 1611 is rotated until substantially vertical. First set of support brackets 1613*a* are aligned with first portion 1641 so that panel 1611 can be slid downward until angled portions 1653 of brackets 1613*a* are disposed in engagement portion 1632. Panel 1611 can be further slid downward until brackets 1613*b* engage second portion 1643. (Panel 1611 is thereby captured by angled portions 1653 and supported by notches 1649 of brackets 1613*a*.) After panel 1611 is mounted on the panel support brackets, tray assembly 1630 is attached (at the bottom of panel 1611). Tray assembly 1630 includes an upper tray 1591, a lower tray 1593 and a rear member 1595. Upper tray 1591 and front panel 1634 of panel 1611 are configured to support display board 1100 for display. Lower tray 1593 is configured to (among other purposes) hold presentation tools (e.g. markers and erasers (not shown)). Rear member 1595 is configured to fit in a recess 1596 disposed at the bottom of panel 1611 and adjacent to engagement portion 1632. When tray assembly 1630 is attached to panel 1611, rear member 1595 prevents panel 1611 from being removed from mobile easel 1610 by preventing first set of panel support brackets 1613*a* from sliding out of engagement portion 1632. Such a feature is intended to prevent accidental disengagement of the panel from the mobile easel. During use, the relative height of panel 1611 may be adjusted by lifting the panel slightly until engagement portion 1632 clears notches 1649 and the panel may be moved vertically while angled portions remain disposed within engagement portion 1632.

Figure 61:
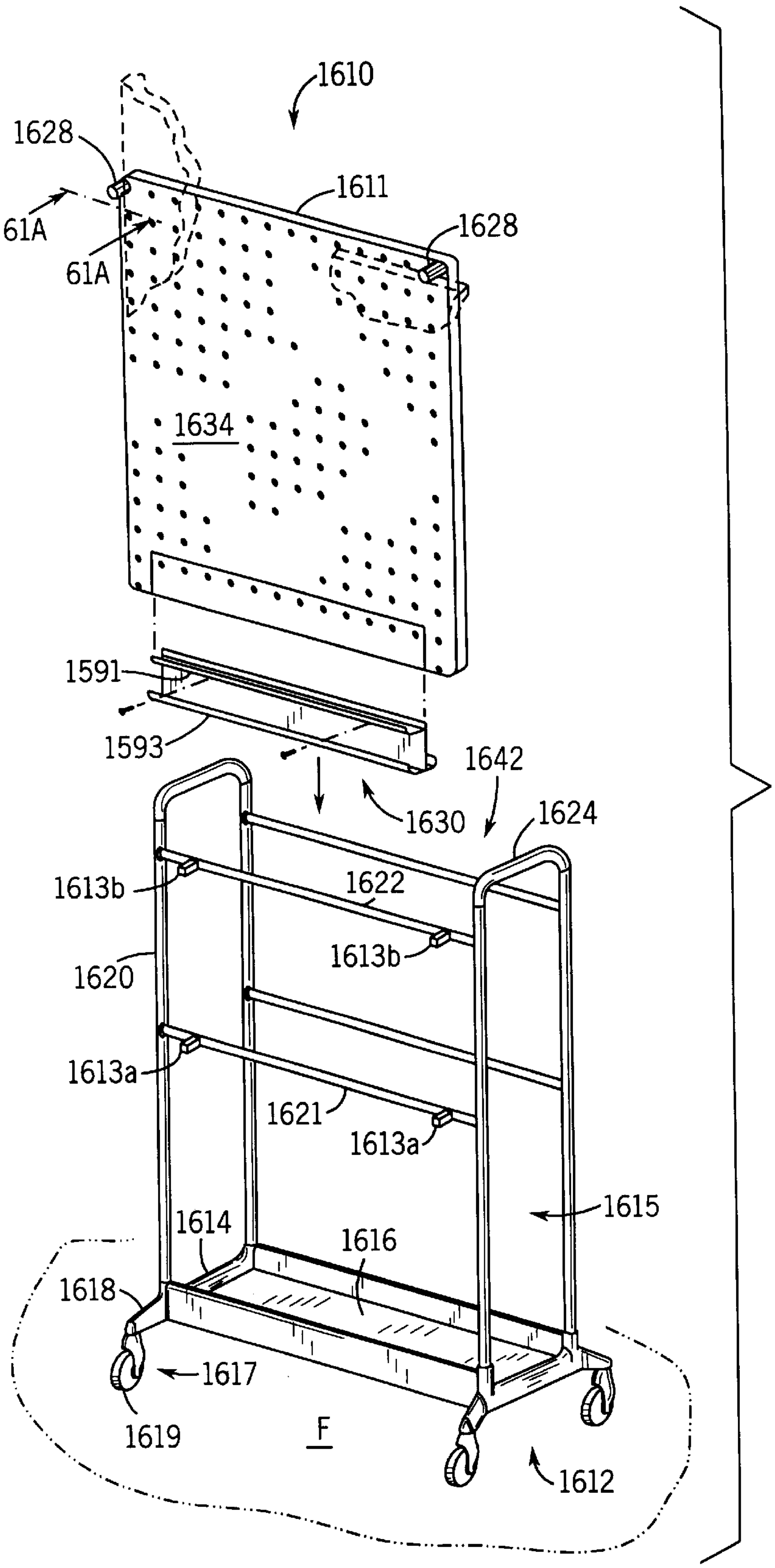
FIG. 61 is a perspective view of a mounting structure for a display board system according to an exemplary embodiment.
Figure 62:
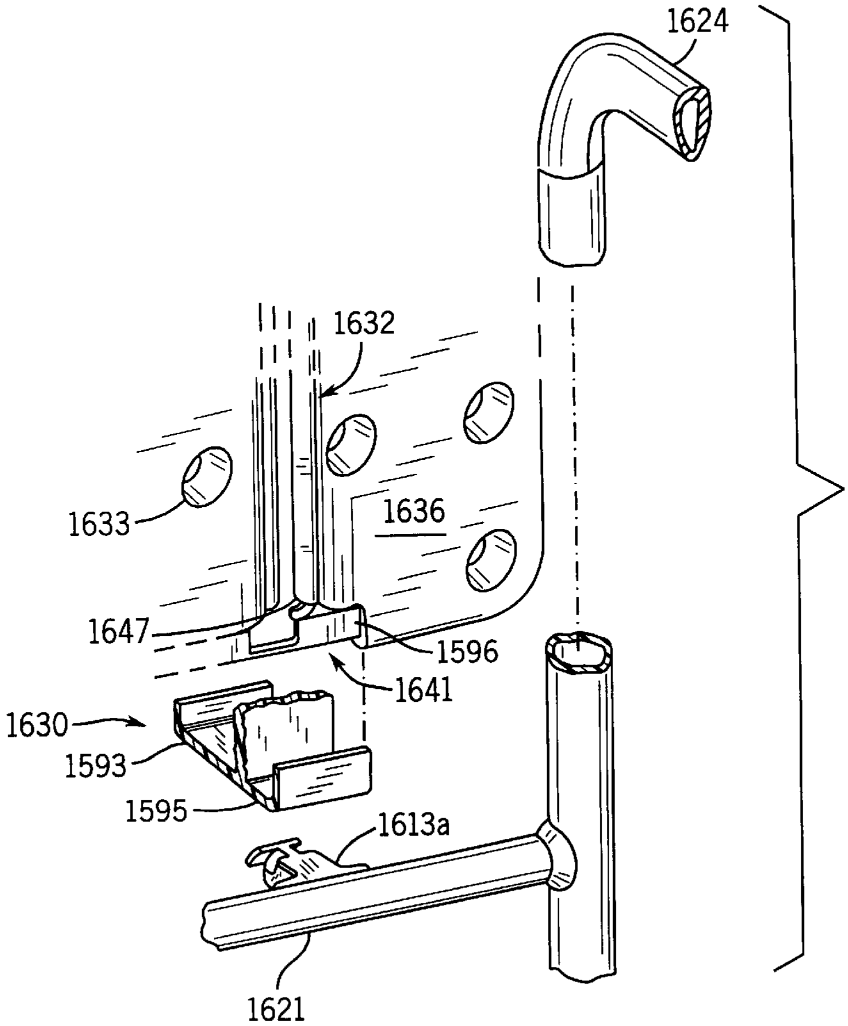
FIG. 62 is a fragmentary sectional perspective view of the mounting structure of FIG. 61 showing a mounting arrangement for a display board.
Figure 61A:
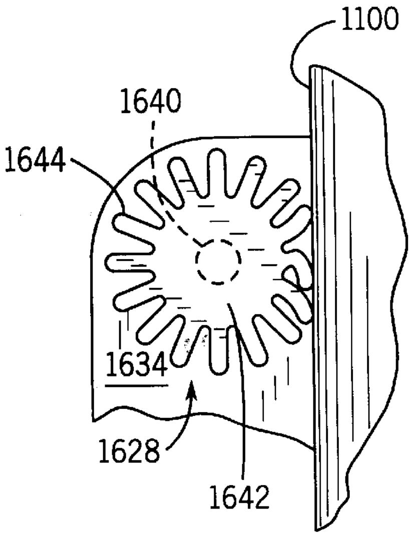
FIG. 61A is a fragmentary perspective view of the mounting structure of FIG. 61.
Figure 63:
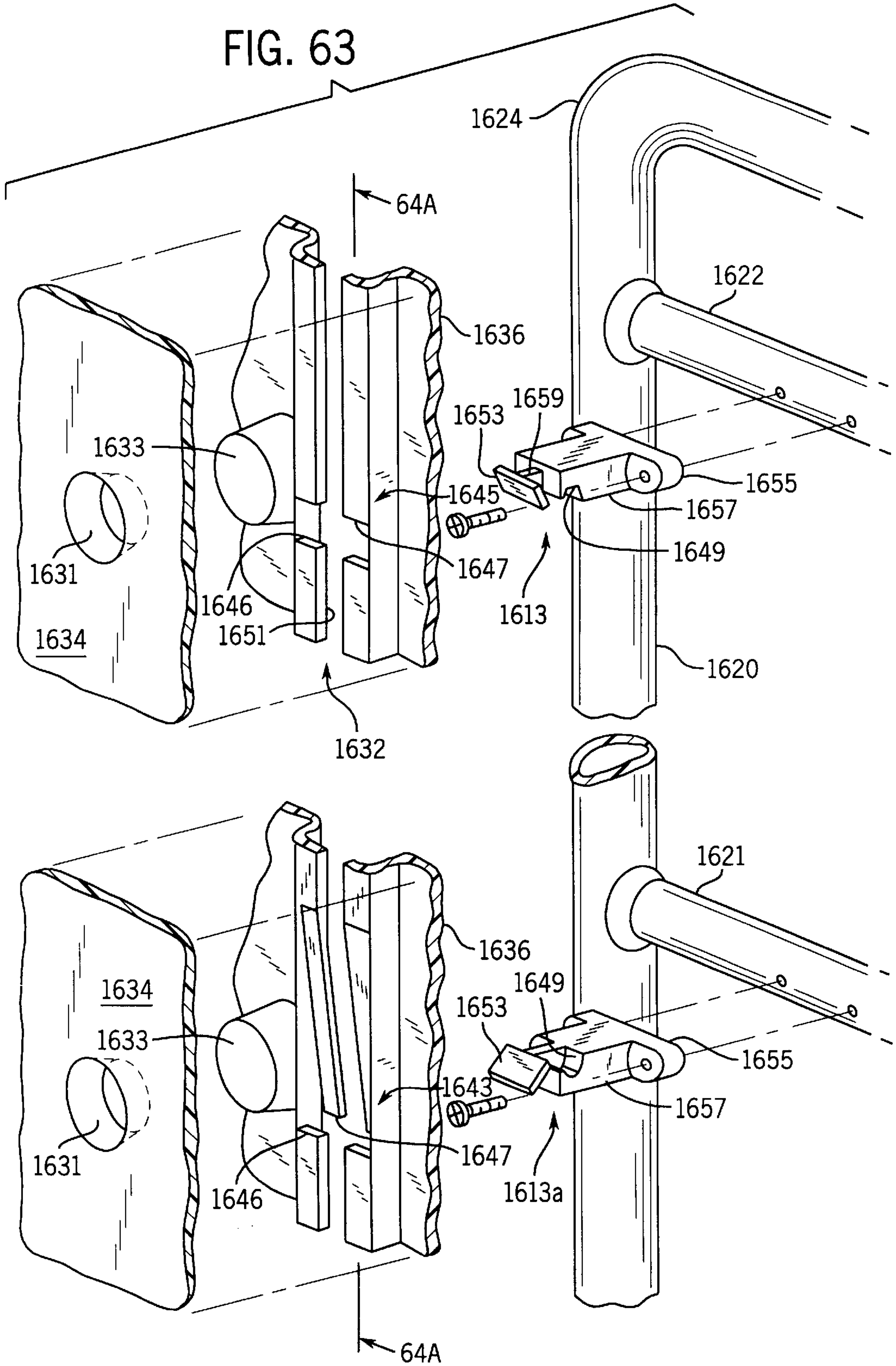
FIG. 63 is a fragmentary exploded perspective view of the mounting structure of FIG. 61.

Referring to FIGS. 61 and 61A, grips 1628 extend from front panel 1634 and are configured to provide display board 1100 with an interference fit when mounted on tray assembly 1630. Grips 1628 each have a rigid core 1640 and a compressible outer layer 1642 having a plurality of outwardly extending fins 1644. Fins 1644 of grips 1628 provide a secure interference when display board 1100 is mounted on panel 1611 of mobile easel 1610. Grips 1628 are positioned to engage display board 1100 whether the display board is in a generally vertical position (i.e. "portrait") or in a generally horizontal position (i.e. "landscape") (as shown in FIG. 61 with phantom lines).

Figure 65A:
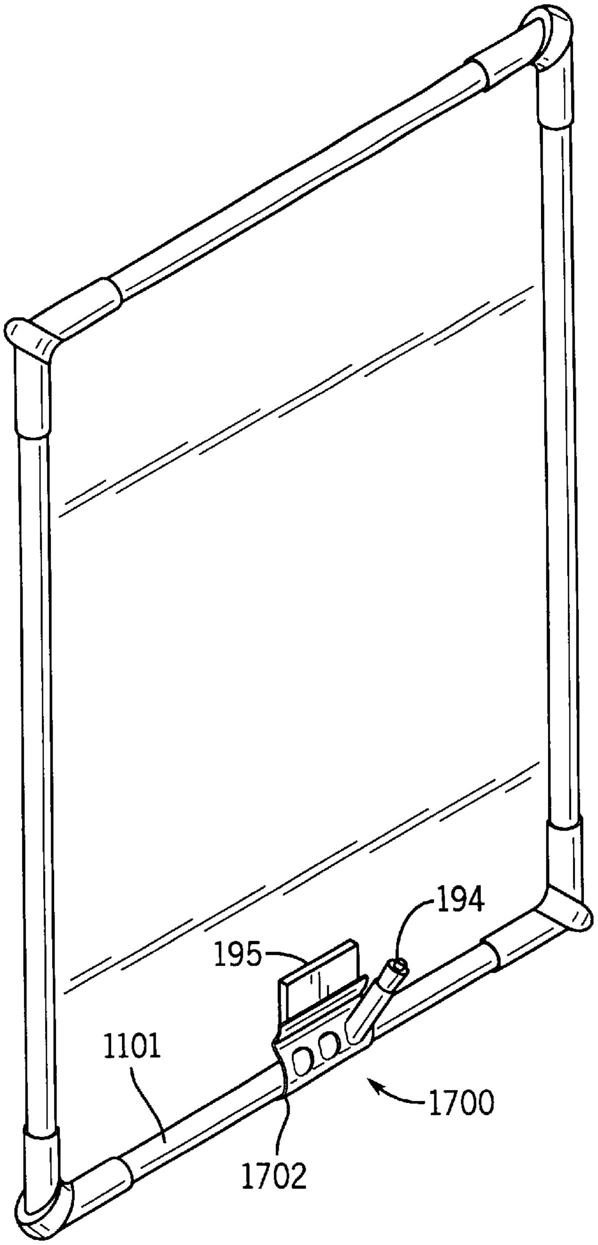
FIG. 65A is a perspective view of a display board system including a storage clip according to an alternative embodiment.
Figure 65B:
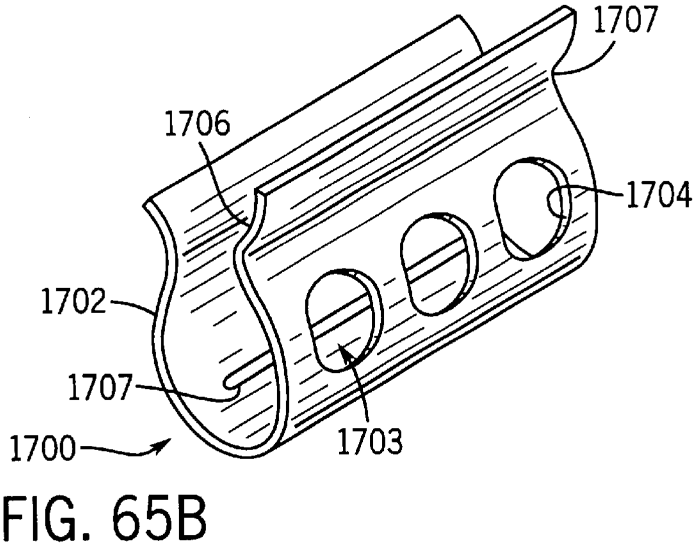
FIG. 65B is a perspective view of the storage clip of FIG. 65A.

FIGS. 65A through 73E show exemplary embodiments of accessories for use with one or more display boards. FIGS. 65A and 65B show a storage clip 1700 configured to couple to display board 1100 and to store one or more presentation tools. Storage clip 1700 includes a clip portion 1702 having a plurality of receptacles 1703 (defined by apertures 1704), a ledge 1706, and a neck portion 1707 having a reduced diameter that is disposed between clip portion 1702 and ledge 1706. According to a preferred embodiment, clip portion 1702 has internal features (e.g. ribs 1707 comparable to ribs 1176 on corner members 1106) that are configured to engage grooves 1101 of any of the edge trim members. Clip portions 1702 are configured to deform to allow both attachment and removal of storage clip 1700 when desired so that clip portion 1702 fits securely onto extruded edge trim members (e.g. as to prevent undesired slipping or sliding along trim members when receptacle 1703 is being loaded or unloaded). Apertures 1704 are each configured to receive any number of a variety of presentation tools (such as marker 194, a pointer, or the like). Ledge 1708 is configured for eraser 195, but also may receive any number of a variety of other presentation tools.

FIG. 66 shows a label clip 1708 configured for labeling display board 1100 with indicia (e.g. marking, label, or other information). Label clip 1708 includes a clip portion 1710 and a display surface 1712. According to a preferred embodiment, clip portion 1710 has internal features (e.g. ribs comparable to ribs 1176 on corner members 1106) that are configured to engage grooves 1101 of edge trim members. Clip portion 1710 is configured to deform readily to allow both attachment and removal of label clip 1708 when desired so that clip portion 1710 fits securely onto extruded edge trim members (e.g. as to prevent undesired slipping or sliding along trim members when receptacle is loaded). According to a preferred embodiment, display surface 1712 of label clip 1708 is made of a material that is "writable" (e.g. by a writing instrument such as marker 194), either permanently or erasably (i.e. reusable for a number of cycles such as a Melamine paper dry-erase, "white display board" surface, or the like). According to an alternative embodiment, a label (e.g. a sheet having a surface with a pressure sensitive adhesive or other adhesive or the like) can be attached to display surface 1712 to "label" the display board. According to an alternative embodiment, the label clip includes two corresponding display surfaces disposed on both sides of the display board.

Figure 67A:
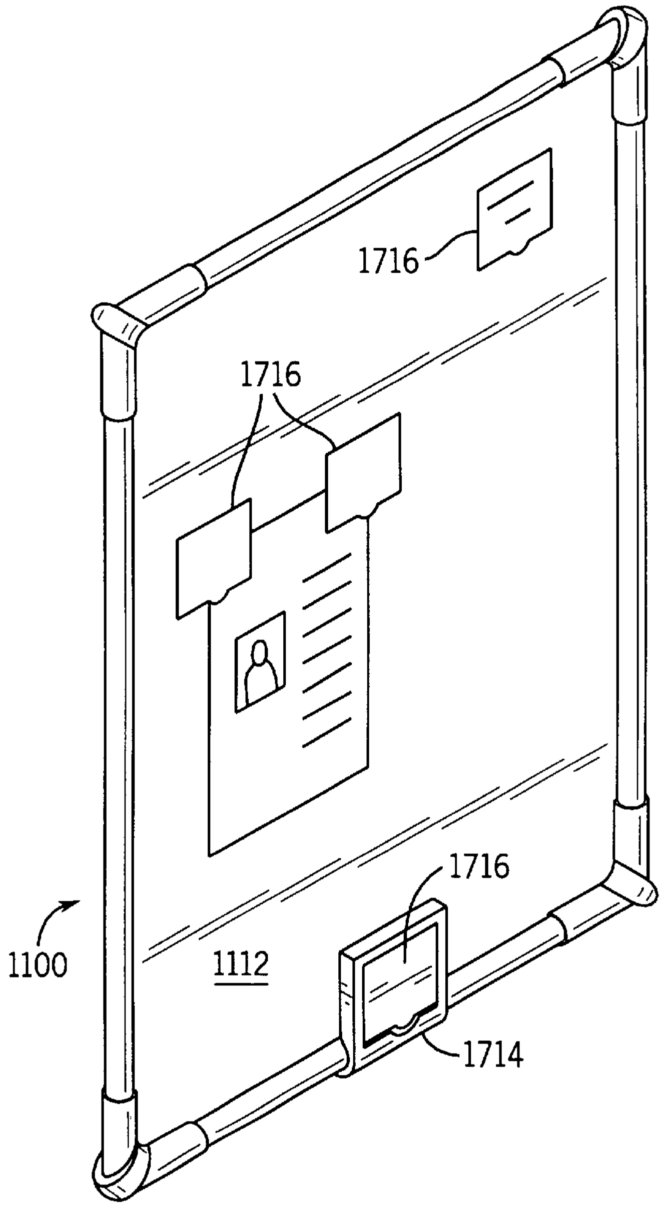
FIG. 67A is a perspective view of a display board system including an adhesive sheet dispenser according to an alternative embodiment.
Figure 67C:
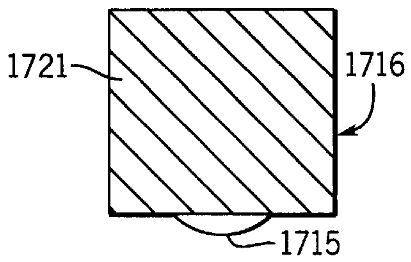
FIG. 67C is a rear elevation view of an adhesive sheet.
Figure 67B:
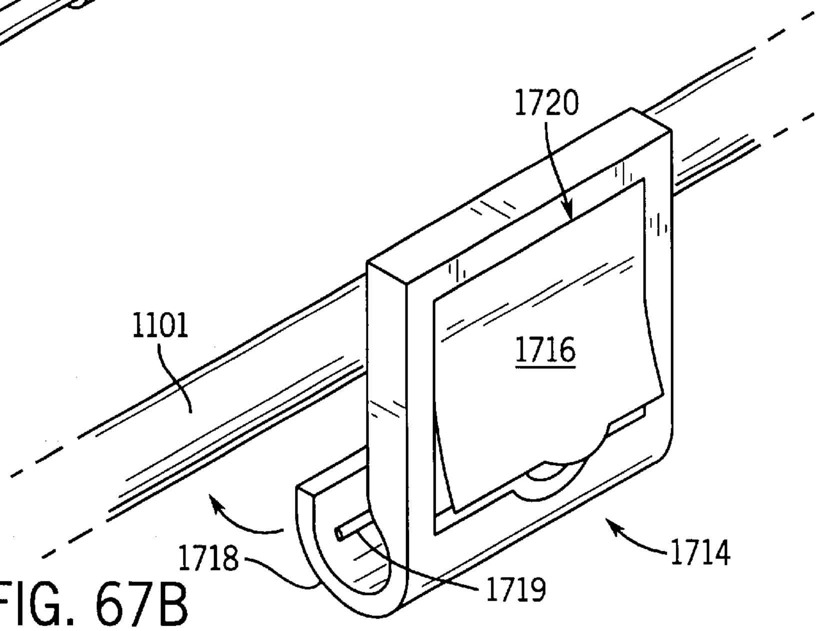
FIG. 67B is an exploded fragmentary perspective view of the adhesive sheet dispenser of FIG. 67A.

FIGS. 67A and 67B show an adhesive sheet dispenser 1714 configured to store and dispense adhesive sheets 1716. Adhesive sheet dispenser 1714 includes a clip portion 1718 and a dispenser cavity 1720. According to a preferred embodiment, clip portion 1718 has internal features (e.g. ribs 1719 comparable to ribs 1176 on corner members 1106) that are configured to engage grooves 1101 of edge trim members. Clip portion 1718 is configured to deform to allow both attachment and removal of adhesive sheet dispenser 1714 when desired so that clip portion 1718 fits securely onto extruded edge trim members (e.g. as to prevent undesired slipping or sliding along trim members when receptacle is loaded).

Dispenser cavity 1720 is configured to receive a plurality of adhesive sheets 1716 (e.g. sheets of paper or other material having a surface coated with a reusable/repositionable adhesive (e.g. "tacky" or "sticky") surface treatment that is formulated to stick to a dry-erase surface). According to a preferred embodiment, adhesive sheets 1716 have a tab 1715, which is not coated with the reusable/repositionable adhesive surface treatment 1721, so that the adhesive sheet may be effectively applied or removed. Adhesive sheets 1716 are configured to removably adhere to the display board so that sheets of paper (and other flat media) or other material may be displayed (e.g. "paper capture"). Alternatively, the adhesive sheets may be applied to the display board as a "flag" or to provide a medium for the user to write on. Alternatively, any of a number of other commercially available display materials or products may be dispensed from dispenser cavity 1720 (e.g. products of a type similar to the POST-IT (TM) memoboard/bulletin board adhesive surface products commercially available from 3M Corporation of St. Paul, Minn.). According to an alternative embodiment, adhesive sheets 1716 have a surface coated with a non-reusable/non-repositionable adhesive surface treatment.

Figure 68:
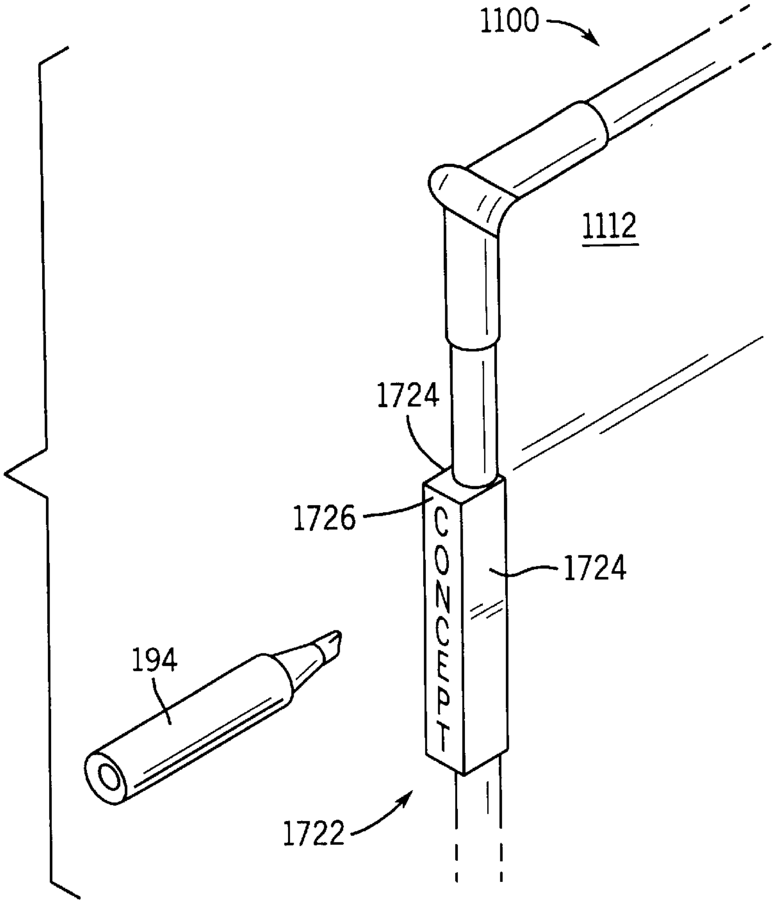
FIG. 68 is a fragmentary perspective view of a display board system including a label clip according to an alternative embodiment.

FIG. 68 shows a label clip 1722 formed from a pair of curved projections 1724 coupled by a label portion 1726. According to a preferred embodiment, curved projections 1724 have internal features (e.g. ribs comparable to ribs 1176 on corner members 1106) that are configured to engage grooves 1101 of edge trim members. Curved projections 1724 are configured to deform readily to allow both attachment and removal of label clip 1722 when desired so that curved projections 1724 fit securely onto extruded edge trim members (e.g. as to prevent undesired slipping or sliding along trim members when receptacle is loaded).

Label portion 1726 of label clip 1722 is made of a material that is "writable" (e.g. by marker 194), either permanently or erasably (i.e. reusable for a number of cycles such as a Melamine paper dry-erase, "white display board" surface, or the like). Alternatively, a label working with an adhesive on label portion 1726. As shown, label clip 1722 fits securely (and removably) onto edge trim members of display board 1100 by spring tension and is made of a plastic material.

Figure 69A:
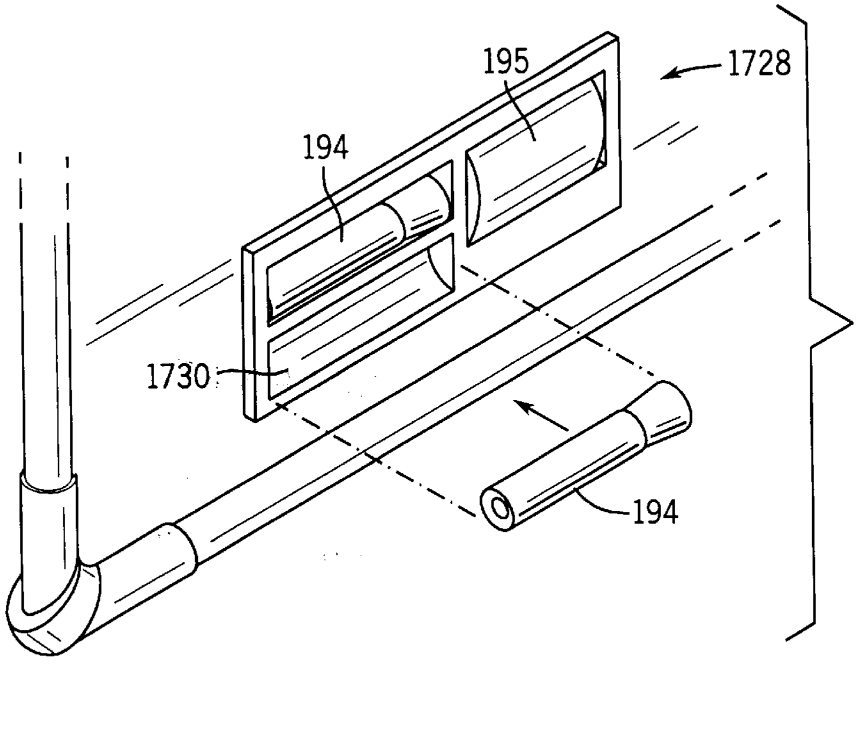
FIG. 69A is a fragmentary perspective view of a display board system including a storage article according to an alternative embodiment.
Figure 69B:
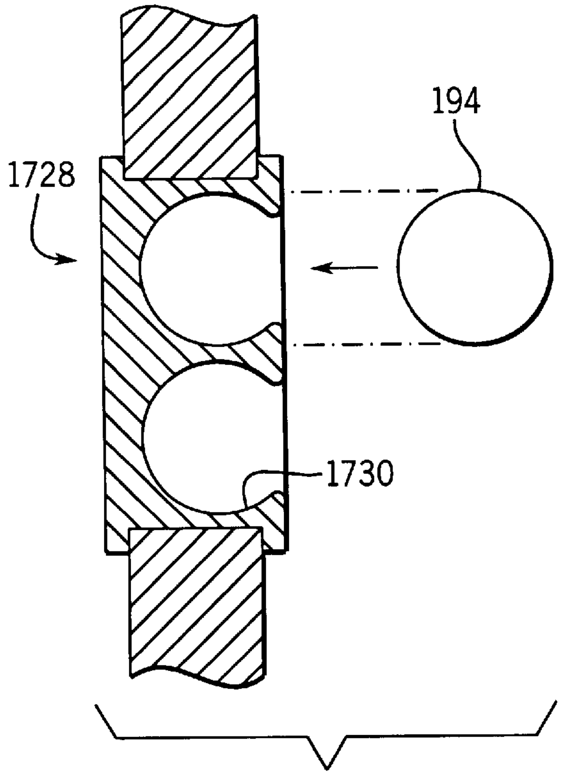
FIG. 69B is a fragmentary sectional view of the storage article of FIG. 69A taken along line 69B—69B in FIG. 69A.
Figure 69C:
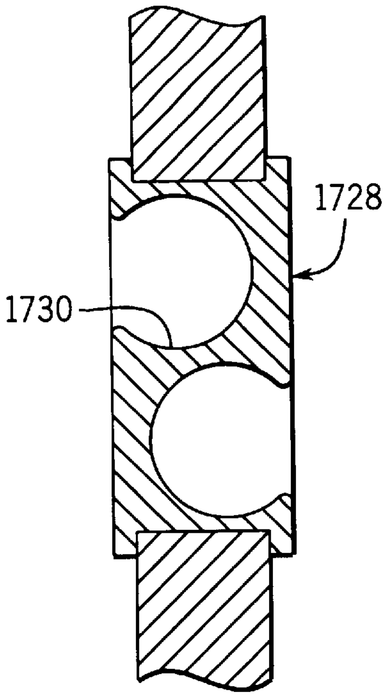
FIG. 69C is a fragmentary sectional view of a display board system including a storage article according to an alternative embodiment.

FIGS. 69A through 69C show an integrated storage compartment 1728 including one or more receptacles 1730 configured to store any of a variety of other presentation tools (such as marker 194, eraser 195, or the like). Receptacles 1730 are shaped and sized for secure attachment and removal of a variety of presentation tools. According to a preferred embodiment, storage compartment 1728 is embedded or "built" in to a cavity or an aperture in display board 1100, and is made from a rigid plastic or foam. The storage compartment 1728 may be configured to provide receptacles on one side of the display board (as shown in FIG. 69B), or provide receptacles on two sides of the display board (as shown in FIG. 69C).

Figure 70A:
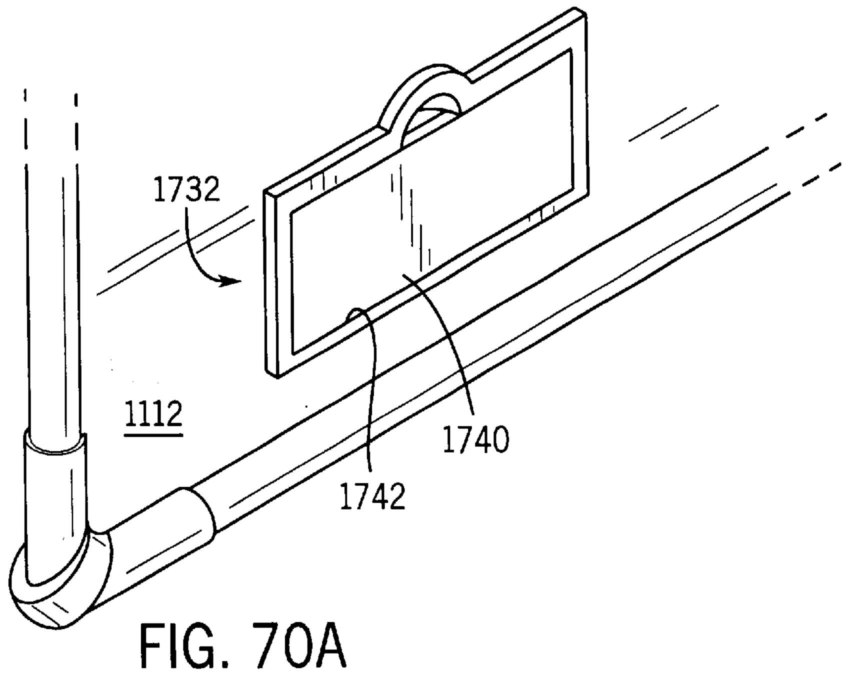
FIG. 70A and FIG. 70B are fragmentary perspective views of a display board system including a storage device according to an alternative embodiment.
Figure 70B:
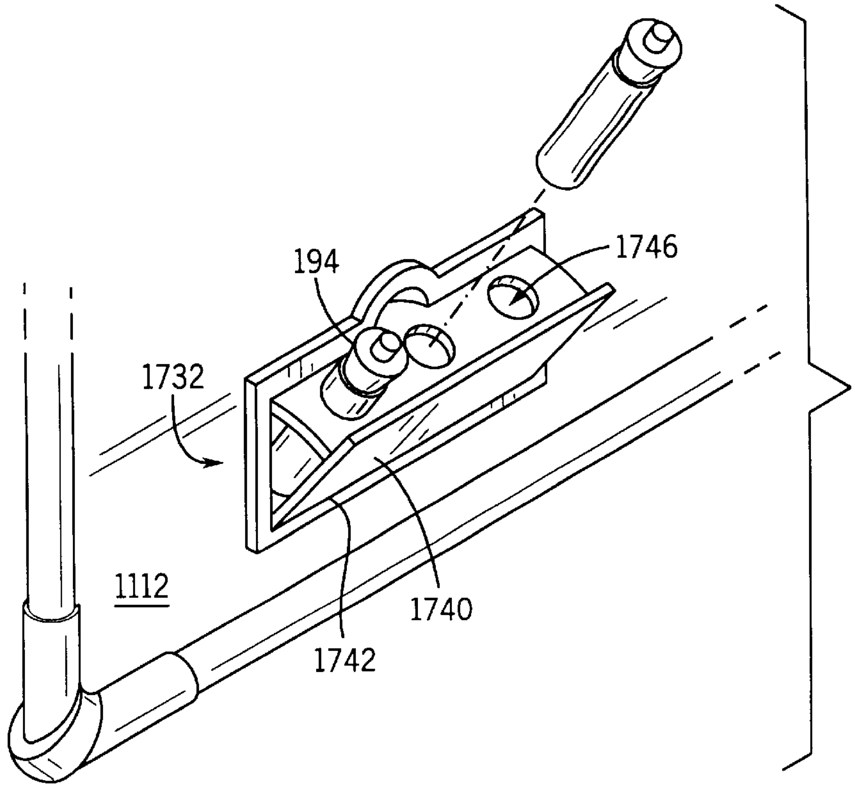
Figure 70C:
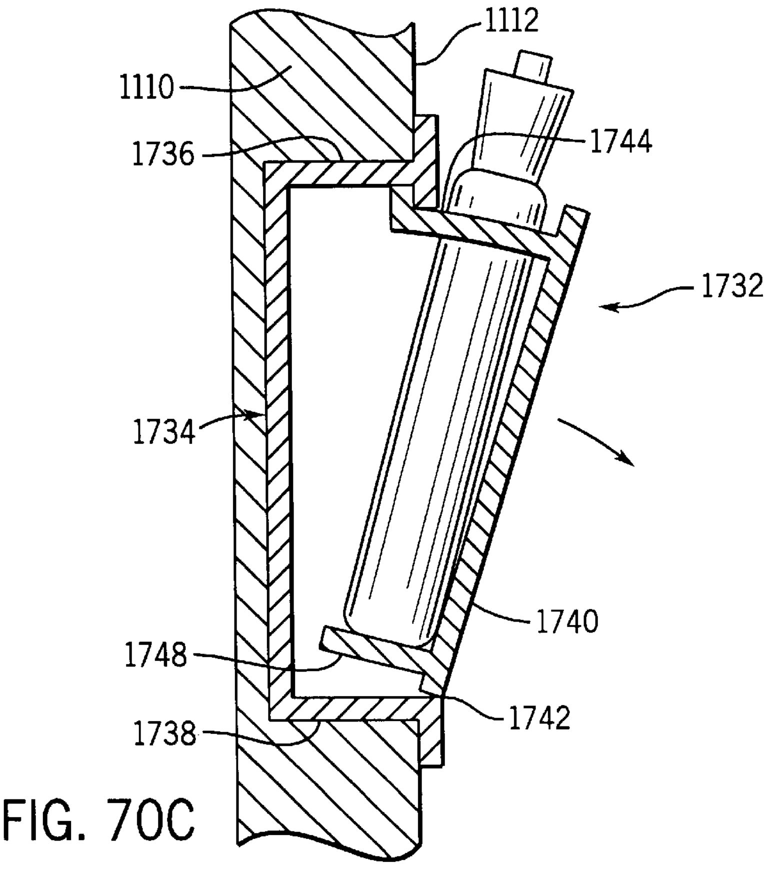
FIG. 70C is a sectional view of the storage device of FIG. 70B taken along line 70C—70C in FIG. 70B.

In FIGS. 70A through 70C, a storage device shown as a pivoting storage tray 1732 is provided for any of a variety of presentation tools (e.g. marker 194). Storage device 1732 is configured to pivot between a closed position (as shown in FIG. 70A) and an open position (as shown in FIGS. 70B and 70C). Storage tray 1732 includes a frame member 1734 (with a top portion 1736 and a bottom portion 1738) configured to be mounted in a cavity in rigid solid core 1110. A front panel 1740 is pivotally connected to bottom portion 1738 of frame member 1734 by a hinge 1742 (shown as an integral feature, i.e. a "living" hinge). According to alternative embodiments, other hinge designs may be used. Front panel 1740 includes a tray or upper member 1744 having one or more receptacles 1746 that are shaped and sized to receive a variety of presentation tools. When storage tray 1732 is in the open position, upper member 1744 and top portion 1736 of frame member 1734 coact to limit the degree to which front panel pivots away from frame member 1734. Also, when storage tray 1732 is in the open position, one or more markers or other presentation tools may be stored in receptacles 1746. According to a preferred embodiment, presentation tools are supported by a lower member 1748 (which extends from front panel 1740) when stored in receptacles 1746. When storage tray 1732 is in the closed position, front panel 1740 is configured to be nearly flush with the surface of the display board. According to a preferred embodiment, storage tray 1732 includes a recess 1750 that is configured to provide the user with a place to engage the panel to pivot it to an open position. According to a preferred embodiment, storage device 1732 is molded as an integral unit.

Figure 71A:
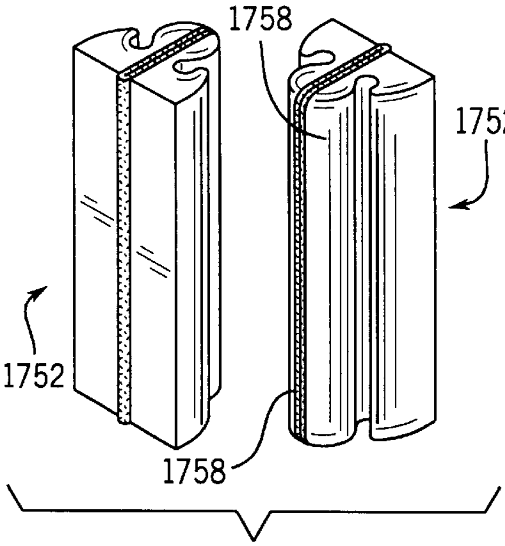
FIGS. 71A and 71B are perspective views of an eraser according to an alternative embodiment.
Figure 71B:
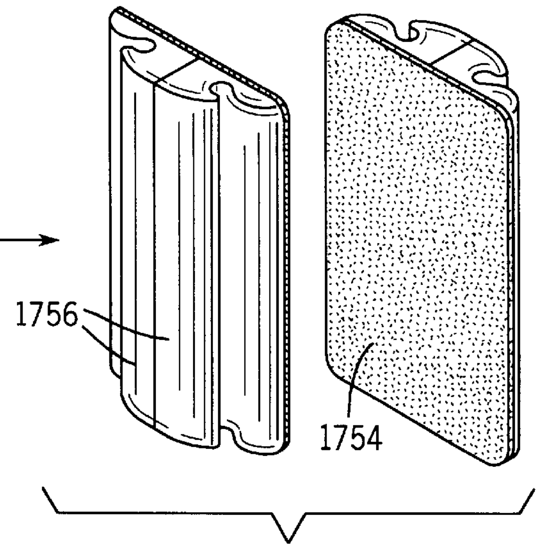
Figure 71C:
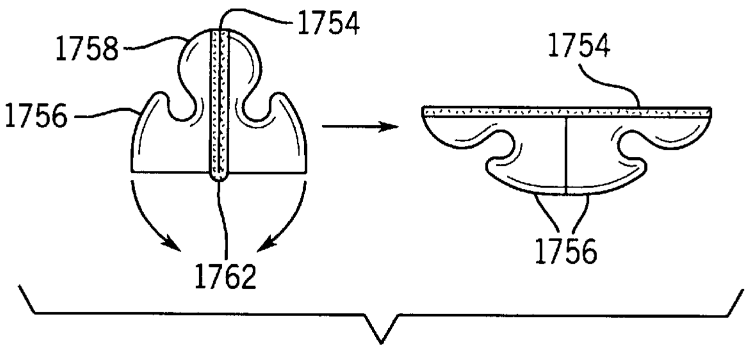
FIG. 71C is a fragmentary perspective view of the eraser of FIGS. 71A and 71B.
Figure 71D:
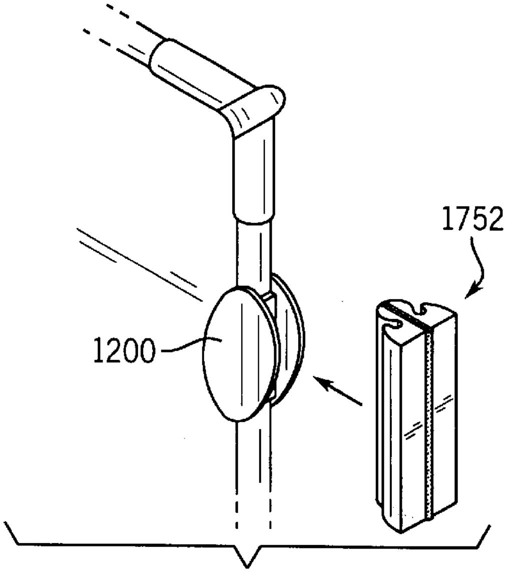
FIG. 71D is a fragmentary exploded perspective view of a display board system showing a coupling arrangement for the eraser of FIG. 71A.
Figure 71E:
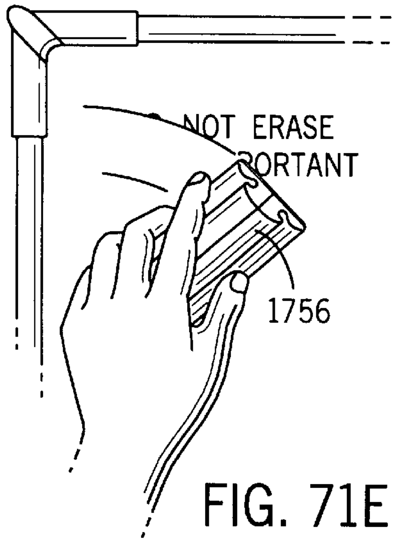
FIG. 71E is a fragmentary perspective view of a display board system showing use of the eraser of FIG. 71B.
Figure 72A:
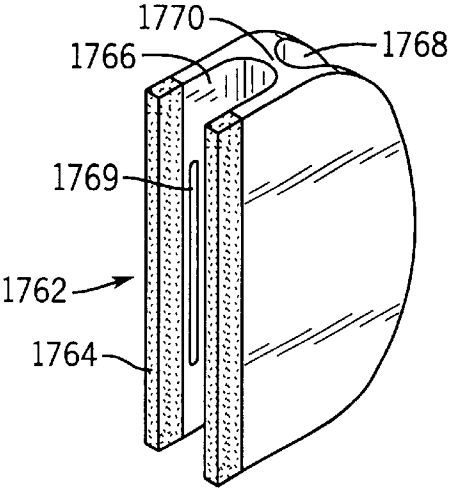
FIGS. 72A and 72B are perspective views of an eraser according to an alternative embodiment.
Figure 72B:
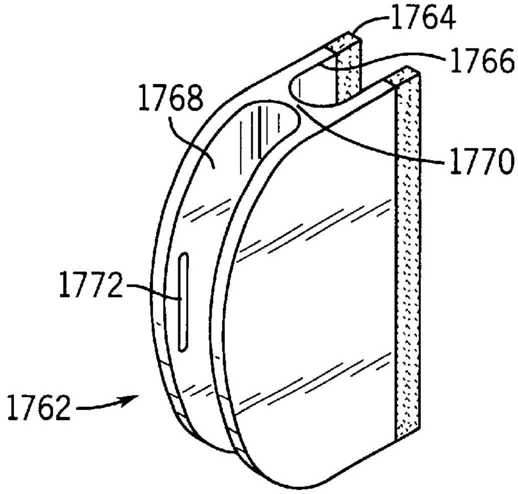
Figure 72C:
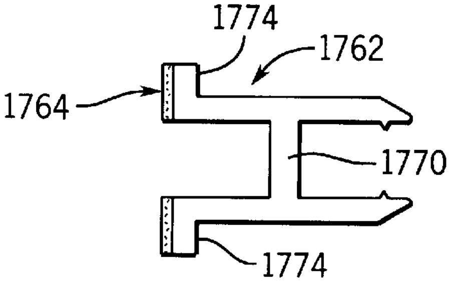
FIG. 72C is a side elevation view of the accessory of FIGS. 72A and 72B.
Figure 72D:
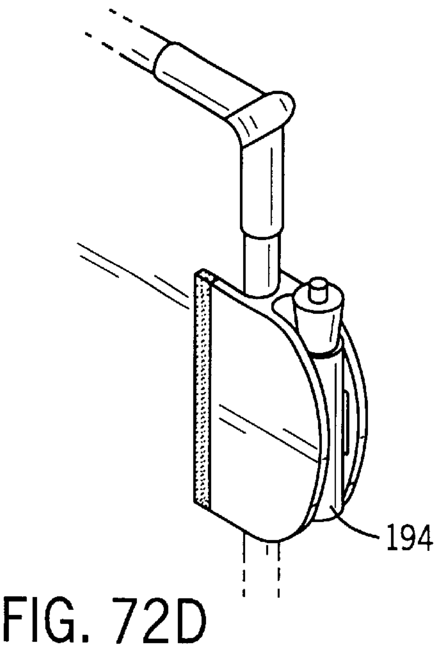
FIG. 72D is a fragmentary exploded perspective view of a display board system showing a coupling arrangement for the eraser of FIG. 72A.
Figure 72E:
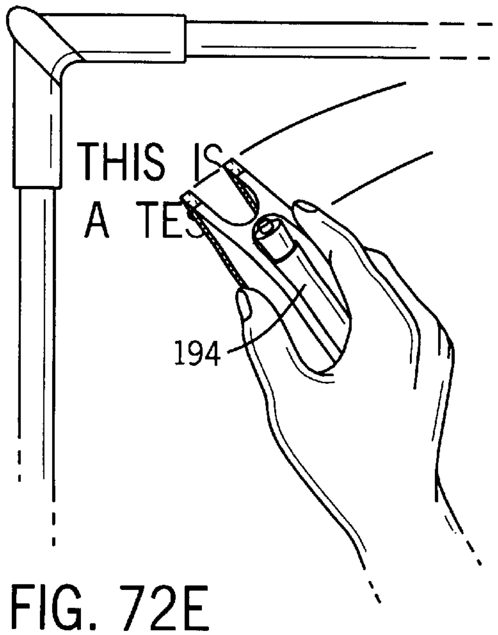
FIG. 72E is a fragmentary perspective view of a display board system showing use of the eraser of FIG. 72A.
Figure 73A:
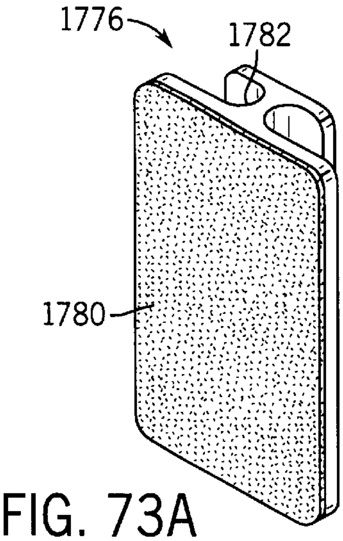
FIG. 73A and 73B are perspective views of an eraser according to an alternative embodiment.
Figure 73B:
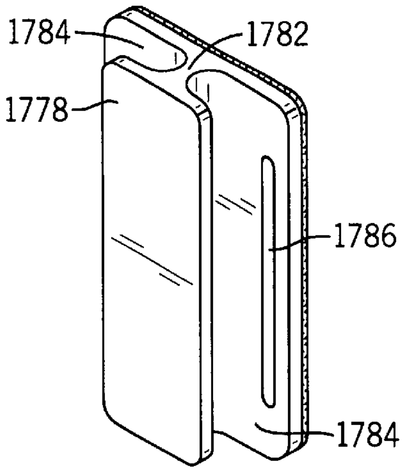
Figure 73C:
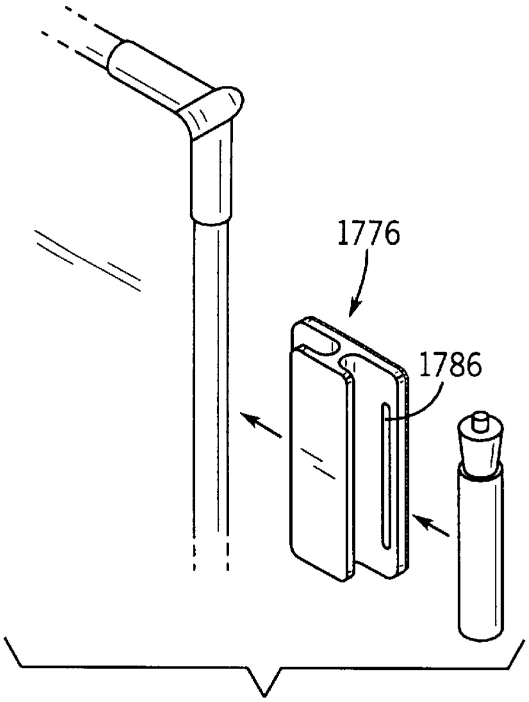
FIG. 73C is a fragmentary exploded perspective view of a display board system showing a coupling arrangement for the eraser of FIGS. 73A and 73B.
Figure 73D:
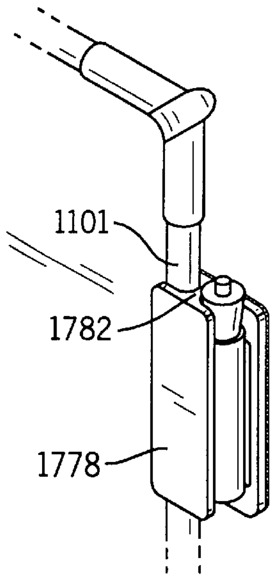
FIG. 73E is a fragmentary perspective view of a display board system showing a coupling arrangement for the eraser of FIGS. 73A and 73B.
Figure 73E:
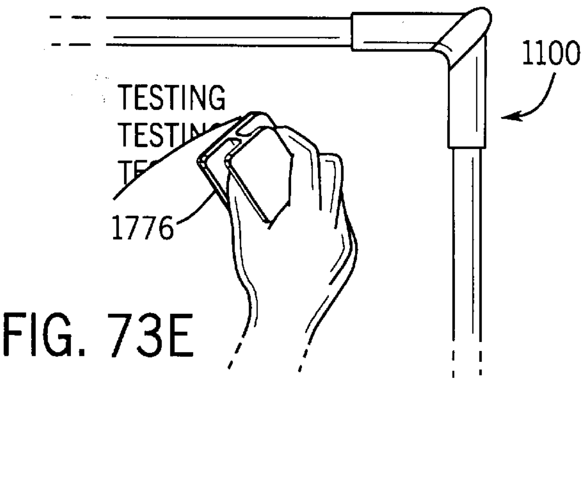

FIGS. 71A through 71E show an eraser 1752 configured to fold between an open position (as shown in FIG. 71B and 71E) and a closed position (as shown in FIGS. 71A and 71D). Eraser 1752 includes an erasing surface 1754 and support members 1754 having grip portions 1756 and clip portions 1758. According to a preferred embodiment, support members 1754 are connected by erasing surface 1754, which to provide a hinge 1762. When eraser 1752 is in the open position (i.e. unfolded position), grip portions 1756 are positioned adjacent each other and are configured to provide the user with a structure to grip and operate the eraser without touching the "dirty" surface being erased. When eraser 1752 is in the closed position (i.e. folded position), clip portions are positioned adjacent each other and are configured to engage with a clip (e.g. utility clip 1200) to attach to the display board. According to a preferred embodiment, erasing surface 1754 is made from a cloth material. According to alternative embodiments, the erasing surface may be made from any number of materials that may be suitable for the erasing or wiping function.

FIGS. 72A through 72E show an eraser clip 1762 having erasing surfaces 1764, a display board interface 1766, and a presentation tool interface 1768 connected to display board interface 1766 by a central web 1770. Display board interface 1766 has internal features (e.g. ribs 1769 comparable to ribs 1176 on corner members 1106) that are configured to engage grooves 1101 of the edge trim members, and is configured to deform readily to allow both attachment and removal of eraser clip 1762 when desired such that display board interface 1766 fits securely onto extruded edge trim members (e.g. as to prevent undesired slipping or sliding along trim members when receptacle is loaded). As shown, eraser surface 1764 of eraser clip 1762 can be used to remove (or erase) erasable markings from a display surface (e.g. a Melamine paper dry-erase or other "white board" surface); alternatively, the eraser clip can be used to attach a presentation tool to a display board or to store a presentation tool while using the eraser clip. Presentation tool interface 1768 is shaped and sized to receive a presentation tool (e.g. marker 194), and includes a pair of inwardly disposed opposed ribs 1772 configured to secure the presentation tool to the eraser clip. According to a particularly preferred embodiment, eraser surface 1764 is made from felt or "wiper" erasing surface. According to an alternative embodiment, display board interface 1766 includes outwardly disposed members 1774 configured to increase the erasing surface.

FIGS. 73A through 73E show an eraser clip 1776 having a handle 1778 and an eraser portion 1780 connected to handle 1778 by a central web 1782. Handle 1778, eraser portion 1780, and central web 1782 define clip portions 1784 that are shaped and sized to fit onto edge trim members of display board 1100 and to receive any of a variety of presentation tools. Clip portions 1784 have internal features (e.g. ribs 1786 comparable to ribs 1176 on corner members 1106) that are configured to engage grooves 1101 of edge trim members. Clip portions 1784 are configured to deform readily to allow both attachment and removal of eraser clip 1776 when desired such that one of clip portions 1784 fits securely onto extruded edge trim members (e.g. as to prevent undesired slipping or sliding along trim members when receptacle is loaded). Ribs 1786 are also configured to attach presentation tools (e.g. a marker 194, pointer, etc.) to display board 1100.

According to any preferred embodiment, the clips and storage devices are made of a compliant, spring-like material such as plastic, and will be provided with a mating profile, whether provided by projections or other engaging elements, that are suitably matched to the shape or construction of the corresponding frame or edge of the display boards to allow selectively for secure attachment and removal.

It is important to note that the use of the term "display board" is not meant as a term of limitation, insofar as any "board" or like structure having a decorative or functional use or application is intended to be within the scope of the term. The use of the term "display board" is intended as a convenient reference for any such "board" or structure, which may also be viewed synonymously with the term "work board" or other like terms. It is also important to note that the use of the term "information" is meant to cover any use of any type of media that can be associated with a display board (or work board).

Although only a few exemplary embodiments of the present invention have been described in detail in this disclosure, those skilled in the art who review this disclosure will readily appreciate that many modifications are possible in the exemplary embodiments (such as variations in sizes, structures, shapes and proportions of the various elements, values of parameters, mounting arrangements, or use of materials) without materially departing from the novel teachings and advantages of the invention. Accordingly, all such modifications are intended to be included within the scope of the invention as defined in the appended claims. Other substitutions, modifications, changes and omissions may be made in the design, operating conditions and arrangement of preferred embodiments without departing from the spirit of the invention as expressed in the appended claims.

What is claimed is:

1. An apparatus for display of information in a work environment comprising:

a display board having a substantially rigid core and a generally rectangular shape, the display board including:

a first side having a first surface, a second side opposite of the first side having a second surface, and a first mounting structure removably attached to the display board and having a first mounting interface;

wherein the first mounting structure is multi-functional and configured for hanging the display board and for pivotal mounting of the display board;

wherein the display board further includes a plurality of corner members, and the first mounting structure is removably attached to at least one of the plurality of corner members.

2. An apparatus for display of information in a work environment comprising:

a display board having a substantially rigid core and a generally rectangular shape, the display board including:

a first side having a first surface, a second side opposite of the first side having a second surface, and a first mounting structure removably attached to the display board and having a first mounting interface, the first mounting interface including a hook for hanging the display board, the first mounting structure also including a fin disposed below the hook, the fin being configured to inhibit vertical movement of the display board;

wherein the first mounting structure is multi-functional and configured for hanging the display board and for pivotal mounting of the display board.

3. An apparatus for display of information in a work environment comprising:

a display board having a substantially rigid core and a generally rectangular shape, the display board including:

a first side having a first surface, a second side opposite of the first side having a second surface, and a first mounting structure removably attached to the display board and having a first mounting interface includes a post for pivotal mounting of the display board;

wherein the first mounting structure is multi-functional and configured for hanging the display board and for pivotal mounting of the display board.

4. The apparatus of claim 3 wherein the first mounting interface is integrally formed with the mounting structure.

5. The apparatus of claim 3 wherein the corners include an aperture for pivotal mounting of the display board.

6. An apparatus for display of information in a work environment comprising:

a display board having a substantially rigid core and a generally rectangular shape, the display board including:

a first side having a first surface, a second side opposite of the first side having a second surface, and a first mounting structure removably attached to the display board and having a first mounting interface;

a second mounting structure attaches to the first mounting structure, the second mounting structure having a substantially horizontal surface configured to engage a horizontal edge;

wherein the first mounting structure is multi-functional and configured for hanging the display board and for pivotal mounting of the display board.

7. An apparatus for display of information in a work environment comprising:

a display board having a substantially rigid core and a generally rectangular shape, the display board including:

a first side having a first surface, a second side opposite of the first side having a second surface, and a first mounting structure removably attached to the display board and having a first mounting interface;

a second mounting structure attaches to the first mounting structure, the second mounting structure having a substantially horizontal surface configured to engage a horizontal ledge wherein the second mounting bracket includes a pad attached to the substantially horizontal surface, wherein the pad rests on the horizontal ledge.

8. The apparatus of claim 7 wherein the display board further includes an upper edge, and the first mounting structure includes a curved portion coupled to the upper edge and a horizontal post for hanging an item by engaging an aperture in the item.

9. The apparatus of claim 8 wherein the item is a flip chart pad.

10. The apparatus of claim 8 wherein the item is a pocket curtain.

11. A mounting structure for at least one display board providing a first mounting interface and a second mounting interface, the mounting structure comprising:

a first pivotal interface adapted to engage the first mounting interface of the display board;

a second pivotal interface adapted to engage the second mounting interface of the display board; and a pad disposed adjacent the second pivotal interface and configured to provide a resistant force to the second pivotal interface;

wherein the display board is removably pivotally mounted within the mounting structure.

12. The mounting structure of claim 11 wherein the first pivotal interface includes a top, a bottom, and a horizontal plate with a retaining slot coupled to the top and the bottom.

13. An apparatus for the display of information in a work environment, the apparatus comprising:

a display board having an outer perimeter, a first side, a second side, and a lightweight core disposed between the first and second sides, wherein the first side and the second side include a dry-erase surface treatment;

one or more receptacles provided with the display board and configured to receive a first presentation tool;

an attachment feature disposed proximate the perimeter of the display board and configured to receive a second presentation tool;

at least two mounting brackets coupled to the display board and extendable in a direction generally transverse to the display board and configured to support the apparatus on a surface in the work environment.

14. The apparatus of claim 13 wherein the mounting brackets are repositionable.

15. The apparatus of claim 14 wherein the display board can be displayed in a plurality of different orientations.

16. The apparatus of claim 13 wherein the mounting brackets are detachable.

17. The apparatus of claim 13 wherein the mounting brackets are coupled to the perimeter of the display board.

18. The apparatus of claim 13 wherein the mounting brackets each include a non-skid pad.

19. The apparatus of claim 18 wherein the pad is formed from a material different than the mounting brackets.

20. The apparatus of claim 18 wherein the pad is made from an elastomeric material.

21. The apparatus of claim 13 wherein the one or more receptacles are accessible from the first side of the display board.

22. The apparatus of claim 13 wherein the one or more receptacles are accessible from both the first and second sides of the display board.

23. The apparatus of claim 13 further including a storage compartment that includes the one or more receptacles.

24. The apparatus of claim 13 wherein the receptacles are disposed in an aperture of the display board.

25. The apparatus of claim 13 wherein the receptacles are formed from one of rigid plastic and foam.

26. The apparatus of claim 13 wherein the core is formed from an open honeycomb structure.

27. The apparatus of claim 13 wherein the core is made of a foam material.

28. The apparatus of claim 13 wherein the one or more receptacles are configured to grip the first presentation tool.

29. The apparatus of claim 13 wherein the attachment feature is configured to grip The second presentation tool.

30. The apparatus of claim 13 wherein the attachment feature provides support to the second presentation tool and wherein the second presentation tool is positioned at least partially outwardly from the perimeter of the display board.

31. The apparatus of claim 13 wherein the first presentation tool is a marker.

32. The apparatus of claim 13 wherein the second presentation tool is an eraser.

33. The apparatus of claim 13 wherein the core defines a plurality of voids.

34. The apparatus of claim 13 wherein the attachment feature is adjacent the perimeter of the display board.

35. The apparatus of claim 13 wherein the attachment feature is a storage cup clip.

36. The apparatus of claim 13 wherein the attachment feature is a utility clip.

37. The apparatus of claim 13 wherein the attachment feature is an eraser clip.

38. An apparatus for the display of information in a work environment, the apparatus comprising:

a display board having an outer perimeter, a first side, a second side, and a lightweight core disposed between the first side and the second side, wherein the first side includes a dry-erase surface having an outer boundary disposed inwardly from the outer perimeter of the display board along a substantial portion of the outer perimeter of the display board;

an attachment feature disposed on the display board at a position wherein at least a portion of the attachment feature is located between the outer perimeter of the board and the outer boundary of the dry-erase surface;

an accessory supportingly coupled to the display board proximate the outer perimeter of the display board and wherein support for the accessory includes a press-fit engagement with the attachment feature.

39. The apparatus of claim 38 wherein the display board further comprises an edge trim member extending along a portion of the outer perimeter of the display board and the attachment feature comprises a groove disposed on the edge trim member.

40. The apparatus of claim 39 wherein the one or more receptacles are accessible from both the first and second sides of the display board.

41. The apparatus of claim 39 wherein the receptacles are disposed in an aperture of the display board.

42. The apparatus of claim 39 wherein the receptacles are formed from one of rigid plastic and foam.

43. The apparatus of claim 38 wherein the core is formed from an open honeycomb structure.

44. The apparatus of claim 38 wherein the core is made of a foam material.

45. The apparatus of claim 38 wherein the attachment feature provides support to a presentation tool positioned at least partially outwardly from the perimeter of the display board.

46. The apparatus of claim 45 wherein the presentation tool is an eraser or a marker.

47. An apparatus for the display of information in a work environment, the apparatus comprising:

a display board having a multi-layer construction wherein a first layer defines a first major surface of the display board wherein said first layer includes a dry-erase surface treatment, a second layer defines a second major surface of the display board wherein the second layer includes a dry-erase surface treatment, and a third layer disposed between the first and second layers and the third layer includes a lightweight core;

a plurality of mounting brackets wherein each of the brackets includes a non-skid pad and wherein at least one of the plurality of brackets may be positioned to extend in a first direction extending generally transverse to and relatively outwardly from the first major surface to provide support for the display board in a first orientation and wherein at least one of the plurality of brackets may be positioned to extend in a second direction extending generally transverse to and relatively outwardly from the second major surface to provide support to the display board in a second orientation.

48. The apparatus of claim 47 wherein the plurality of mounting brackets comprises at least two mounting brackets detachably securable to the display board.

49. The apparatus of claim 48 wherein the mounting brackets are repositionable.

50. The apparatus of claim 47 wherein the mounting brackets are detachable.

51. The apparatus of claim 47 wherein the mounting brackets are coupled to an outer perimeter of The display board.

52. The apparatus of claim 47 wherein the pad is formed from a material different than the mounting brackets.

53. The apparatus of claim 47 wherein the pad is made from an elastomeric material.

54. The apparatus of claim 47 wherein the core is formed from an open honeycomb structure.

55. The apparatus of claim 47 wherein the core is made of a foam material.

56. The apparatus of claim 47 further including an attachment feature for a presentation tool which is positionable between the mounting brackets.

57. The apparatus of claim 47 further including one or more receptacles configured to at least partially receive one or more presentation tools.

58. An apparatus for the display of information in a work environment, the apparatus comprising:

a display board;

one or more mounting structures coupled to the display board and extendable in a direction generally transverse to the display board and configured to support the apparatus on a substantially horizontal surface in the work environment.

59. The apparatus of claim 58 wherein the mounting structures are repositionable.

60. The apparatus of claim 58 wherein the mounting structures are detachable.

61. The apparatus of claim 58 wherein the mounting structures are coupled to the perimeter of the display board.

62. The apparatus of claim 58 wherein the mounting structures are mounting brackets.

63. The apparatus of claim 62 wherein each bracket includes a non-skid pad.

64. The apparatus of claim 63 wherein the pads are formed form an elastomeric material.

65. The apparatus of claim 63 wherein the pad is formed of a material that is different than the mounting brackets.

66. The apparatus of claim 62 wherein the mounting brackets are coupled to an outer perimeter of the display board.

67. The apparatus of claim 66 wherein the mounting brackets include first and second mounting brackets coupled to the outer perimeter of the display board.

68. The apparatus of claim 67 wherein each bracket includes a non-skid pad.

69. The apparatus of claim 68 wherein the pads are formed form an elastomeric material.

70. The apparatus of claim 69 wherein the pad is formed of a material that is different than the mounting brackets.

71. The apparatus of claim 69 wherein each of the first and second surfaces includes a dry-erase surface treatment.

72. The apparatus of claim 62 wherein the mounting brackets include first and second mounting brackets coupled to the outer perimeter of the display board.

73. The apparatus of claim 58 wherein the display board includes at least one hook adapted to hang the board and the board and the mounting structures are detachably connected to the at least one hook.

74. The apparatus of claim 58 wherein the display board includes first and second oppositely facing sides and the mounting structure is positionable to extend from to either the first or the second side of the board.

75. The apparatus of claim 58 wherein the display board includes first and second oppositely facing sides and the first side includes a first surface and the second side includes a second surface.

76. An apparatus for the display of information in a work environment, the apparatus comprising:

a display board; and one or more mounting brackets coupled to the display board and extendable in a direction generally transverse to the display board and configured to support the apparatus on a surface in the work environment;

wherein the mounting brackets comprise a non-skid pad.

77. An apparatus for the display of information in a work environment, the apparatus comprising:

a display board having an outer perimeter;

a first attachment feature provided with the display board and configured to receive a first presentation tool;

a second attachment feature adjacent the outer perimeter of the display board and configured to receive a second presentation tool.

78. The apparatus of claim 77 wherein the first attachment feature is accessible from the first side of the display board.

79. The apparatus of claim 77 wherein the first attachment feature is accessible from both the first and second sides of the display board.

80. The apparatus of claim 77 wherein the first attachment feature comprises one or more receptacles.

81. The apparatus of claim 80 wherein the one or more receptacles are configured to grip the first presentation tool.

82. The apparatus of claim 77 wherein the second attachment feature is configured to grip the second presentation tool.

83. The apparatus of claim 77 wherein the second attachment feature provides support to the second presentation tool and wherein the second presentation tool is positioned at least partially outwardly from the perimeter of the display board.

84. The apparatus of claim 77 wherein the display board further comprises an edge trim member extending along at least a portion of the outer perimeter of the display board and wherein the second attachment feature is removably coupled to the edge trim member by engagement between a rib and a groove.

85. The apparatus of claim 77 further comprising an accessory coupled to the display board by an engagement with the first attachment feature or the second attachment feature.

86. The apparatus of claim 77 wherein the first side includes an outer boundary disposed inwardly from the outer perimeter of the display board, and one of the first attachment feature and the second attachment feature is disposed on the display board at a position wherein at least a portion of the attachment feature is located between the outer perimeter of the board and the outer boundary of the first side.

87. The apparatus of claim 77 wherein the first attachment feature or the second attachment feature provides support to the first presentation tool or the second presentation tool positioned at least partially outwardly from the perimeter of the display board.

88. The apparatus of claim 77 wherein the attachment feature is a storage clip.

89. The apparatus of claim 77 wherein the attachment feature is an integrated storage compartment.

90. The apparatus of claim 77 wherein the attachment feature a pivoting storage tray.

91. An apparatus for display of information in a work environment comprising:

a display board having a substantially rigid core and a generally rectangular shape, the display board including:

a first side having a first surface, a second side opposite of the first side having a second surface, and a first mounting structure removably attached to the display board and having a first mounting interface, wherein the first mounting structure comprises a mounting element;

wherein the first mounting structure is multi-functional and configured for hanging the display board and for pivotal mounting of the display board.

92. The apparatus of claim 91 wherein the mounting element comprises a post-hook clip.

93. The apparatus of claim 91 wherein the first mounting structure comprises a universal mounting element.

94. The apparatus of claim 91 wherein the mounting element is configured to allow for mounting in a landscape mode and on a ports art mode.

* * * * *